(12) United States Patent
Bernatz et al.

(10) Patent No.: US 8,313,669 B2
(45) Date of Patent: Nov. 20, 2012

(54) LIQUID-CRYSTAL DISPLAY

(75) Inventors: Georg Bernatz, Darmstadt (DE); Andreas Taugerbeck, Damstadt (DE)

(73) Assignee: Merck Patent Gesellschaft mit Beschränkter Haftung, Darmstadt (DE)

( * ) Notice: Subject to any disclaimer, the term of this patent is extended or adjusted under 35 U.S.C. 154(b) by 3 days.

(21) Appl. No.: 12/675,453

(22) PCT Filed: Jul. 31, 2008

(86) PCT No.: PCT/EP2008/006302
§ 371 (c)(1), (2), (4) Date: Jan. 3, 2011

(87) PCT Pub. No.: WO2009/030322
PCT Pub. Date: Mar. 12, 2009

(65) Prior Publication Data
US 2011/0101269 A1    May 5, 2011

(30) Foreign Application Priority Data
Aug. 30, 2007 (DE) .......................... 10 2007 041 114

(51) Int. Cl.
*C09K 19/06* (2006.01)
*C09K 19/52* (2006.01)
*C09K 19/00* (2006.01)
*C07C 69/00* (2006.01)
*C07C 69/34* (2006.01)

(52) U.S. Cl. ........... 252/299.01; 252/299.6; 252/299.62; 252/299.63; 252/299.65; 428/1.1; 428/1.3; 349/1; 349/56; 560/141; 560/194

(58) Field of Classification Search .................. None
See application file for complete search history.

(56) References Cited

U.S. PATENT DOCUMENTS

| 7,153,548 | B2 | 12/2006 | Nishikawa et al. |
| 2004/0011996 | A1 | 1/2004 | Klasen-Memmer et al. |
| 2007/0108407 | A1 | 5/2007 | Naciri et al. |
| 2009/0324853 | A1* | 12/2009 | Bernatz et al. ................ 428/1.1 |
| 2010/0304049 | A1* | 12/2010 | Bernatz et al. ................ 428/1.2 |

FOREIGN PATENT DOCUMENTS

| EP | 1215195 A1 | 6/2002 |
| EP | 1378557 A1 | 1/2004 |
| EP | 1498468 A1 | 1/2005 |
| GB | 2379931 A | 3/2003 |
| JP | 2004231641 A | 8/2004 |
| WO | 9617901 A1 | 6/1996 |
| WO | PCT2008006302 R | 11/2008 |

OTHER PUBLICATIONS

Schmitt, G., et al. "New Liquid Crystalline DI- and Tetra-Acrylates for Network Formation." Liquid Crystals. Jan. 1, 2001.

* cited by examiner

*Primary Examiner* — Geraldina Visconti
(74) *Attorney, Agent, or Firm* — Millen, White, Zelano & Branigan, P.C.

(57) ABSTRACT

The present invention relates to a liquid-crystal (LC) display of the PS (polymer stabilized) or PSA (polymer sustained alignment) type, and to polymerizable compounds and LC media for use in PS (polymer stabilized) and PSA displays.

14 Claims, No Drawings

LIQUID-CRYSTAL DISPLAY

The present invention relates to liquid-crystal (LC) displays of the PS (polymer stabilised) or PSA (polymer sustained alignment) type, and to novel polymerisable compounds and novel LC media for use in PS(A) displays.

The liquid-crystal displays (LC displays) used at present are mostly those of the TN (twisted nematic) type. However, these have the disadvantage of a strong viewing-angle dependence of the contrast.

In addition, so-called VA (vertical alignment) displays are known which have a broader viewing angle. The LC cell of a VA display contains a layer of an LC medium between two transparent electrodes, where the LC medium usually has a negative value of the dielectric (DC) anisotropy. In the switched-off state, the molecules of the LC layer are aligned perpendicular to the electrode surfaces (homeotropically) or have a tilted homeotropic alignment. On application of an electrical voltage to the electrodes, a realignment of the LC molecules parallel to the electrode surfaces takes place.

Furthermore, OCB (optically compensated bend) displays are known which are based on a birefringence effect and have an LC layer with a so-called "bend" alignment and usually positive (DC) anisotropy. On application of an electrical voltage, a realignment of the LC molecules perpendicular to the electrode surfaces takes place. In addition, OCB displays normally contain one or more birefringent optical retardation films in order to prevent undesired transparency to light of the bend cell in the dark state. OCB displays have a broader viewing angle and shorter response times compared with TN displays.

Also known are IPS (in-plane switching) displays, which contain an LC layer between two substrates, only one of which has an electrode layer, usually with a comb-shaped structure. On application of a voltage, an electric field which has a significant component parallel to the LC layer is thereby generated. This causes realignment of the LC molecules in the layer plane. Furthermore, so-called FFS (fringe field switching) displays have been proposed (see, inter alia, S. H. Jung et al., Jpn. J. Appl. Phys., Volume 43, No. 3, 2004, 1028), which likewise contain two electrodes on the same substrate, but, in contrast to IPS displays, only one of these is in the form of a structured (comb-shaped) electrode, and the other electrode is unstructured. A strong, so-called "fringe field" is thereby generated, i.e. a strong electric field close to the edge of the electrodes, and, throughout the cell, an electric field which has both a strong vertical component and a strong horizontal component. Both IPS displays and also FFS displays have a low viewing-angle dependence of the contrast.

In VA displays of the more recent type, uniform alignment of the LC molecules is restricted to a plurality of relatively small domains within the LC cell. Disclinations can exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes. In so-called MVA (multidomain vertical alignment) displays, this is usually achieved by the electrodes having protrusions which cause a local pretilt. As a consequence, the LC molecules are aligned parallel to the electrode surfaces in different directions in different, defined regions of the cell on application of a voltage. "Controlled" switching is thereby achieved, and the formation of interfering disclination lines is prevented. Although this arrangement improves the viewing angle of the display, it results, however, in a reduction in its transparency to light. A further development of MVA uses protrusions on only one electrode side, while the opposite electrode has slits, which improves the transparency to light. The slitted electrodes generate an inhomogeneous electric field in the LC cell on application of a voltage, meaning that controlled switching is still achieved. For further improvement of the transparency to light, the separations between the slits and protrusions can be increased, but this in turn results in a lengthening of the response times. In the so-called PVA (patterned VA), protrusions are rendered completely superfluous in that both electrodes are structured by means of slits on the opposite sides, which results in increased contrast and improved transparency to light, but is technologically difficult and makes the display more sensitive to mechanical influences (tapping, etc.). For many applications, such as, for example, monitors and especially TV screens, however, a shortening of the response times and an improvement in the contrast and luminance (transmission) of the display are desired.

A further development are the so-called PS (polymer stabilised) displays, which are also known under the term "PSA" (polymer sustained alignment). In these, a small amount (for example 0.3% by weight, typically <1% by weight) of a polymerisable compound is added to the LC medium and, after introduction into the LC cell, is polymerised or crosslinked in situ, usually by UV photopolymerisation, with an electrical voltage applied between the electrodes. The addition of polymerisable mesogenic or liquid-crystalline compounds, also known as "reactive mesogens" (RMs), to the LC mixture has proven particularly suitable.

In the meantime, the PS or PSA principle is being used in diverse classical LC displays. Thus, for example, PSA-VA, PSA-OCB, PS-IPS and PSTN displays are known. As can be demonstrated in test cells, the PSA method results in a pretilt in the cell. In the case of PSA-OCB displays, it is therefore possible for the bend structure to be stabilised so that an offset voltage is unnecessary or can be reduced. In the case of PSA-VA displays, this pretilt has a positive effect on response times. For PSA-VA displays, a standard MVA or PVA pixel and electrode layout can be used. In addition, however, it is possible, for example, to manage with only one structured electrode side and no protrusions, which significantly simplifies production and at the same time results in very good contrast at the same time as very good transparency to light.

PSA-VA displays are described, for example, in JP 10-036847 A, EP 1 170 626 A2, EP 1 378 557 A1, EP 1 498 468 A1, US 2004/0191428 A1, US 2006/0066793 A1 and US 2006/0103804 A1. PSA-OCB displays are described, for example, in T.-J-Chen et al., Jpn. J. Appl. Phys. 45, 2006, 2702-2704 and S. H. Kim, L.-C-Chien, Jpn. J. Appl. Phys. 43, 2004, 7643-7647. PS-IPS displays are described, for example, in U.S. Pat. No. 6,177,972 and Appl. Phys. Lett. 1999, 75(21), 3264. PS-TN displays are described, for example, in Optics Express 2004, 12(7), 1221.

However, it has been found that the LC mixtures and RMs known from the prior art still have some disadvantages on use in PS(A) displays. Thus, far from every desired soluble monomer is suitable for PS(A) displays, and it appears difficult to find more suitable selection criteria than just the direct PSA experiment with pretilt measurement. The choice becomes even smaller if polymerisation by means of UV light without the addition of photoinitiators is desired, which may be advantageous for certain applications. In addition, the selected "material system" of LC mixture (also referred to below as "LC host mixture")+polymerisable component should have the best possible electrical properties, in particular a high "voltage holding ratio" (HR or VHR).

The PS(A) displays disclosed in the prior art usually contain RMs in which the ring systems of the mesogenic group are linked in the para-position to their adjacent groups (further rings, bridging groups, spacers or polymerisable groups), such as, for example, the display proposed in EP 1 498 468 A1, which contains RMs selected from the following formulae:

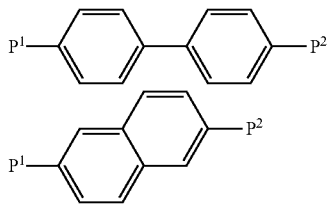

in which $P^1$ and $P^2$ denote a polymerisable group, for example an acrylate, methacrylate, vinyl, vinyloxy or epoxide group.

However, RMs like those of the above-mentioned formulae generally have a high melting point and limited solubility in many currently common LC mixtures and therefore frequently tend to spontaneously crystallise out of the mixture. In addition, the risk of spontaneous polymerisation prevents the LC host mixture being warmed in order to dissolve the polymerisable component, meaning that the best possible solubility even at room temperature is necessary. In addition, there is a risk of separation, for example on introduction of the LC medium into the LC display (chromatography effect), which may greatly impair the homogeneity of the display. This is further increased by the fact that the LC media are usually introduced at low temperatures in order to reduce the risk of spontaneous polymerisation (see above), which in turn has an adverse effect on the solubility.

Thus, there continues to be a great demand for PS(A) displays, in particular of the VA and OCB type, and for LC media and RMs for use in such displays, which do not have the disadvantages described above or only do so to a small extent and have improved properties. In particular, there is a great demand for PS(A) displays, as well as LC media and RMs for use in such displays, having high stability to separation at low temperatures, high specific resistance at the same time as a large working-temperature range, short response times, even at low temperatures, and a low threshold voltage, which facilitate a large number of grey shades, high contrast and a wide viewing angle, and have high values for the voltage holding ratio (HR) after UV exposure.

The invention was based on the object of providing PS(A) displays which do not have the disadvantages indicated above or only do so to a lesser extent, enable the setting of a pretilt angle and preferably at the same time have very high specific resistance values, low threshold voltages and short response times.

Surprisingly, it has now been found that this object can be achieved by using PS(A) displays according to the invention which contain a polymerisable or polymerised mesogenic compound as described in the present invention. The polymerisable mesogenic compounds (RMs) of the present invention are characterised in that they have one or more ring systems which are not linked to their two adjacent groups exclusively via the paraposition which is usual in LC molecules (i.e. with a bond angle of about) 180°, but instead have one or more rings having a meta-link to their two adjacent groups (or a similar bond angle which is significantly different from 180°, such as, for example, 120° or less). The RMs according to the invention can thus have a "kinked" molecular structure, in contrast to the rod-shaped RMs from the prior art. Furthermore, the RMs according to the invention have, compared with the RMs from the prior art, a lower melting point, a lower tendency towards crystallisation and improved solubility in many commercially available LC host mixtures. In addition, it has been shown, in combination with an LC medium by means of pretilt measurements in VA tilt measurement cells, that, in spite of the "kinked" molecular structure of the RMs, it has also been possible to achieve an adequate pretilt with the LC media according to the invention, in particular without the addition of photoinitiator.

These results are surprising and could not have been expected from the prior art, especially as the RMs according to the invention have a molecular structure which differs from the usual rod shape of the LC molecules in the commercially available LC host mixture, which would actually give rise to expectations of poorer compatibility of the RMs with the LC host mixture, and thus also poorer properties of the LC display.

The invention thus relates to a liquid-crystal (LC) display of the PS (polymer stabilised) or PSA (polymer sustained alignment) type, containing an LC cell consisting of two substrates, where at least one substrate is trans-parent to light and at least one substrate has an electrode layer, and a layer of an LC medium comprising a polymerised component and a low-molecular-weight component located between the substrates, where the polymerised component is obtainable by polymerisation of one or more polymerisable compounds between the substrates of the LC cell in the LC medium with application of an electrical voltage, characterised in that at least one of the polymerisable compounds is selected from formula I $$R^a\text{-}(A^1\text{-}Z^1)_{m1}\text{-}(A^2\text{-}Z^2)_{m2}\text{-}(A^3)_{m3}\text{-}R^b \qquad \text{I}$$

in which the individual radicals have the following meanings:

$R^a$ and $R^b$ each, independently of one another, denote P-Sp-, H, halogen, $SF_5$, $NO_2$, a carbon group or hydrocarbon group, where at least one of the radicals $R^a$ and $R^b$ denotes P-Sp-, P on each occurrence, identically or differently, denotes a polymerisable group, Sp on each occurrence, identically or differently, denotes a spacer group or a single bond, $A^1$ and $A^3$ each, independently of one another, denote 1,3-phenylene, naphthalene-1,3-diyl, naphthalene-1,6-diyl, naphthalene-2,5-diyl or naphthalene-2,7-diyl, where, in addition, one or more CH groups in these radicals may be replaced by N, cyclohexane-1,3-diyl, in which, in addition, one or more non-adjacent $CH_2$ groups may be replaced by O and/or S, 1,3-cyclohexenylene, piperidine-2,4-diyl, piperidine-2,6-diyl, decahydronaphthalene-2,7-diyl, 1,2,3,4-tetrahydronaphthalene-2,7-diyl or indane-2,4-diyl, where all these radicals may be unsubstituted or mono- or polysubstituted by L, and where, in the case where m1=m3=1, one of the radicals $A^1$ and $A^3$ may also have one of the meanings indicated for $A^2$, $A^2$ on each occurrence, identically or differently, denotes 1,4-phenylene, naphthalene-1,4-diyl or naphthalene-2,6-diyl, where, in addition, one or more CH groups in these radicals may be replaced by N, cyclohexane-1,4-diyl, in which, in addition, one or more non-adjacent $CH_2$ groups may be replaced by O and/or S, 1,4-cyclohexenylene, bicyclo[1.1.1]-pentane-1,3-diyl, bicyclo[2.2.2]octane-1,4-diyl, spiro[3.3]-heptane-2,6-diyl, piperidine-2,5-diyl, decahydronaphthalene-2,6-diyl, 1,2,3,4-tetrahydronaphthalene-2,6-diyl, indane-2,5-diyl, thiophene-2,5-diyl, fluorene-2,7-diyl or octahydro-4,7-methanoindane-2,5-diyl, where all these radicals may be un-substituted or mono- or polysubstituted by L, or can have one of the meanings indicated for $A^1$, L denotes P-Sp-, H, OH, halogen, $SF_5$, $NO_2$, a carbon group or hydrocarbon group, $Z^{1,2}$ each, independently of one another and on each occurrence identically or differently, denote —O—, —S—, —CO—, —CO —O—, —COO—, —O—CO —O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, $CR^oR^{oo}$ or a single bond, $R^o$ and $R^{oo}$ each, independently of one another, denote H or alkyl having 1 to 12 C atoms, m1 and m3 each, independently of one another, denote 0 or 1, where m1+m3>0, m2 denotes 0, 1, 2 or 3, n1 denotes 1, 2, 3 or 4.

The invention furthermore relates to novel polymerisable compounds (reactive mesogens, "RM"s) of the formula I, and to a process for the preparation thereof.

The invention furthermore relates to an LC medium comprising one or more polymerisable compounds of the formula I.

The invention furthermore relates to an LC medium comprising
- a polymerisable component A) comprising one or more polymerisable compounds of the formula I,
- a liquid-crystalline component B), also referred to below as "LC host mixture", comprising one or more, preferably two or more, low-molecular-weight (i.e. monomeric or unpolymerised) compounds.

The invention furthermore relates to the use of polymerisable compounds of the formula I in PS and PSA displays.

The invention furthermore relates to an LC display containing one or more compounds of the formula I or an LC medium according to the invention, in particular a PS or PSA display, particularly preferably a PSA-VA, PSA-OCB, PS-IPS, PS-FFS or PS-TN display.

Particular preference is given to LC media comprising one, two or three polymerisable compounds of the formula I.

Preference is furthermore given to LC media in which the polymerisable component A) consists exclusively of polymerisable compounds of the formula I.

Preference is furthermore given to LC media in which component B) is an LC compound or an LC mixture which has a nematic liquid-crystal phase.

Preference is furthermore given to achiral polymerisable compounds and LC media comprising, preferably consisting exclusively of, achiral compounds.

The polymerisable compounds can be added individually to the LC media, but it is also possible to use mixtures comprising two or more polymerisable compounds according to the invention. On polymerisation of mixtures of this type, copolymers are formed. The invention furthermore relates to the polymerisable mixtures mentioned above and below. The polymerisable compounds can be mesogenic or non-mesogenic.

Particularly preferred compounds of the formula I are those in which $A^{1-3}$, $Z^{1-2}$, P, Sp, m1, m2, m3 and n1 have the above-mentioned meanings, and L denotes P-Sp-, OH, $CH_2OH$, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl or P-Sp-, $Y^1$ denotes halogen, $R^x$ denotes P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO —O—, —O—CO—, —O—CO —O— in such a way that O and/or S atoms are not linked directly to one another, and in which, in addition, one or more H atoms may be replaced by F, Cl or P-Sp-, an optionally substituted aryl or aryloxy group having 6 to 40 C atoms or an optionally substituted heteroaryl or heteroaryloxy group having 2 to 40 C atoms, $R^a$ and $R^b$ denote P-Sp-, H, L as defined above, or straight-chain or branched alkyl having 1 to 25 C atoms, in which, in addition, one or more non-adjacent CH$_2$ groups may each be replaced, independently of one another, by —C($R^x$)=C($R^x$)—, —C≡C—, —N($R^x$)—, —O—, —S—, —CO—, —CO —O—, —O—CO—, —O—CO —O— in such a way that O and/or S atoms are not linked directly to one another, and in which, in addition, one or more H atoms may be replaced by F, Cl, Br, I, CN or P-Sp-, where at least one of the radicals $R^a$ and $R^b$ is P-Sp-.

Particularly preferred compounds of the formula I are those in which
- $R^a$ and $R^b$ denote identical or different radicals P-Sp-,
- $R^a$ and $R^b$ denote identical or different radicals P-Sp-, in which one of the radicals Sp denotes a single bond,
- one of the radicals $R^a$ and $R^b$ denotes P-Sp- and the other denotes L as defined above, straight-chain or branched alkyl having 1 to 25 C atoms, in which, in addition, one or more non-adjacent CH$_2$ groups may each be replaced, independently of one another, by —C($R^x$)=C($R^x$)—, —C≡C—, —N($R^x$)—, —O—, —S—, —CO—, —CO —O—, —O—CO—, —O—CO —O— in such a way that O and/or S atoms are not linked directly to one another, and in which, in addition, one or more H atoms may be replaced by F, Cl, Br, I, CN or P-Sp-,
- Sp denotes a single bond,
- $Z^1$ and $Z^2$ denote a single bond,
- the radicals $A^2$ are selected from 1,4-phenylene, naphthalene-1,4-diyl or naphthalene-2,6-diyl, where, in addition, one or more CH groups in these radicals may be replaced by N, cyclohexane-1,4-diyl, in which, in addition, one or more non-adjacent CH$_2$ groups may be replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-2,5-diyl, decahydronaphthalene-2,6-diyl, 1,2,3,4-tetra-hydronaphthalene-2,6-diyl, indane-2,5-diyl, thiophene-2,5-diyl, fluorene-2,7-diyl or octahydro-4,7-methanoindane-2,5-diyl, where all these radicals may be unsubstituted or mono- or polysubstituted by L,
- the radicals $A^2$ are selected from 1,4-phenylene, naphthalene-1,4-diyl or naphthalene-2,6-diyl, where, in addition, one or more CH groups in these radicals may be replaced by N, where all these radicals may be unsubstituted or mono- or polysubstituted by L,
- the radicals $A^1$ and $A^3$ are selected from 1,3-phenylene, naphthalene-1,3-diyl, naphthalene-1,6-diyl, naphthalene-2,5-diyl and naphthalene-2,7-diyl, where, in addition, one or more CH groups in these radicals may be replaced by N, where all these radicals may be unsubstituted or mono- or polysubstituted by L, the radicals $A^1$ and/or $A^3$, preferably in the meta- or para-position to the link to the adjacent ring group $A^{1-3}$ or the corresponding bridging group $Z^{1,2}$, have one or more substituents L which denote P-Sp-, m1=m3=1, and m2=0, 1 or 2, m1=m2=0, m3=1.

Further particularly preferred compounds of the formula I are selected from the following sub-formulae:

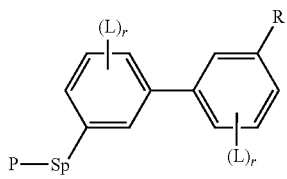
I1

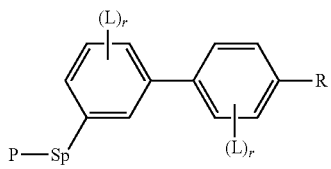
I2

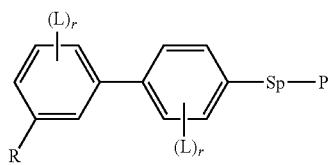
I3

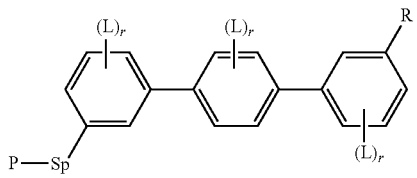
I4

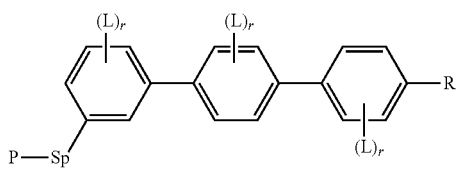
I5

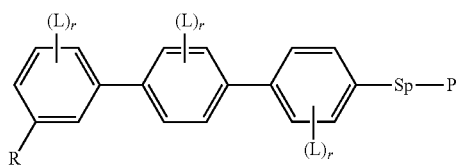
I6

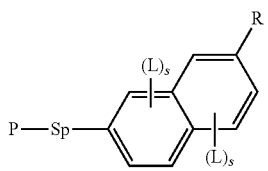
I7

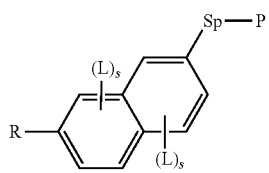
I8

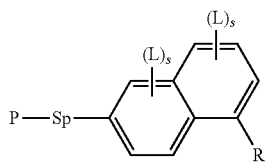
I9

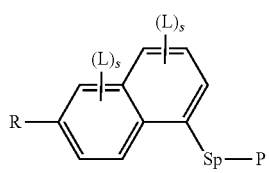
I10

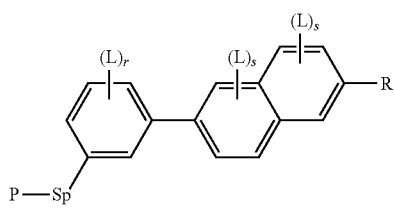
I11

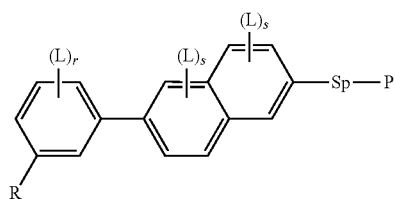
I12

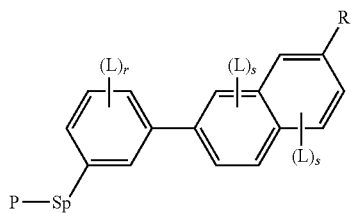
I13

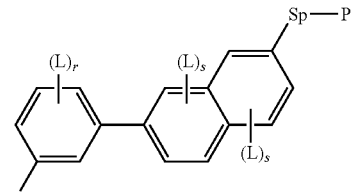
I14

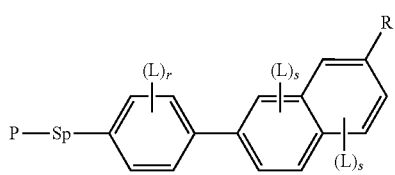
I15

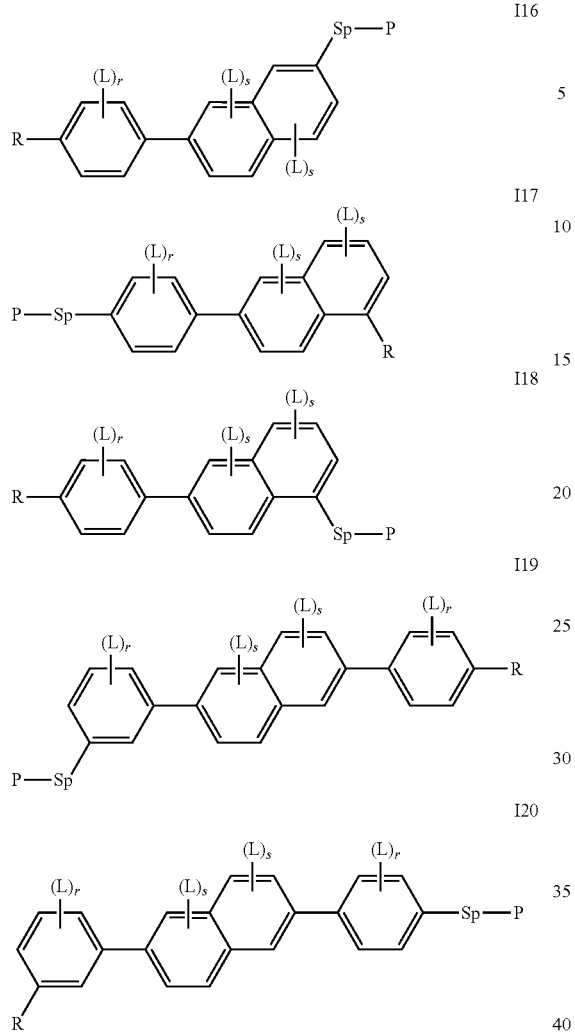

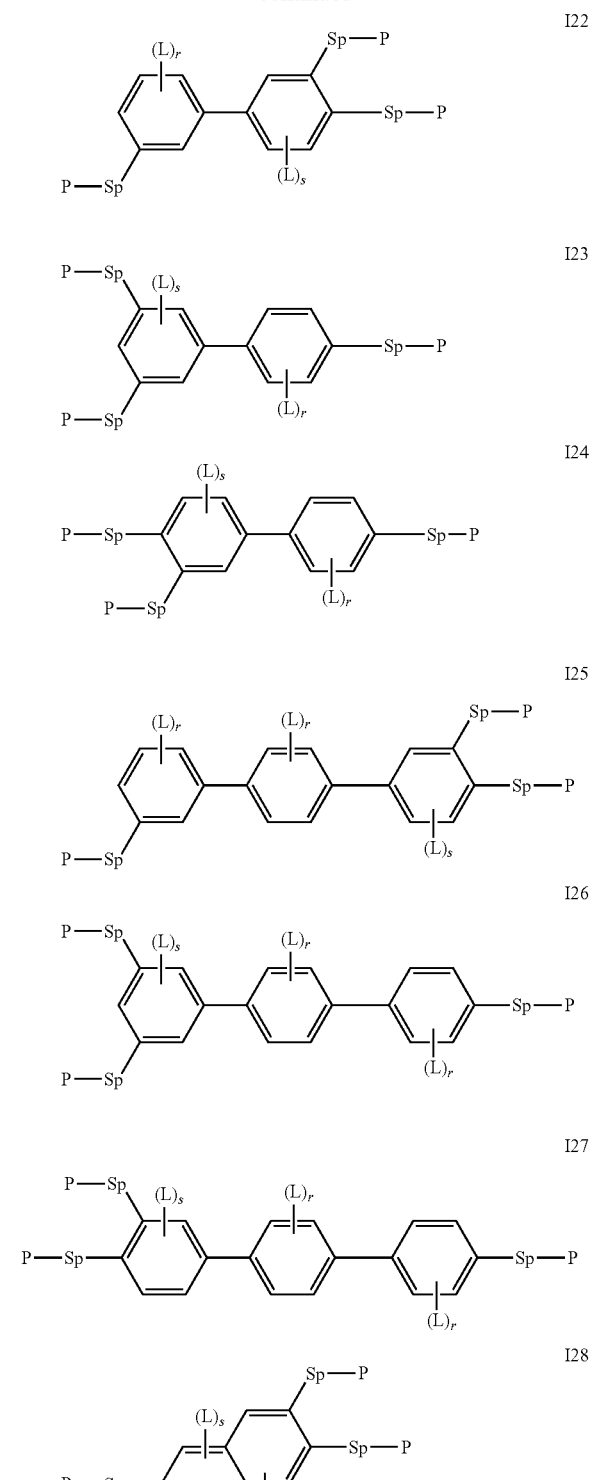

in which R, P and Sp on each occurrence, identically or differently, have the above-mentioned meanings, and R preferably denotes P-Sp, L has one of the meanings indicated above and below, r is 0, 1, 2, 3 or 4, and s is 0, 1, 2 or 3.

Particular preference is given to compounds of the formulae I1-I20 which have at least one substituent L which denotes P-Sp- in the ortho- or meta-position to the group P-Sp and/or R. Particular preference is given to compounds of this type in which R denotes P-Sp-. Preference is furthermore given to compounds of this type in which at least one, preferably two, of the radicals Sp denotes a single bond and at least one, preferably precisely one, of the radicals Sp denotes a spacer group. Particularly preferred compounds of this type are selected from the following subformulae:

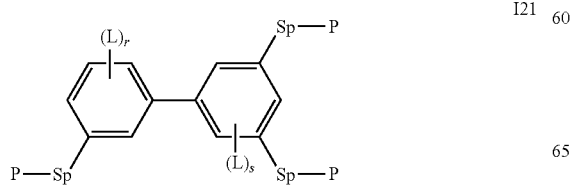

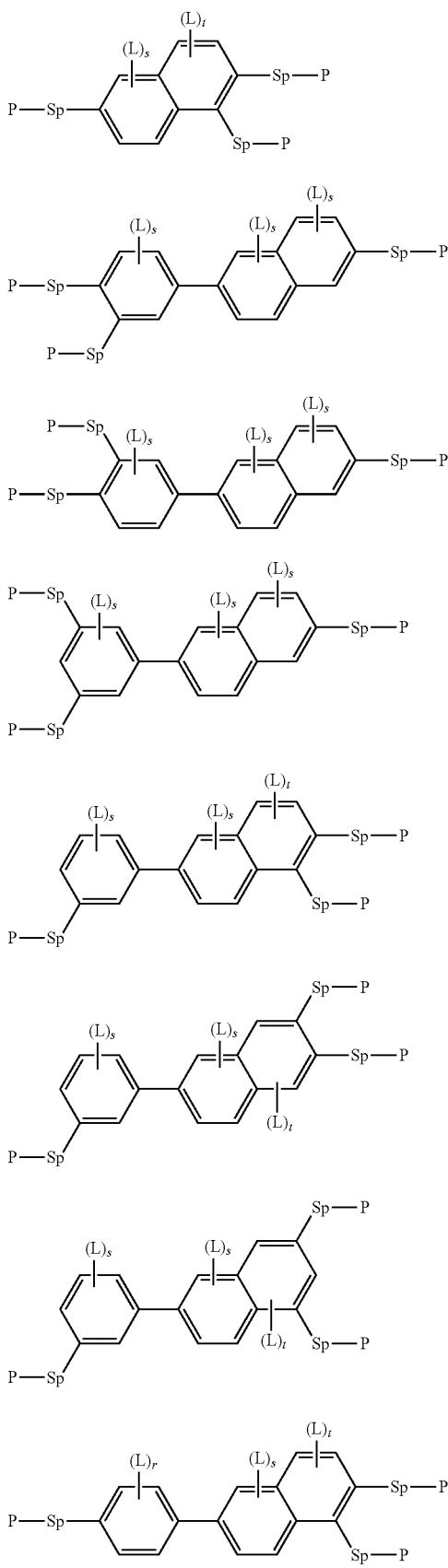

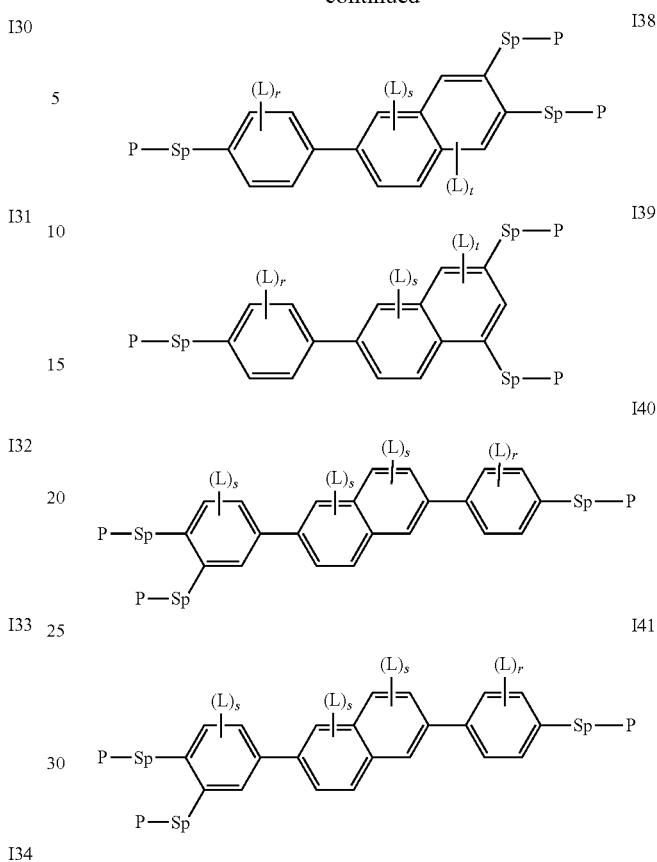

in which R, P and Sp on each occurrence, identically or differently, have the above-mentioned meanings, and R preferably denotes P-Sp, L has one of the meanings other than P-Sp indicated above and below, r is 0, 1, 2, 3 or 4, s is 0, 1, 2 or 3, and t is 0, 1 or 2.

Above and below, the following meanings apply:

Unless indicated otherwise, the term "PSA" is used to represent PS displays and PSA displays.

The term "mesogenic group" is known to the person skilled in the art and is described in the literature, and denotes a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in Pure Appl. Chem. 73(5), 888 (2001) and C. Tschierske, G. Pelzl, S. Diele, Angew. Chem. 2004, 116, 6340-6368.

The term "spacer group", also referred to as "Sp" above and below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless indicated otherwise, the term "spacer group" or "spacer" above and below denotes a flexible group which connects the mesogenic group and the polymerisable group(s) to one another in a polymerisable mesogenic compound ("RM").

The term "reactive mesogen" or "RM" denotes a compound containing a mesogenic group and one or more functional groups which are suitable for polymerisation (also known as polymerisable group or group P).

The terms "low-molecular-weight compound" and "unpolymerisable compound" denote compounds, usually monomeric, which do not contain any functional group which is suitable for polymerisation under the usual conditions known to the person skilled in the art, in particular under the conditions used for the polymerisation of the RMs.

The term "organic group" denotes a carbon or hydrocarbon group.

The term "carbon group" denotes a mono- or polyvalent organic group containing at least one carbon atom which either contains no further atoms (such as, for example, —C≡C—) or optionally contains one or more further atoms, such as, for example, N, O, S, P, Si, Se, As, Te or Ge (for example carbonyl, etc.). The term "hydrocarbon group" denotes a carbon group which additionally contains one or more H atoms and optionally one or more heteroatoms, such as, for example, N, O, S, P, Si, Se, As, Te or Ge.

"Halogen" denotes F, Cl, Br or I.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also have spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" in accordance with the above definition containing one or more heteroatoms.

Preferred carbon and hydrocarbon groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18 C atoms, optionally substituted aryl or aryloxy having 6 to 40, preferably 6 to 25 C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25 C atoms.

Further preferred carbon and hydrocarbon groups are $C_1$-$C_{40}$ alkyl, $C_2$-$C_{40}$ alkenyl, $C_2$-$C_{40}$ alkynyl, $C_3$-$C_{40}$ alkyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ alkyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbon and hydrocarbon groups are straight-chain, branched or cyclic alkyl radicals having 1 to 40, preferably 1 to 25 C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms or an optionally substituted heteroaryl or heteroaryloxy group having 5 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptyloxy, n-octyloxy, n-nonyloxy, n-decyloxy, n-undecyloxy, n-dodecyloxy, etc.

Preferred amino groups are, for example, dimethylamino, methylamino, methylphenylamino, phenylamino, etc.

Aryl and heteroaryl groups can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 2 to 25 C atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups.

The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those which contain exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms, which optionally contain fused rings and are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, carbon and hydrocarbon radicals optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" below, are, for example, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, in which $R^x$ has the above-mentioned meaning, and $Y^1$ denotes halogen, optionally substituted silyl or aryl having 6 to 40, preferably 6 to 20 C atoms, and straight-chain or branched alkyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, $R^0$, —$OR^0$, —CO—$R^0$, —CO—O—$R^0$, —O—CO—$R^0$ or —O—CO—O—$R^0$, in which $R^0$ has the above-mentioned meaning.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

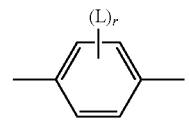

is preferably

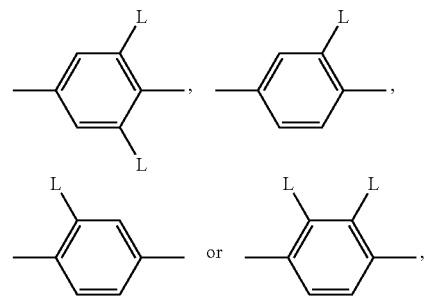

in which L has one of the above-mentioned meanings.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or C≡C triple bond, and groups which are suitable for polymerisation with ring opening, such as, for example, oxetane or epoxide groups.

Preferred groups P are selected from $CH_2$=$CW^1$—COO—, $CH_2$=$CW^1$—CO—,

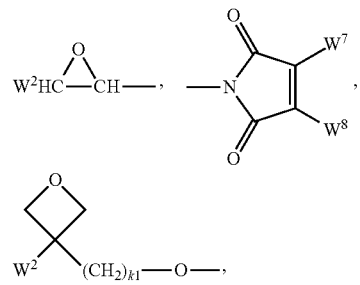

$CH_2$=$CW^2$—(O)$_{k3}$—, $CW^1$=CH—CO—(O)$_{k3}$—, $CW^1$=CH—CO—NH—, $CH_2$=$CW^1$—CO—NH—, $CH_3$—CH=CH—O—, ($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—, HO—$CW^2W^3$—, HS—$CW^2W^3$—, $HW^2$N—, HO—$CW^2W^3$—NH—, $CH_2$=$CW^1$—CO—NH—, $CH_2$=CH—(COO)$_{k1}$-Phe-(O)$_{k2}$—, $CH_2$=CH—(CO)$_{k1}$-Phe-(O)$_{k2}$—, Phe-CH=CH—, HOOC—, OCN— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above, and $k_1$, $k_2$ and $k_3$ each, independently of one another, denote 0 or 1, $k_3$ preferably denotes 1.

Particularly preferred groups P are $CH_2$=CH—COO—, $CH_2$=C($CH_3$)—COO—, $CH_2$=CH—, $CH_2$=CH—O—, ($CH_2$=CH)$_2$CH—OCO—, ($CH_2$=CH)$_2$CH—O—,

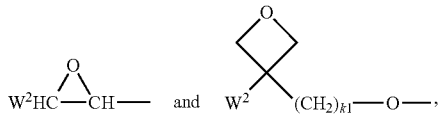

in particular vinyloxy, acrylate, methacrylate, fluoroacrylate, chloroacrylate, oxetane and epoxide.

In a further preferred embodiment of the invention, the compounds of the formula I and sub-formulae thereof contain one or more branched radicals $R^a$ and/or $R^b$ and/or L containing two or more polymerisable groups P (multifunctional polymerisable radicals). Suitable radicals of this type, and polymerisable compounds containing them, are described, for example, in U.S. Pat. No. 7,060,200 B1 or US 2006/0172090 A1. Particular preference is given to multifunctional polymerisable radicals selected from the following formulae:

—X-alkyl-$CHP^1$—$CH_2$—$CH_2P^2$    I*a

—X-alkyl-$C(CH_2P^1)(CH_2P^2)$—$CH_2P^3$    I*b

—X-alkyl-$CHP^1CHP^2$—$CH_2P^3$    I*c

—X-alkyl-$C(CH_2P^1)(CH_2P^2)$—$C_{aa}H_{2aa+1}$    I*d

—X-alkyl-$CHP^1$—$CH_2P^2$    I*e

—X-alkyl-$CHP^1P^2$    I*f

—X-alkyl-$CP^1P^2$—$C_{aa}H_{2aa+1}$    I*g

—X-alkyl-$C(CH_2P^1)(CH_2P^2)$—$CH_2OCH_2$—$C(CH_2P^3)(CH_2P^4)CH_2P^5$    I*h

—X-alkyl-$CH((CH_2)_{aa}P^1)((CH_2)_{bb}P^2)$    I*i

—X-alkyl-$CHP^1CHP^2$—$C_{aa}H_{2aa+1}$    I*k in which alkyl denotes a single bond or straight-chain or branched alkylene having 1 to 12 C atoms, in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another, and in which, in addition, one or more H atoms may be replaced by F, Cl or CN, where $R^x$ has the above-mentioned meaning and preferably denotes $R^0$ as defined above, aa and bb each, independently of one another, denote 0, 1, 2, 3, 4, 5 or 6, X has one of the meanings indicated for X', and $P^{1-5}$ each, independently of one another, have one of the meanings indicated above for P.

Preferred spacer groups Sp are selected from the formula Sp'-X', so that the radical "P-Sp-" conforms to the formula "P-Sp'-X'-", where Sp' denotes alkylene having 1 to 20, preferably 1 to 12 C atoms, which is optionally mono- or polysubstituted by F, Cl, Br, I or CN and in which, in addition, one or more non-adjacent $CH_2$ groups may each be replaced, independently of one another, by —O—, —S—, —NH—, —$NR^0$—, —$SiR^0R^{00}$—, —CO—, —COO—, —COO—, —COO—O—, —S—CO—, —CO—S—, —$NR^0$—CO—O—, —O—CO—$NR^0$—, —$NR^0$—CO—$NR^0$—, —CH=CH— or —C≡C— in such a way that O and/or S atoms are not linked directly to one another, X' denotes —O—, —S—, —CO—, —COO—, —COO—, —O—COO—, —CO—$NR^0$—, —$NR^0$—CO—, —$NR^0$—CO—$NR^0$—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^0$—, —$CY^2$=$CY^3$—, —C≡C—, —CH=CH—COO—, —OCO—CH=CH— or a single bond, $R^0$ and $R^{00}$ each, independently of one another, denote H or alkyl having 1 to 12 C atoms, and $Y^2$ and $Y^3$ each, independently of one another, denote H, F, Cl or CN.

X' is preferably —O—, —S—, —CO—, —COO—, —COO—, —O—COO—, —CO—$NR^0$—, —$NR^0$—CO—, —$NR^0$—CO—$NR^0$— or a single bond.

Typical spacer groups Sp' are, for example, —$(CH_2)_{p1}$—, —$(CH_2CH_2O)_{q1}$—$CH_2CH_2$—, —$CH_2CH_2$—S—$CH_2CH_2$—, —$CH_2CH_2$—NH—$CH_2CH_2$— or —$(SiR^0R^{00}$—$O)_{p1}$—, in which p1 is an integer from 1 to 12, q1 is an integer from 1 to 3, and $R^0$ and $R^{00}$ have the above-mentioned meanings.

Particularly preferred groups —X'-Sp'- are —$(CH_2)_{p1}$—, —O—$(CH_2)_{p1}$—, —COO—$(CH_2)_{p1}$—, —OCOO—$(CH_2)_{p1}$.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

The polymerisable compounds are prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart. The synthesis of polymerisable acrylates and methacrylates of the formula I can be carried out analogously to the methods described in U.S. Pat. No. 5,723,066. Further, particularly preferred methods are given in the examples.

In the simplest case, the synthesis is carried out by esterification or etherification of commercially available diols of the general formula HO-$A^1$-$Z^1$-$(A^2$-$Z^2)_{m1}$-$A^3$-OH, in which $A^{1-3}$, $Z^{1-3}$, $Z^{1,2}$ and m1 have the above-mentioned meanings, such as, for example, 1-(3-hydroxyphenyl)phenyl-3-ol, using corresponding acids, acid derivatives, or halogenated compounds containing a group P, such as, for example, (meth)acryloyl chloride or (meth)-acrylic acid, in the presence of a dehydrating reagent, such as, for example, DCC (dicyclohexylcarbodiimide).

The polymerisable compounds are polymerised or crosslinked (if a compound contains two or more polymerisable groups) by in-situ polymerisation in the LC medium between the substrates of the LC display with application of a voltage. Suitable and preferred polymerisation methods are, for example, thermal or photopolymerisation, preferably photopolymerisation, in particular UV photopolymerisation. If necessary, one or more initiators may also be added here. Suitable conditions for the polymerisation, and suitable types and amounts of initiators, are known to the person skilled in the the art and are described in the literature. Suitable for free-radical polymerisation are, for example, the commercially available photoinitiators Irgacure651®, Irgacure184®, Irgacure907®, Irgacure369® or Darocure1173® (Ciba AG). If an initiator is employed, its proportion in the mixture as a whole is preferably 0.001 to 5% by weight, particularly preferably 0.001 to 1% by weight. However, the polymerisation can also take place without addition of an initiator. In a further preferred embodiment, the LC medium does not comprise a polymerisation initiator.

The polymerisable component A) or the LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers of the Irganox® series (Ciba AG). If stabilisers are employed, their proportion, based on the total amount of RMs or polymerisable component A), is preferably 10-5000 ppm, particularly preferably 50-500 ppm.

The polymerisable compounds according to the invention are particularly suitable for polymerisation without initiator, which is associated with considerable advantages, such as, for example, lower material costs and in particular less contamination of the LC medium by possible residual amounts of the initiator or degradation products thereof.

The LC media according to the invention preferably comprise <5%, particularly preferably <1%, very particularly preferably <0.5%, of polymerisable compounds, in particular polymerisable compounds of the above-mentioned formulae.

The polymerisable compounds according to the invention can be added individually to the LC media, but it is also possible to use mixtures comprising two or more polymerisable compounds according to the invention or mixtures comprising one or more polymerisable compounds according to the invention and one or more additional polymerisable compounds (comonomers). The comonomers can be mesogenic or non-mesogenic. On polymerisation of mixtures of this type, copolymers are formed. The invention furthermore relates to the polymerisable mixtures mentioned above and below.

Suitable and preferred mesogenic comonomers are, for example, those selected from the following formulae:

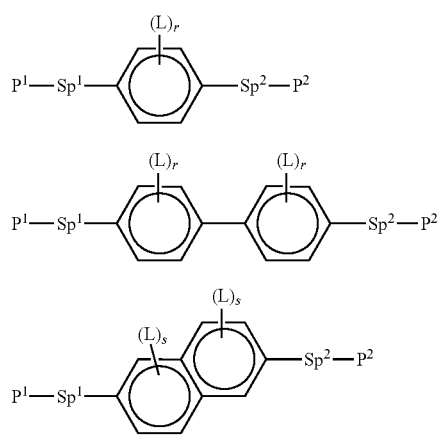

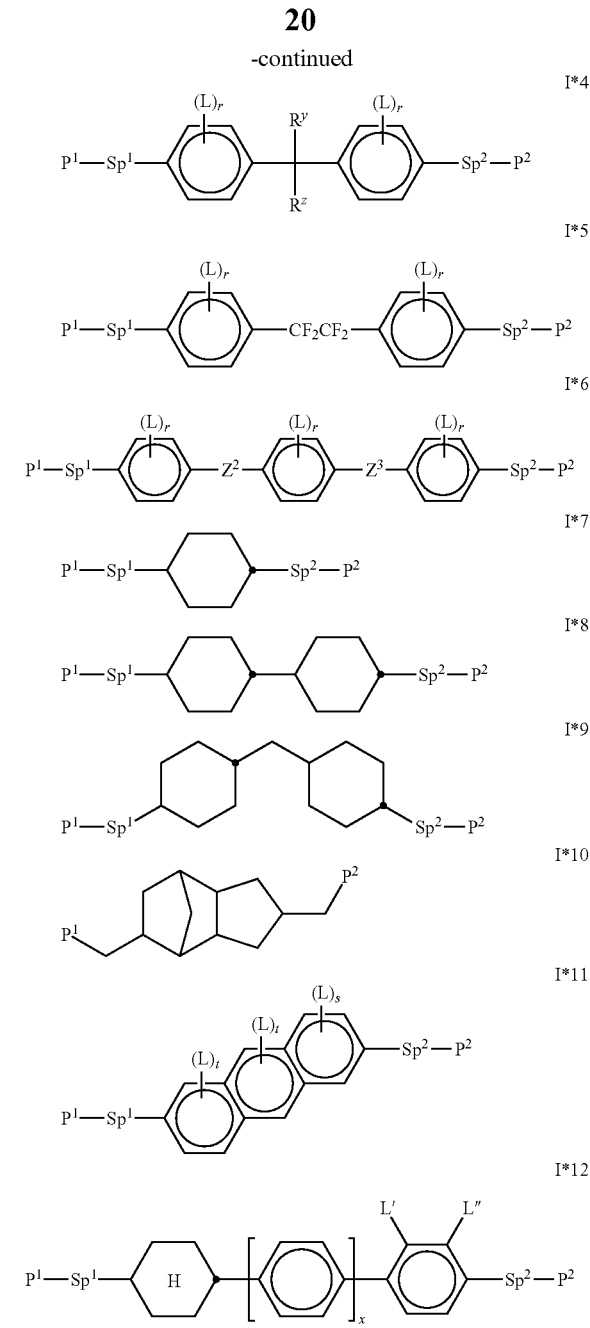

in which
P$^1$ and P$^2$ have one of the meanings indicated for P and preferably denote acrylate or methacrylate,
Sp$^1$ and Sp$^2$ have one of the meanings indicated for Sp or denote a single bond,
Z$^2$ and Z$^3$ each, independently of one another, denote —COO— or —OCO—,
L denotes P-Sp-, F, Cl, Br, I, —CN, —NO$_2$, —NCO, —NCS, —OCN, —SCN, —C(=O)N(R$^x$)$_2$, —C(=O)Y', —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl or P-Sp-,
L' and L" each, independently of one another, denote H, F or Cl, r denotes 0, 1, 2, 3 or 4,
s denotes 0, 1, 2 or 3,
t denotes 0, 1 or 2,
x denotes 0 or 1, and
$R^y$ and $R^z$ each, independently of one another, denote H or $CH_3$.

Besides the polymerisable compounds described above, the LC media for use in the LC displays according to the invention comprise an LC mixture ("host mixture") comprising one or more, preferably two or more, low-molecular-weight (i.e. monomeric or unpolymerised) compounds. The latter are stable or unreactive to a polymerisation reaction under the conditions used for the polymerisation of the polymerisable compounds. In principle, any LC mixture which is suitable for use in conventional VA and OCB displays is suitable as host mixture. Suitable LC mixtures are known to the person skilled in the art and are described in the literature, for example mixtures in VA displays are described in EP 1 378 557 A1 and mixtures for OCB displays are described in EP 1 306 418 A1 and DE 102 24 046 A1.

Particularly preferred host mixtures and LC media are indicated below:

a) LC medium which comprises one or more compounds selected from the following formulae:

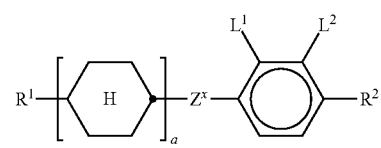

CY

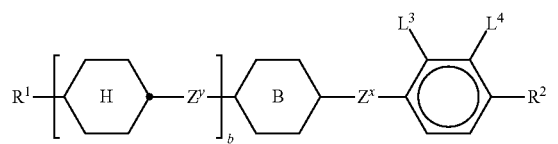

PY in which the individual radicals have the following meanings:

a denotes 1 or 2,
b denotes 0 or 1,

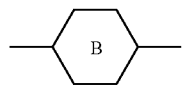

denotes

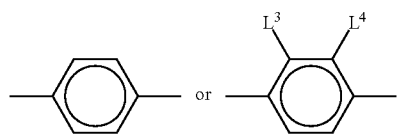

$R^1$ and $R^2$ each, independently of one another, denote alkyl having 1 to 12 C atoms, in which, in addition, one or two non-adjacent $CH_2$ groups may be replaced by —O—, —CH=CH—, —CO—, —OCO— or —COO— in such a way that O atoms are not linked directly to one another, preferably alkyl or alkoxy having 1 to 6 C atoms, $Z^x$ and $Z_y$ each, independently of one another, denote —$CH_2CH_2$—, —CH=CH—, —$CF_2O$—, —$OCF_2$—, —$CH_2O$—, —$OCH_2$—, —COO—, —OCO—, —$C_2F_4$—, —CF=CF—, —CH=$CHCH_2O$— or a single bond, preferably a single bond, $L^{1-4}$ each, independently of one another, denote F, Cl, $OCF_3$, $CF_3$, $CH_3$, $CH_2F$, $CHF_2$.

Preferably, both radicals $L^1$ and $L^2$ denote F, or one of the radicals $L^1$ and $L^2$ denotes F and the other denotes Cl, or both radicals $L^3$ and $L^4$ denote F, or one of the radicals $L^3$ and $L^4$ denotes F and the other denotes Cl.

The compounds of the formula CY are preferably selected from the following sub-formulae:

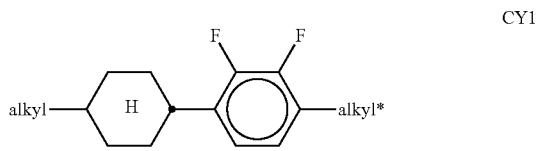

CY1

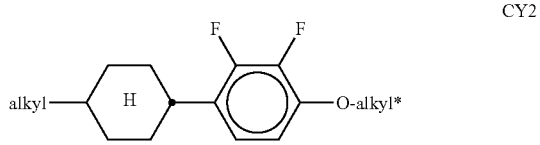

CY2

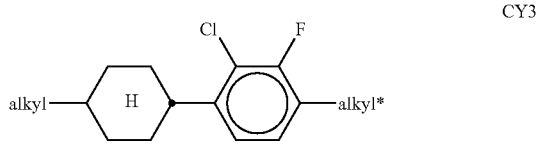

CY3

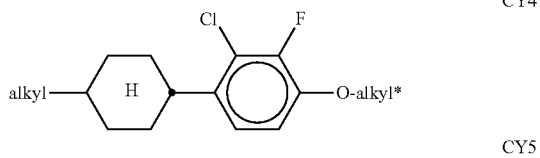

CY4

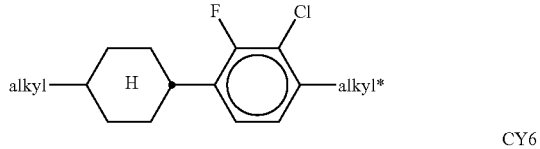

CY5

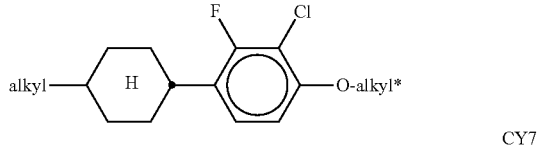

CY6

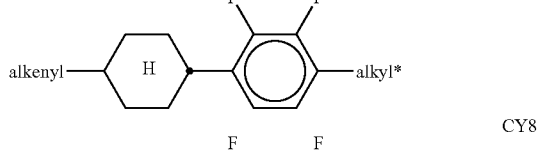

CY7

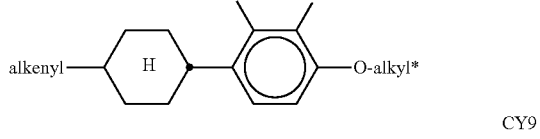

CY8

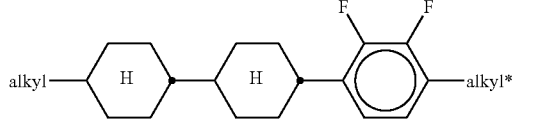

CY9

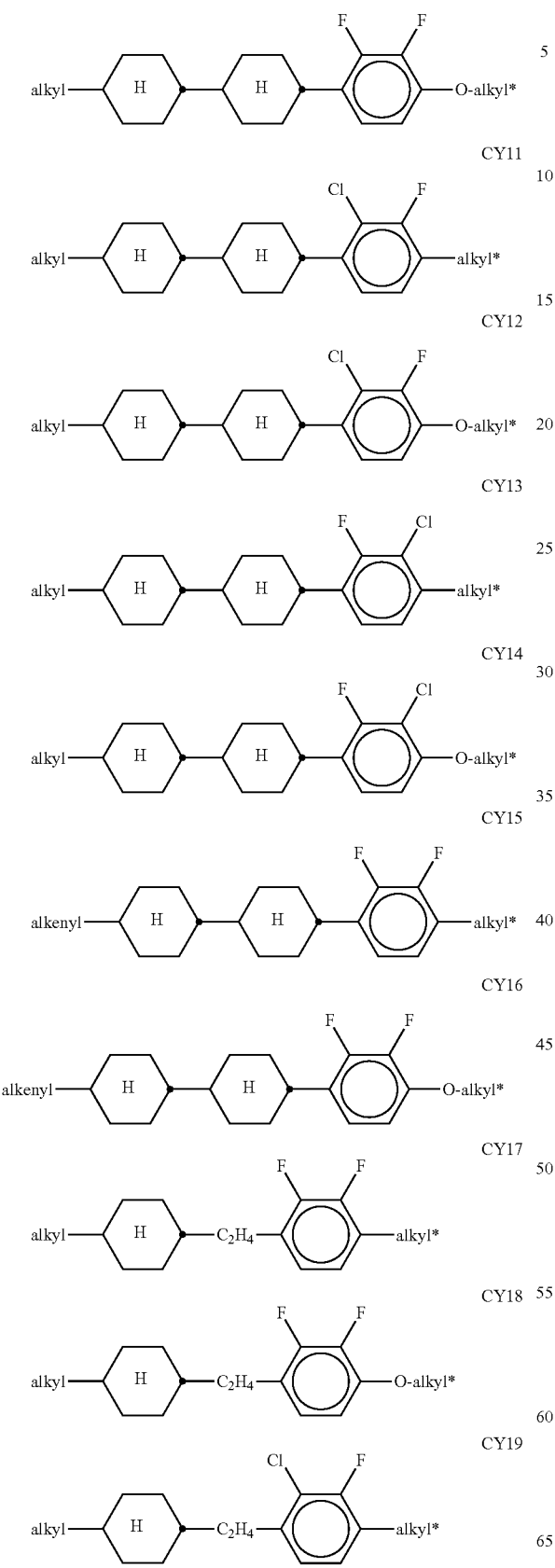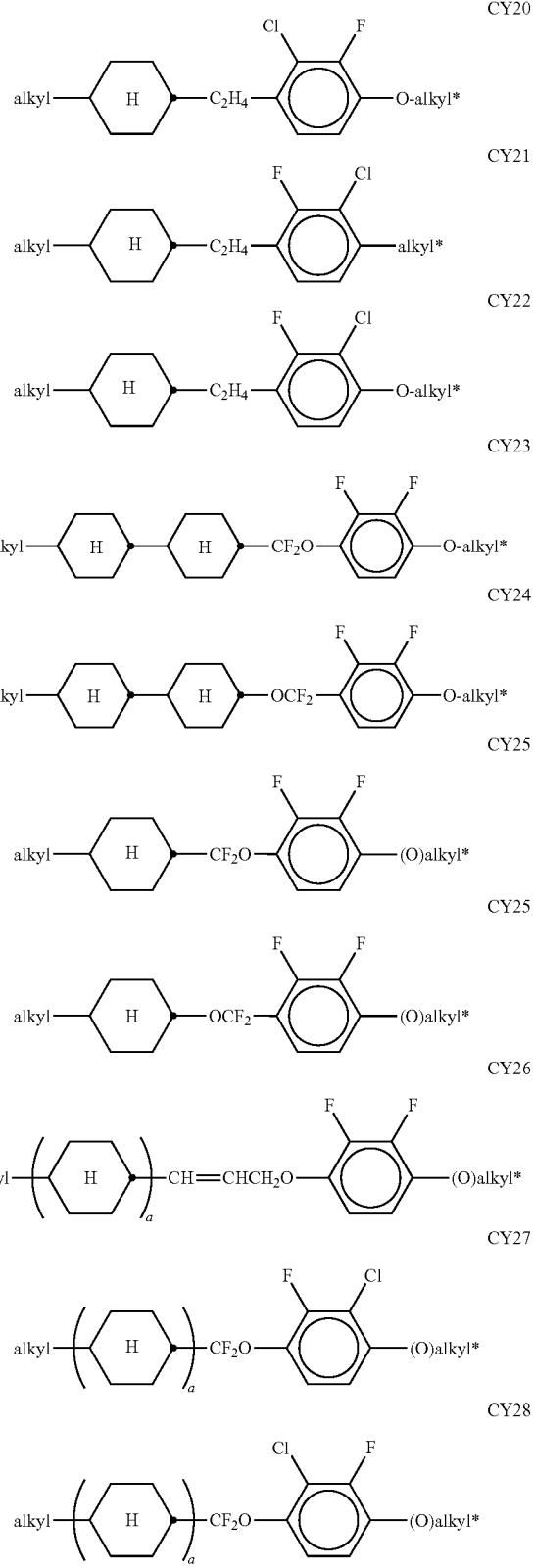
in which a denotes 1 or 2, alkyl and alkyl* each, independently of one another, denote a straight-chain alkyl radical having 1-6 C atoms, and alkenyl denotes a straight-chain alkenyl radical having 2-6 C atoms. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

The compounds of the formula PY are preferably selected from the following sub-formulae:

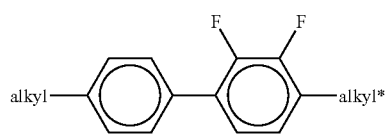
PY1

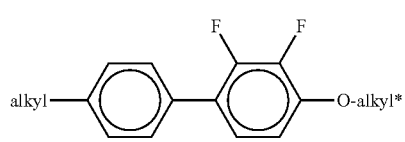
PY2

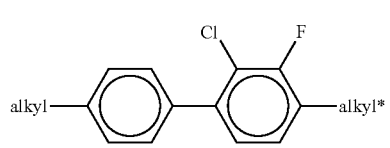
PY3

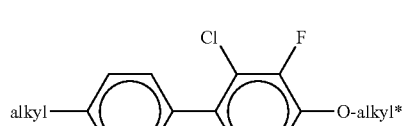
PY4

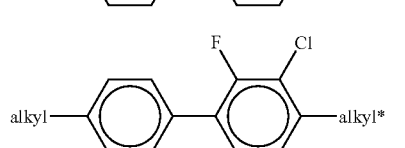
PY5

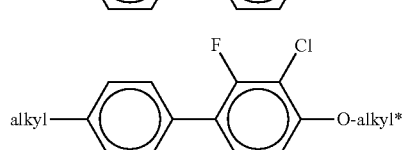
PY6

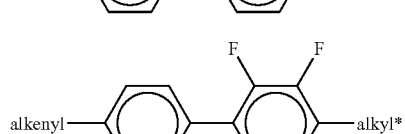
PY7

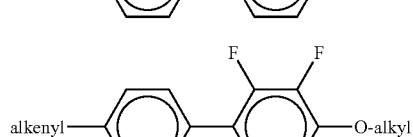
PY8

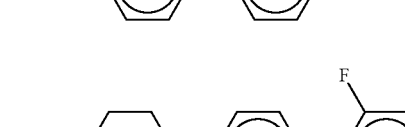
PY9

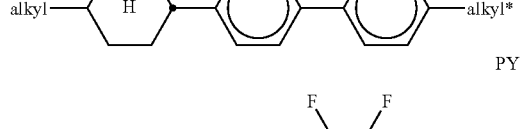
PY10

-continued

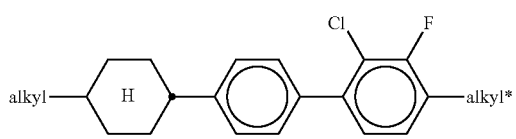
PY11

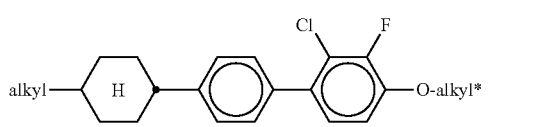
PY12

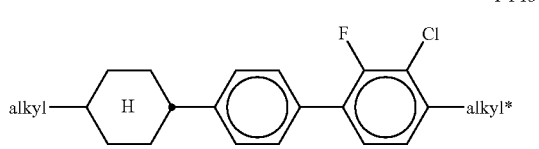
PY13

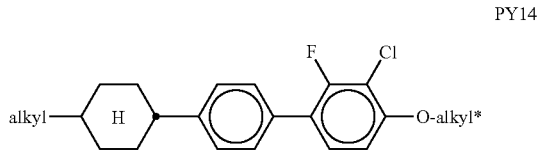
PY14

PY15

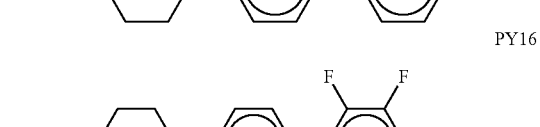
PY16

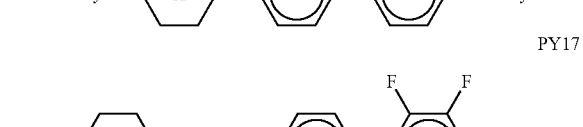
PY17

PY18

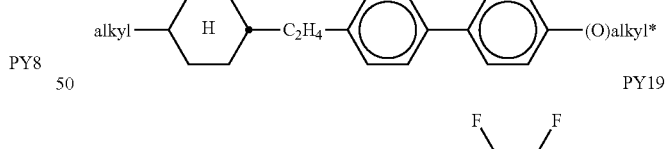
PY19

PY20 in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

b) LC medium which additionally comprises one or more compounds of the following formula:

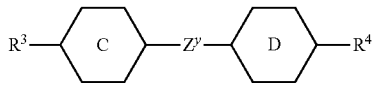

ZK in which the individual radicals have the following meanings:

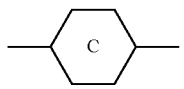

denotes

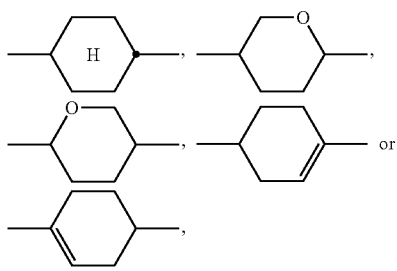

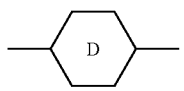

denotes

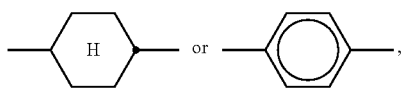

R$^3$ and R$^4$ each, independently of one another, denote alkyl having 1 to 12 C atoms, in which, in addition, one or two non-adjacent CH$_2$ groups may be replaced by —O—, —CH=CH—, —CO—, —OCO— or —COO— in such a way that O atoms are not linked directly to one another, Z$^y$ denotes —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, —CH=CHCH$_2$O— or a single bond, preferably a single bond.

The compounds of the formula ZK are preferably selected from the following sub-formulae:

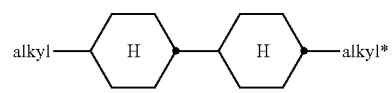
ZK1

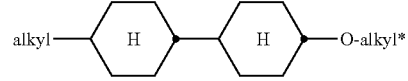
ZK2

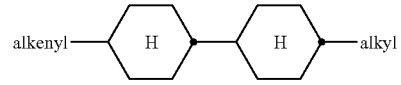
ZK3

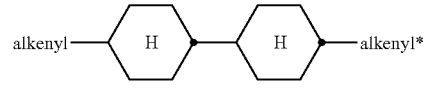
ZK4

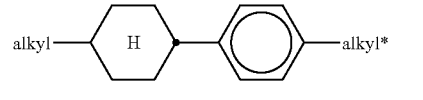
ZK5

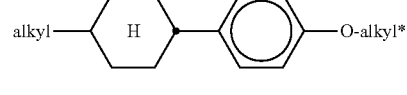
ZK6

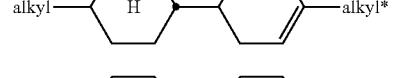
ZK7

ZK8

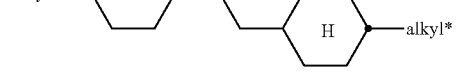
ZK9

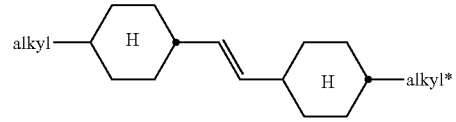
ZK10 in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

c) LC medium which additionally comprises one or more compounds of the following formula:

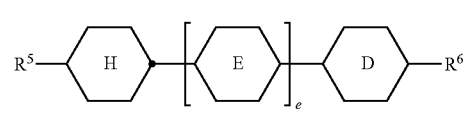
DK in which the individual radicals have on each occurrence, identically or differently, the following meanings:

R⁵ and R⁶ each, independently of one another, have one of the meanings indicated above for R¹,

denotes

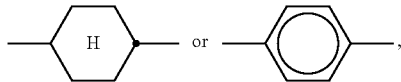

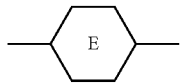

denotes

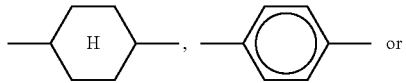
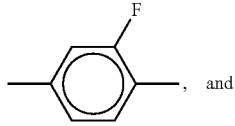

and e denotes 1 or 2.

The compounds of the formula DK are preferably selected from the following sub-formulae:

DK1

DK2

DK3

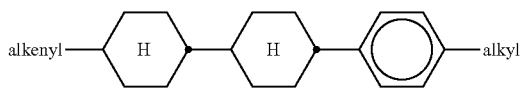
DK4

DK5

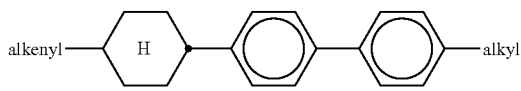

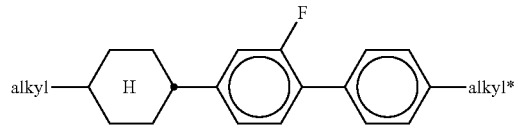
DK6

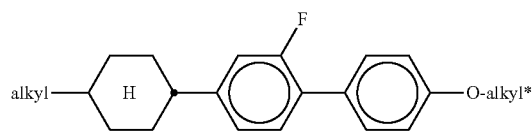
DK7

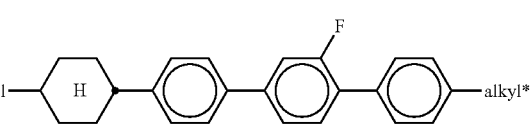
DK8

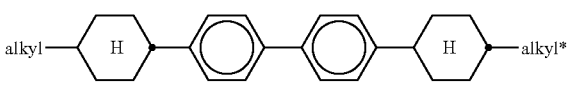
DK9

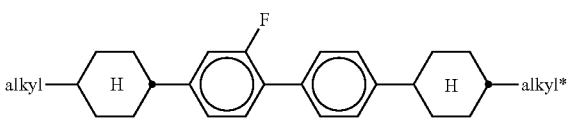
DK10 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

d) LC medium which additionally comprises one or more compounds of the following formula:

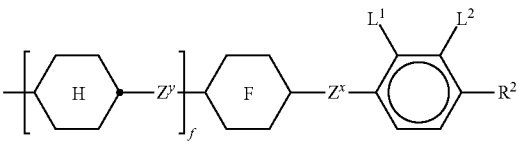
LY in which the individual radicals have the following meanings:

denotes

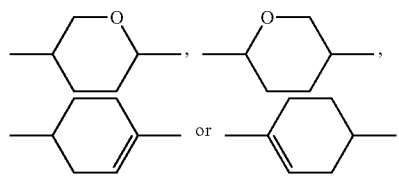

f denotes 0 or 1,
$R^1$ and $R^2$ each, independently of one another, denote alkyl having 1 to 12 C atoms, in which, in addition, one or two non-adjacent $CH_2$ groups may be replaced by —O—, —CH=CH—, —CO—, —COO— or —COO— in such a way that O atoms are not linked directly to one another,
$Z^x$ and $Z^y$ each, independently of one another, denote —$CH_2CH_2$—, —CH=CH—, —$CF_2O$—, —$OCF_2$—, —$CH_2O$—, —$OCH_2$—, —COO—, —COO—, —$C_2F_4$—, —CF=CF—, —$CHCH_2O$— or a single bond, preferably a single bond,
$L^1$ and $L^2$ each, independently of one another, denote F, Cl, $OCF_3$, $CF_3$, $CH_3$, $CH_2F$, $CHF_2$.
Preferably, both radicals $L^1$ and $L^2$ denote F or one of the radicals $L^1$ and $L^2$ denotes F and the other denotes Cl.
The compounds of the formula LY are preferably selected from the following sub-formulae:

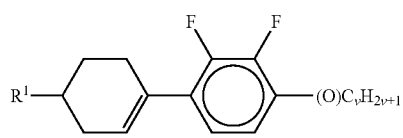
LY1

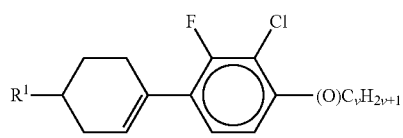
LY2

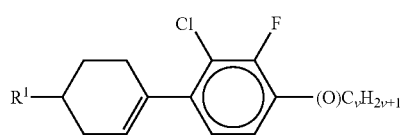
LY3

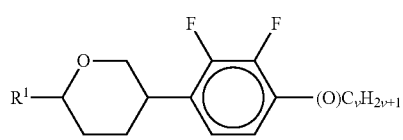
LY4

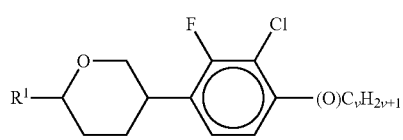
LY5

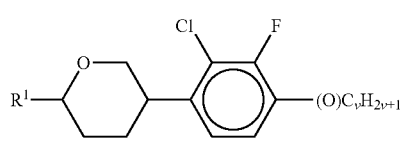
LY6

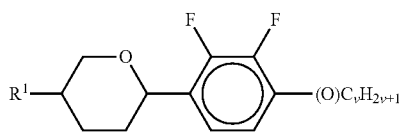
LY7

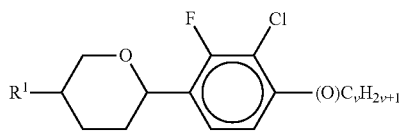
LY8

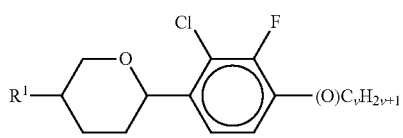
LY9

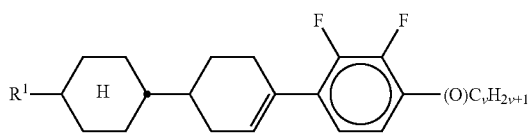
LY10

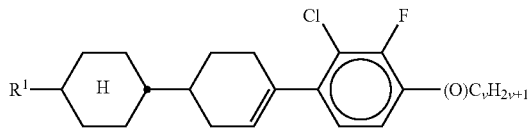
LY11

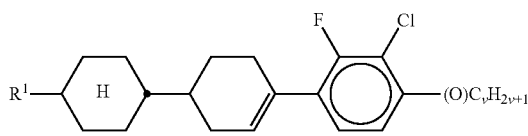
LY12

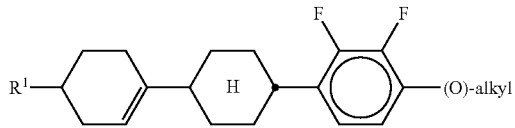
LY13

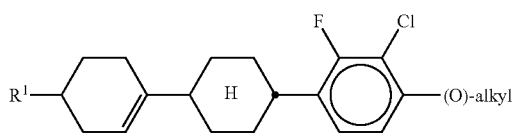
LY14

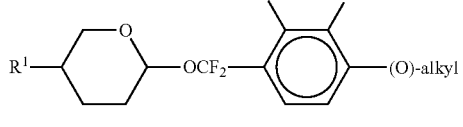
LY15

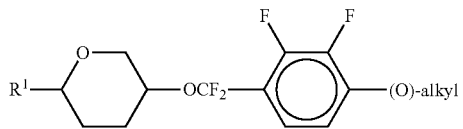
LY16

-continued

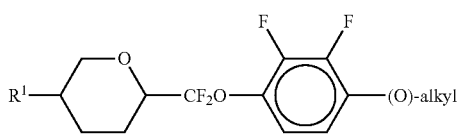
LY17

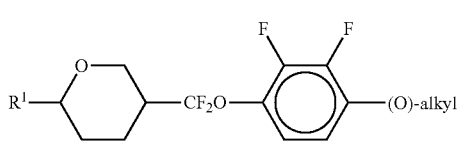
LY18 in which R¹ has the above-mentioned meaning, and v denotes an integer from 1 to 6. R¹ preferably denotes straight-chain alkyl or alkenyl, in particular CH₃, C₂H₅, n-C₃H₇, n-C₄H₉, n-C₅H₁₁, CH₂=CH—, CH₂=CHCH₂CH₂—, CH₃—CH=CH—, CH₃—CH₂—CH=CH—, CH₃—(CH₂)₂—CH=CH—, CH₃—(CH₂)₃—CH=CH— or CH₃—CH=CH—(CH₂)₂—.

e) LC medium which additionally comprises one or more compounds selected from the following formulae:

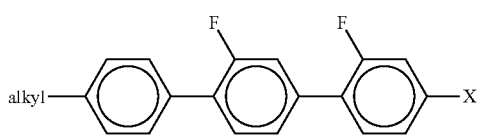
G1

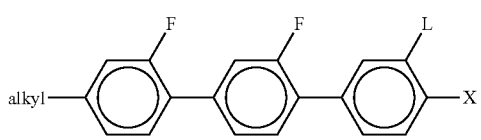
G1

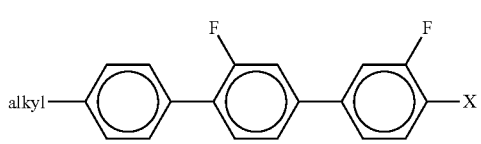
G3

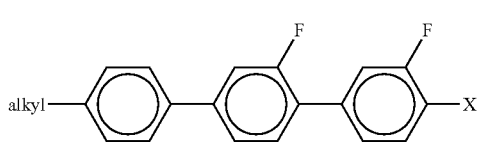
G4 in which alkyl denotes C₁₋₆-alkyl, L denotes H or F, and X denotes F, Cl, OCF₃, OCHF₂ or OCH=CF₂. Particular preference is given to compounds of the formula G1 in which X denotes F.

f) LC medium which additionally comprises one or more compounds selected from the following formulae:

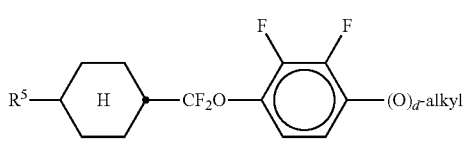
Y1

-continued

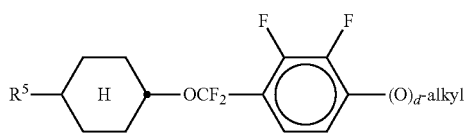
Y2

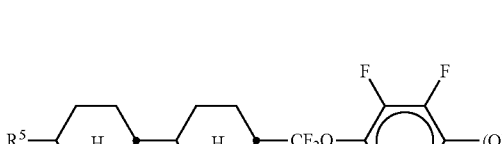
Y3

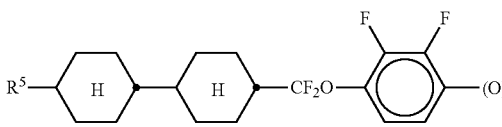
Y4

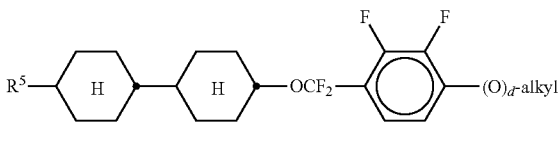
Y5

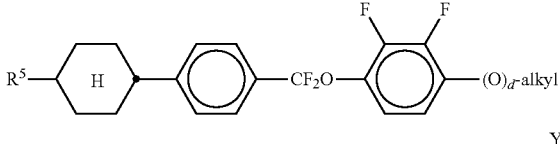
Y6

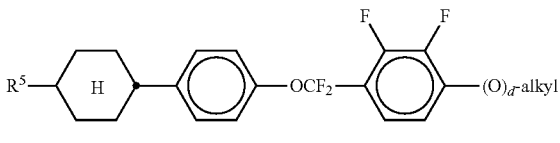
Y7

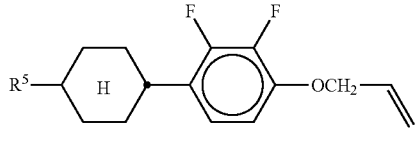
Y8

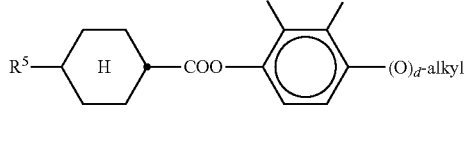
Y9

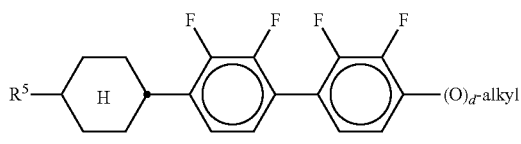
Y10

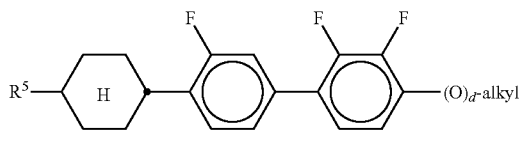
Y11

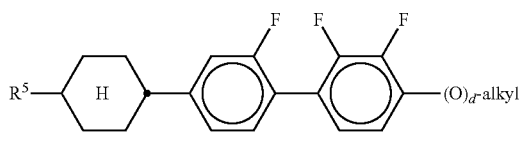

-continued

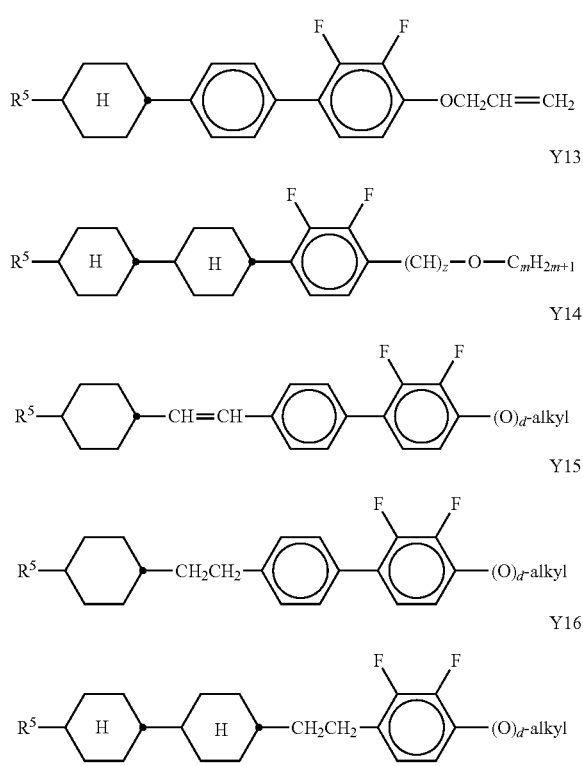

in which R⁵ has one of the meanings indicated above for R¹, alkyl denotes $C_{1-6}$-alkyl, d denotes 0 or 1, and z and m each, independently of one another, denote an integer from 1 to 6. R⁵ in these compounds is particularly preferably $C_{1-6}$-alkyl or -alkoxy or $C_{2-6}$-alkenyl, d is preferably 1. The LC medium according to the invention preferably comprises one or more compounds of the abovementioned formulae in amounts of ≧5% by weight.

g) LC medium which additionally comprises one or more biphenyl compounds of the following formulae:

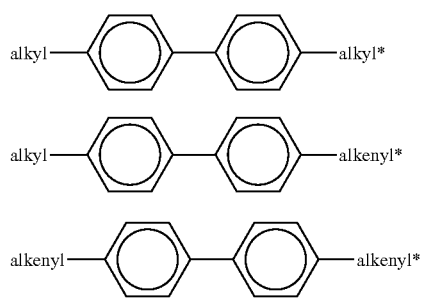

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The proportion of the biphenyls of the formulae B1 to B3 in the LC mixture is preferably at least 3% by weight, in particular ≧5% by weight.

The compounds of the formula B2 are particularly preferred.

The compounds of the formulae B1 to B3 are preferably selected from the following sub-formulae:

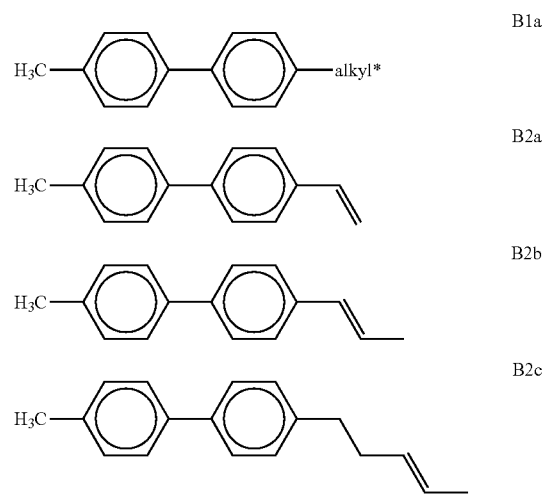

in which alkyl* denotes an alkyl radical having 1-6 C atoms. The medium according to the invention particularly preferably comprises one or more compounds of the formulae B1a and/or B2c.

h) LC medium which additionally comprises one or more terphenyl compounds of the following formula:

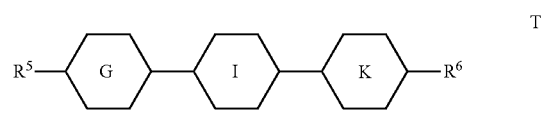

in which R⁵ and R⁶ each, independently of one another, have one of the meanings indicated above for R¹, and

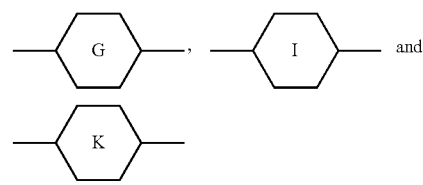

each, independently of one another, denote

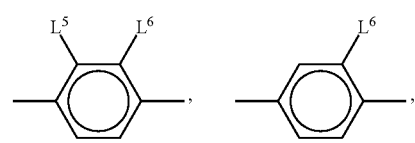

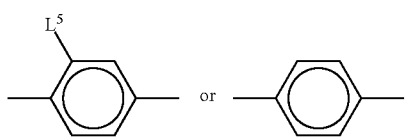
in which $L^5$ denotes F or Cl, preferably F, and $L^6$ denotes F, Cl, $OCF_3$, $CF_3$, $CH_3$, $CH_2F$ or $CHF_2$, preferably F.
The compounds of the formula T are preferably selected from the following sub-formulae:
T1
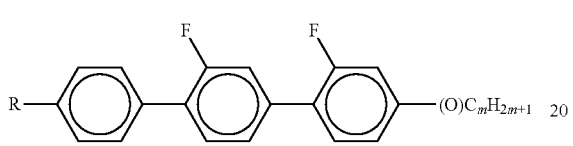
T2
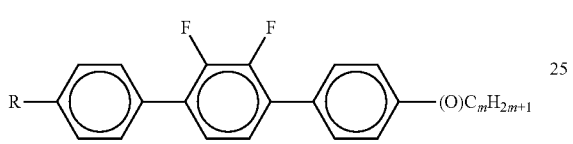
T3
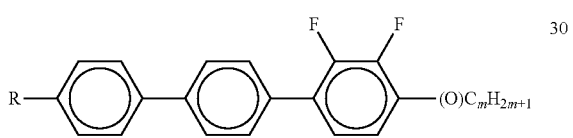
T4
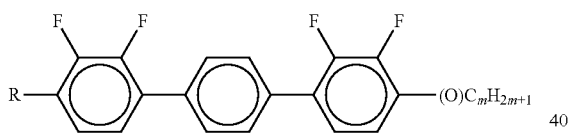
T5
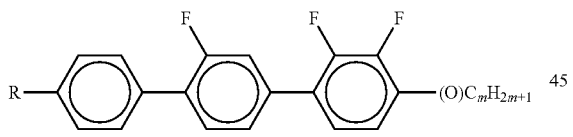
T6
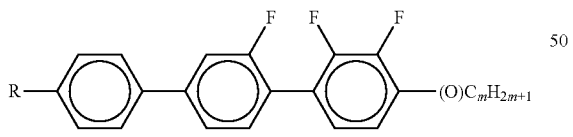
T7
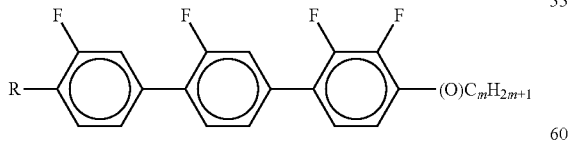
T8
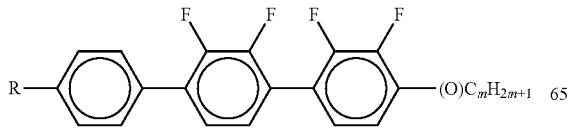
T9
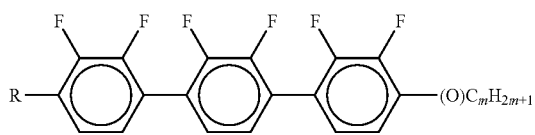
T10
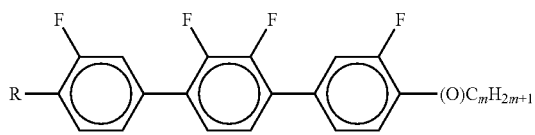
T11
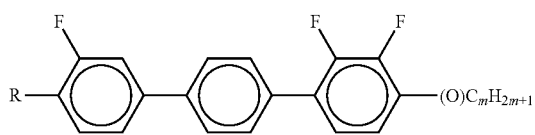
T12
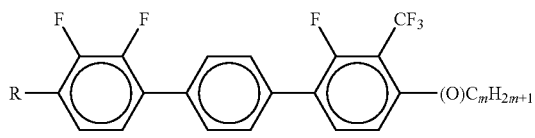
T13
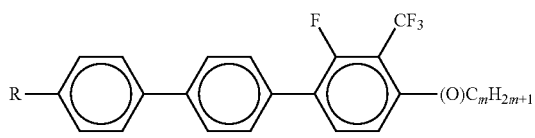
T14
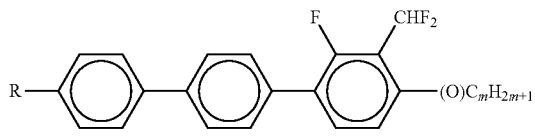
T15
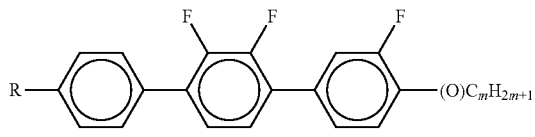
T16
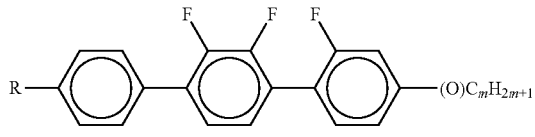
T17
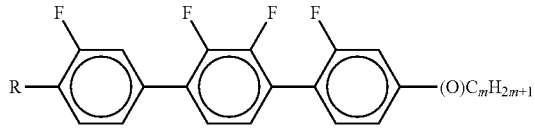
T18
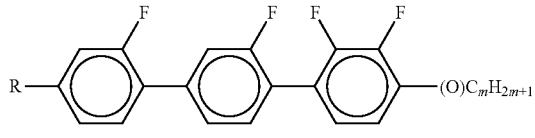

-continued

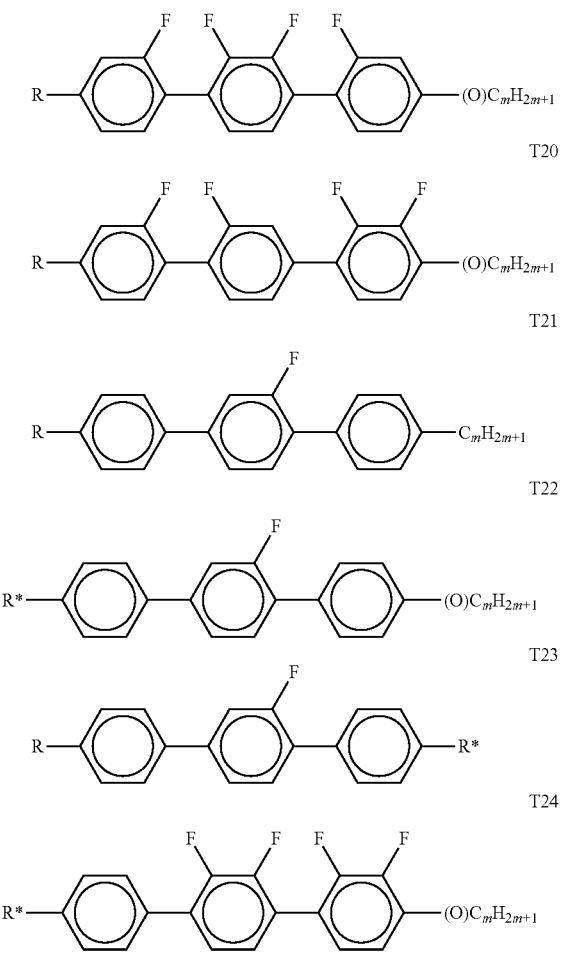

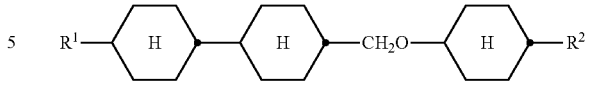

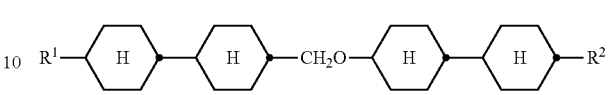

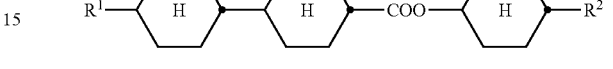

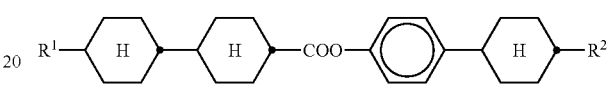

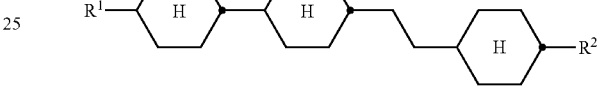

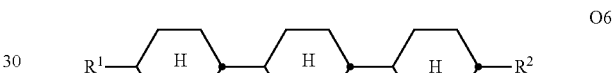

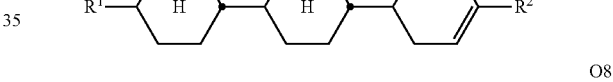

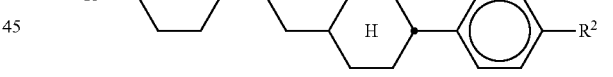

in which R denotes a straight-chain alkyl or alkoxy radical having 1-7 C atoms, R* denotes a straight-chain alkenyl radical having 2-7 C atoms, and m denotes an integer from 1 to 6. R* preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

R preferably denotes methyl, ethyl, propyl, butyl, pentyl, hexyl, methoxy, ethoxy, propoxy, butoxy or pentoxy.

The LC medium according to the invention preferably comprises the terphenyls of the formula T and preferred sub-formulae thereof in an amount of 2-30% by weight, in particular 5-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is to be ≧0.1. Preferred mixtures comprise 2-20% by weight of one or more terphenyl compounds of the formula T, preferably selected from the group of the compounds T1 to T22.

i) LC medium which additionally comprises one or more compounds of the following formulae:

in which $R^1$ and $R^2$ have the above-mentioned meanings and preferably each, independently of one another, denote straight-chain alkyl or alkenyl.

Preferred media comprise one or more compounds selected from the formulae O1, O3 and O4.

k) LC medium which additionally comprises one or more compounds of the following formula:

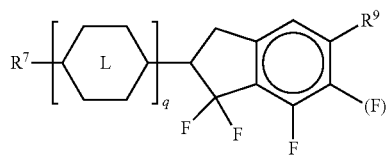

FI in which

denotes

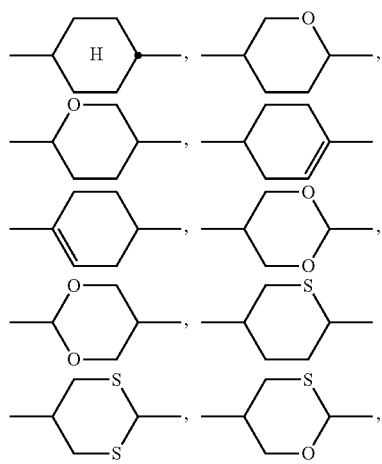

R⁹ denotes H, CH₃, C₂H₅ or n-C₃H₇, and q denotes 1, 2 or 3, and R⁷ has one of the meanings indicated for R¹, preferably in amounts of >3% by weight, in particular 5% by weight and very particularly preferably 5-30% by weight.

Particularly preferred compounds of the formula IF are selected from the following sub-formulae:

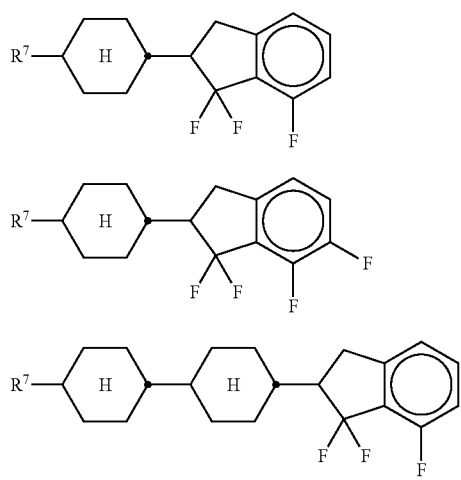

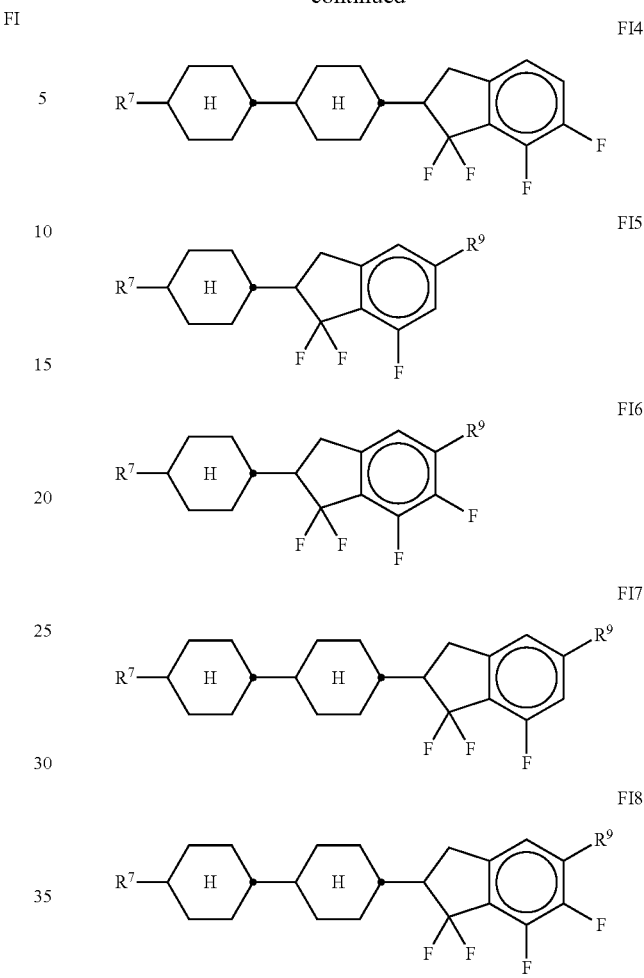

in which R⁷ preferably denotes straight-chain alkyl, and R⁹ denotes CH₃, C₂H₅ or n-C₃H₇. Particular preference is given to the compounds of the formulae FI1, FI2 and FI3.

m) LC medium which additionally comprises one or more compounds of the following formulae:

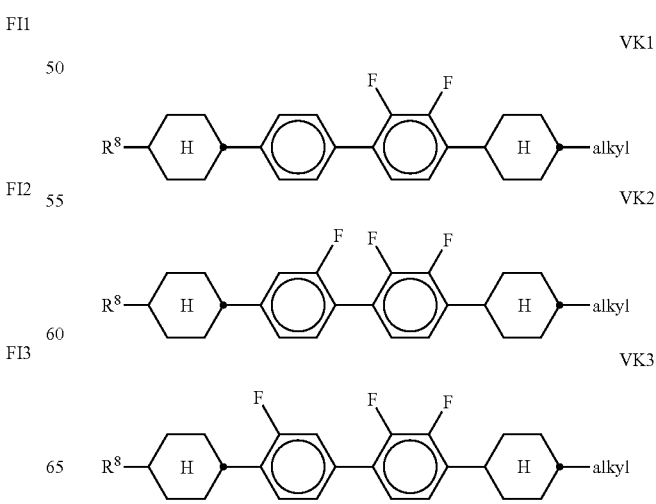

VK4

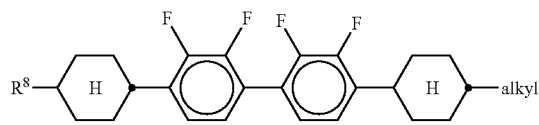

in which R⁸ has the meaning indicated for R¹, and alkyl denotes a straight-chain alkyl radical having 1-6 C atoms.

n) LC medium which additionally comprises one or more compounds which contain a tetrahydronaphthyl or naphthyl unit, such as, for example, the compounds selected from the following formulae:

N1

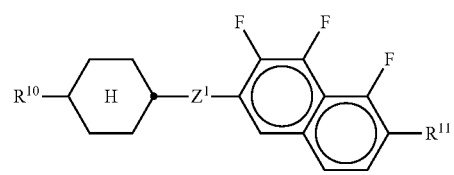

N2

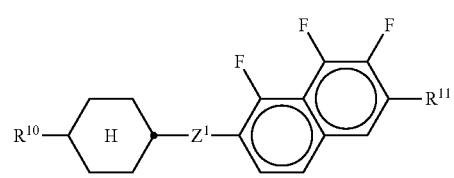

N3

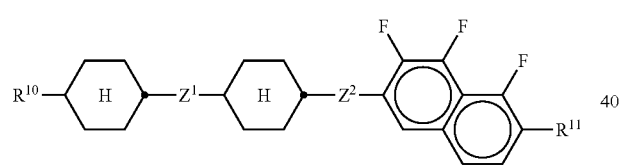

N4

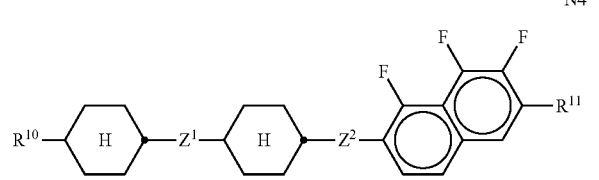

N5

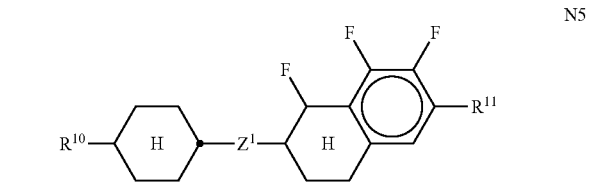

N6

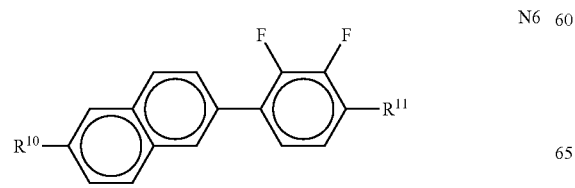

N7

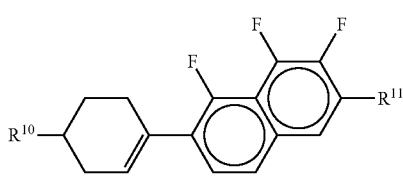

N8

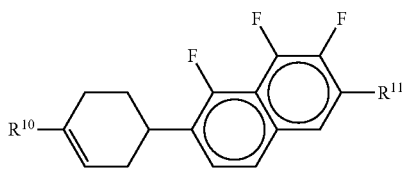

N9

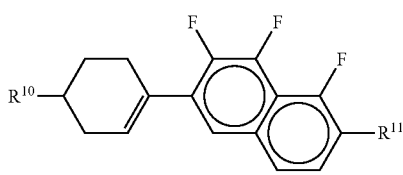

N10

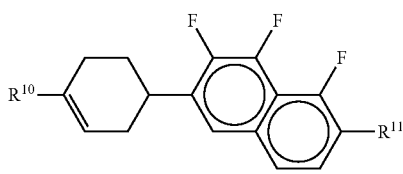

in which $R^{10}$ and $R^{11}$ each, independently of one another, have one of the meanings indicated for $R^1$, preferably denote straight-chain alkyl, straight-chain alkoxy or straight-chain alkenyl, and Z, $Z^1$ and $Z^2$ each, independently of one another, denote —C₂H₄—, —CH=CH—, —(CH₂)₄—, —(CH₂)₃O—, —O—(CH₂)₃—, —CH=CHCH₂CH₂, —CH₂CH₂CH=CH—, —CH₂O—, —OCH₂—, —COO—, —COO—, —C₂F₄—, —CF=CF—, —CF=CH—, —CH=CF—, —CH₂— or a single bond.

o) LC medium which additionally comprises one or more difluorodibenzochromans and/or chromans of the following formulae:

BC

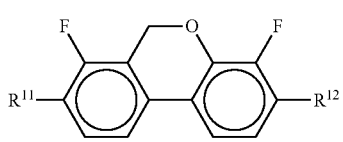

CR

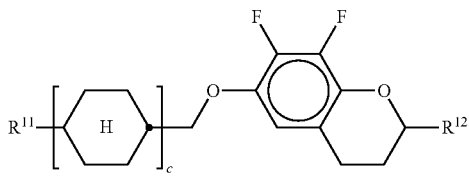

in which $R^{11}$ and $R^{12}$ each, independently of one another, have the above-mentioned meaning, and c denotes 0 or 1, preferably in amounts of 3 to 20% by weight, in particular in amounts of 3 to 15% by weight.

Particularly preferred compounds of the formulae BC and CR are selected from the following sub-formulae:

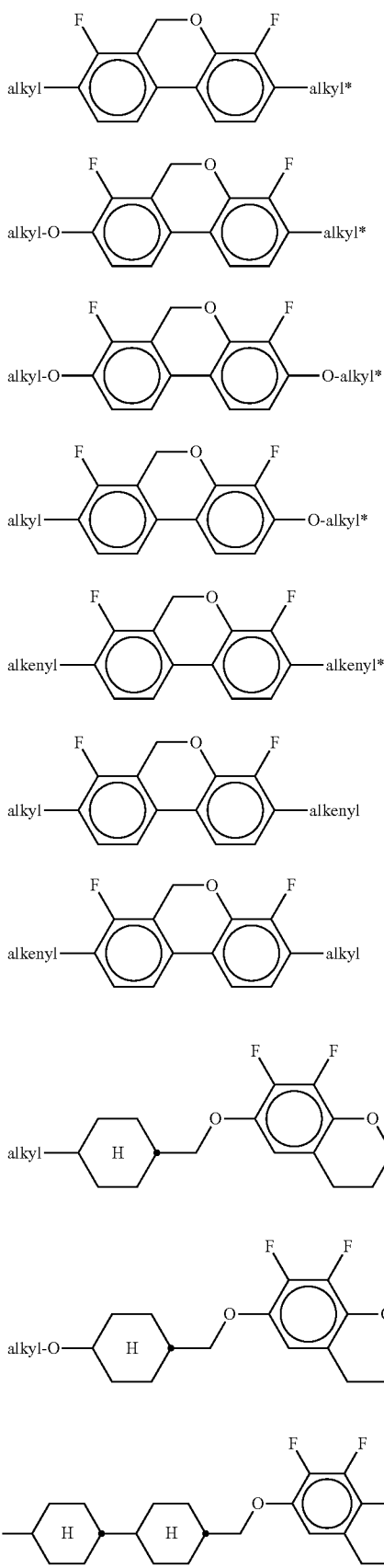

BC1
BC2
BC3
BC4
BC5
BC6
BC7
CR1
CR2
CR3

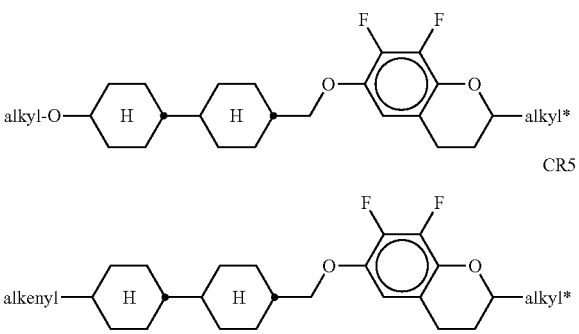

CR4
CR5 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Very particular preference is given to mixtures comprising one, two or three compounds of the formula BC-2.

p) LC medium which additionally comprises one or more fluorinated phenanthrenes or dibenzofurans of the following formulae:

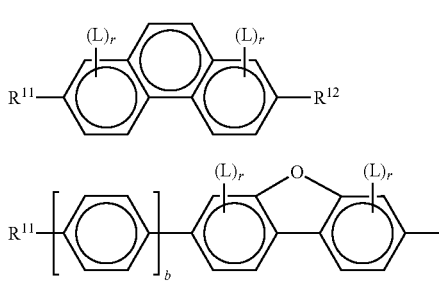

PH
BF in which $R^{11}$ and $R^{12}$ each, independently of one another, have the above-mentioned meanings, b denotes 0 or 1, L denotes F, and r denotes 1, 2 or 3.

Particularly preferred compounds of the formulae PH and BF are selected from the following sub-formulae:

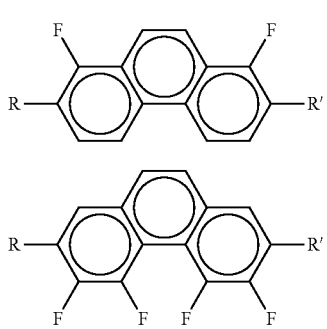

PH1
PH2

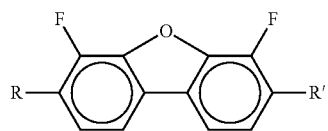
BF1

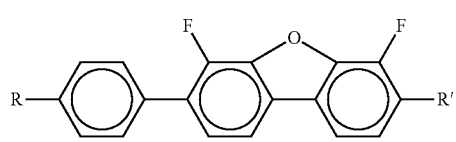
BF2 in which R and R' each, independently of one another, denote a straight-chain alkyl or alkoxy radical having 1-7 C atoms.

q) LC medium, preferably for use in PSA-OCB displays, which comprises one or more compounds of the following formulae:

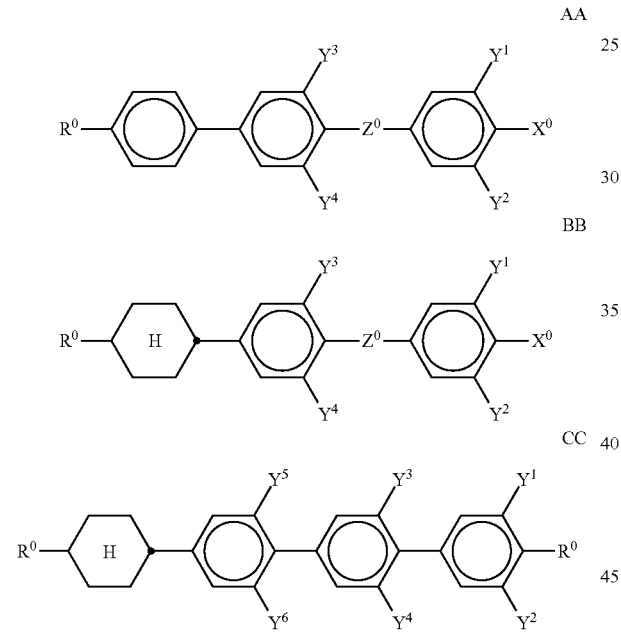

in which

R⁰ on each occurrence, identically or differently, denotes n-alkyl, alkoxy, oxaalkyl, fluoroalkyl or alkenyl, each having up to 9 C atoms, $X^0$ denotes F, Cl or in each case halogenated alkyl, alkenyl, alkenyloxy or alkoxy, each having up to 6 C atoms, $Z^0$ denotes —CF₂O— or a single bond, $Y^{1-6}$ each, independently of one another, denote H or F.

$X^0$ is preferably F, Cl, CF₃, CHF₂, OCF₃, OCHF₂, OCFHCF₃, OCFHCHF₂, OCFHCHF₂, OCF₂CH₃, OCF₂CHF₂, OCF₂CHF₂, OCF₂CF₂CHF₂, OCF₂CF₂CHF₂, OCFHCF₂CF₃, OCFHCF₂CHF₂, OCF₂CF₂CF₃, OCF₂CF₂CClF₂, OCClFCF₂CF₃ or CH=CF₂, particularly preferably F or OCF₃.

The compounds of the formula AA are preferably selected from the following formulae:

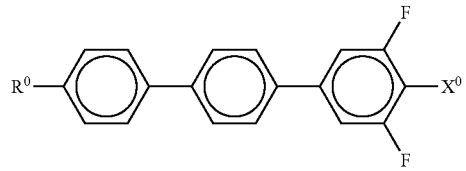
AA1

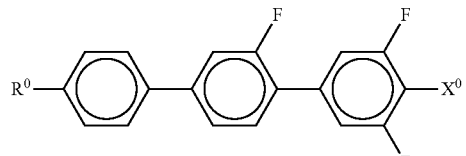
AA2

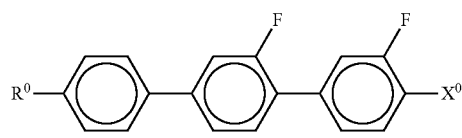
AA3

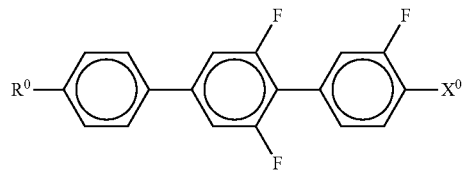
AA4

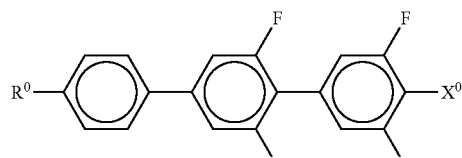
AA5

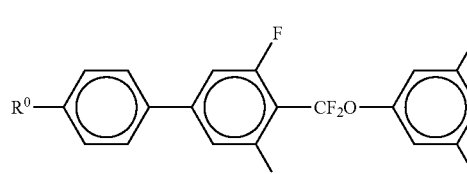
AA6

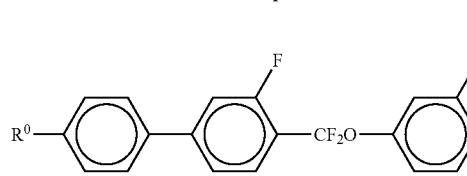
AA7

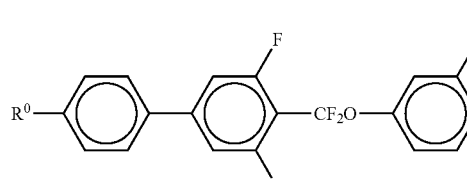
AA8

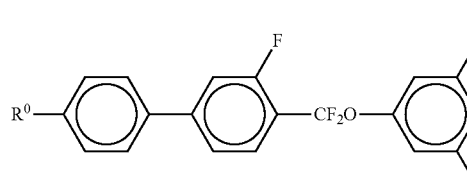
AA9 in which R⁰ and X⁰ have the above-mentioned meanings, and X⁰ preferably denotes F. Particular preference is given to compounds of the formulae AA2 and AA6.

The compounds of the formula BB are preferably selected from the following formulae:

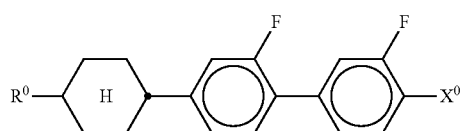

BB1

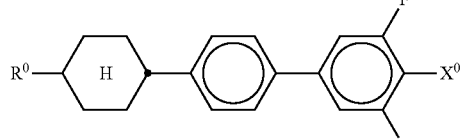

BB2

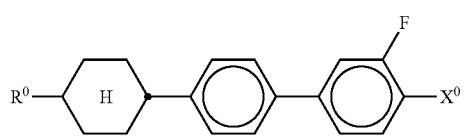

BB3

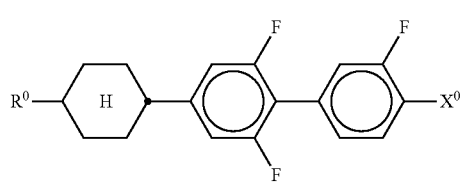

BB4

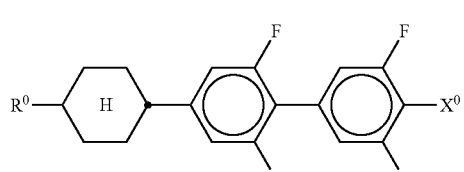

BB5

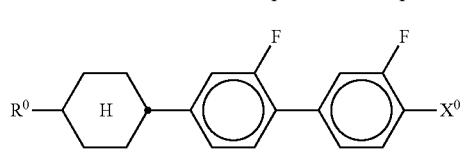

BB6 in which R⁰ and X⁰ have the above-mentioned meanings, and X⁰ preferably denotes F. Particular preference is given to compounds of the formulae BB1, BB2 and BB5.

The compounds of the formula CC are preferably selected from the following formula:

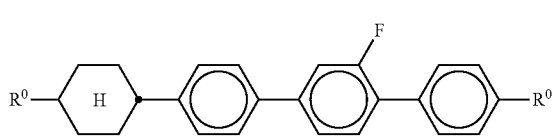

CC1 in which R⁰ on each occurrence, identically or differently, has the above-mentioned meaning and preferably denotes alkyl having 1 to 6 C atoms.

r) LC medium which, apart from the polymerisable compounds of the formula I or sub-formulae thereof and the comonomers, comprises no compounds which contain a terminal vinyl or vinyloxy group (—CH=CH₂, —O—CH=CH₂).

s) LC medium which comprises 1 to 5, preferably 1, 2 or 3, polymerisable compounds.

t) LC medium in which the proportion of polymerisable compounds in the mixture as a whole is 0.05 to 5%, preferably 0.1 to 1%.

u) LC medium which comprises 1 to 8, preferably 1 to 5, compounds of the formulae CY1, CY2, PY1 and/or PY2. The proportion of these compounds in the mixture as a whole is preferably 5 to 60%, particularly preferably 10 to 35%. The content of these individual compounds is preferably in each case 2 to 20%.

v) LC medium which comprises 1 to 8, preferably 1 to 5, compounds of the formulae CY9, CY10, PY9 and/or PY10. The proportion of these compounds in the mixture as a whole is preferably 5 to 60%, particularly preferably 10 to 35%. The content of these individual compounds is preferably in each case 2 to 20%.

w) LC medium which comprises 1 to 10, preferably 1 to 8, compounds of the formula ZK, in particular compounds of the formulae ZK1, ZK2 and/or ZK6. The proportion of these compounds in the mixture as a whole is preferably 3 to 25%, particularly preferably 5 to 45%. The content of these individual compounds is preferably in each case 2 to 20%.

x) LC medium in which the proportion of compounds of the formulae CY, PY and ZK in the mixture as a whole is greater than 70%, preferably greater than 80%.

The combination of compounds of the preferred embodiments a)-x) mentioned above with the polymerised compounds described above effects low threshold voltages, low rotational viscosities and very good low-temperature stabilities with maintenance of high clearing points and high HR values in the LC media according to the invention and allows a pretilt angle to be set in PS(A) displays. In particular, the LC media exhibit significantly shortened response times, in particular also the grey-shade response times, in PS(A) displays compared with the media from the prior art.

The liquid-crystal mixture preferably has a nematic phase range of at least 80 K, particularly preferably at least 100 K, and a rotational viscosity of not greater than 250 mPa·s, preferably not greater than 200 mPa·s, at 20° C.

LC media according to the invention for use in displays of the VA type have a negative dielectric anisotropy Δε, preferably of about −0.5 to −7.5, in particular of about −2.5 to −5.5, at 20° C. and 1 kHz.

LC media according to the invention for use in displays of the OCB type have a positive dielectric anisotropy Δε, preferably of about +7 to +17 at 20° C. and 1 kHz.

The birefringence Δn in LC media according to the invention for use in displays of the VA type is preferably less than 0.16, particularly preferably between 0.06 and 0.14, in particular between 0.07 and 0.12.

The birefringence Δn in LC media according to the invention for use in displays of the OCB type is preferably between 0.14 and 0.22, in particular between 0.16 and 0.22.

The dielectrics may also comprise further additives known to the person skilled in the art and described in the literature. For example, 0 to 15% by weight of pleochroic dyes may be added, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq.

Cryst. 24, 249-258 (1973)), may be added in order to improve the conductivity, or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the preferred embodiments a)-x) of the LC media according to the invention are either known or the ways in which they are prepared can readily be derived from the prior art by the person skilled in the relevant art since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerisable compounds as defined above and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes.

The construction of the LC displays according to the invention corresponds to the conventional geometry for PS(A) displays, as described in the prior art cited at the outset. Geometries without protrusions are preferred, in particular those in which, in addition, the electrode on the colour filter side is unstructured and only the electrode on the TFT side has slits. Particularly suitable and preferred electrode structures for PSA-VA displays are described, for example, in US 2006/0066793 A1.

The following examples explain the present invention without limiting it. However, they show the person skilled in the art preferred mixture concepts with compounds preferably to be employed and the respective concentrations thereof and combinations thereof with one another. In addition, the examples illustrate which properties and property combinations are accessible.

The following abbreviations and acronyms are used:

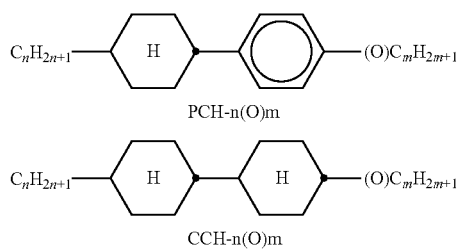

PCH-n(O)m

CCH-n(O)m

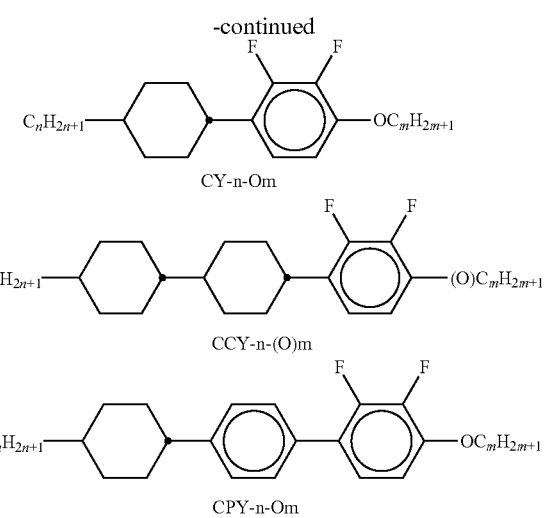

CY-n-Om

CCY-n-(O)m

CPY-n-Om

Furthermore, $V_o$ denotes threshold voltage, capacitive [V] at 20° C.,
$n_e$ denotes extraordinary refractive index at 20° C. and 589 nm,
$n_o$ denotes ordinary refractive index at 20° C. and 589 nm,
Δn denotes optical anisotropy at 20° C. and 589 nm,
$\in_\perp$ denotes dielectric susceptibility perpendicular to the director at 20° C. and 1 kHz,
$\pounds_\parallel$ denotes dielectric susceptibility parallel to the director at 20° C. and 1 kHz,
Δ∈ denotes dielectric anisotropy at 20° C. and 1 kHz,
cl.p., T(N,I) denotes clearing point [° C.],
$\gamma_1$ denotes rotational viscosity at 20° C. [mPa·s],
$K_1$ denotes elastic constant, "splay" deformation at 20° C. [pN],
$K_2$ denotes elastic constant, "twist" deformation at 20° C. [pN],
$K_3$ denotes elastic constant, "bend" deformation at 20° C. [pN],
LTS denotes low-temperature stability (phase), determined in test cells,
$HR_{20}$ denotes voltage holding ratio at 20° C. [%], and
$HR_{100}$ denotes voltage holding ratio at 100° C. [%].

Unless explicitly noted otherwise, all concentrations in the present application are indicated in percent by weight and relate to the corresponding mixture or mixture component, unless explicitly indicated otherwise.

Unless explicitly noted otherwise, all temperature values indicated in the present application, such as, for example, the melting point T(C,N), the transition from the smectic (S) to the nematic (N) phase T(S,N) and the clearing point T(N,I), are indicated in degrees Celsius (° C.).

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δ∈ is determined at 1 kHz, unless explicitly indicated otherwise in each case.

For the present invention, the term "threshold voltage" relates to the capacitive threshold ($V_0$), also known as the Freedericksz threshold, unless explicitly indicated otherwise. In the examples, as is generally usual, the optical threshold for 10% relative contrast ($V_{10}$) may also be indicated.

The display used for measurement of the capacitive threshold voltage has two plane-parallel outer plates at a separation of 4 μm and electrode layers with overlying alignment layers of rubbed polyimide on the insides of the outer plates, which cause a homeotropic edge alignment of the liquid-crystal molecules.

The polymerisable compounds are polymerised in the display by UV irradiation for a pre-determined time, with a voltage simultaneously being applied to the display (usually 10 V to 30 V alternating current, 1 kHz). In the examples, unless indicated otherwise, a 28 mW/cm² mercury vapour lamp was used, the intensity was measured using a standard UV meter (model Ushio UNI meter) fitted with a 365 nm band-pass filter.

The tilt angle is determined by a rotational crystal experiment (Autronic-Melchers TBA-105). A small value (i.e. a large deviation from a 90° angle) corresponds to a large tilt here.

EXAMPLE 1

3'-(2-Methylacryloyloxy)biphenyl-3-yl 2-methylacrylate (1) is prepared as follows:

1.1. 3,3'-Dibenzyloxybiphenyl

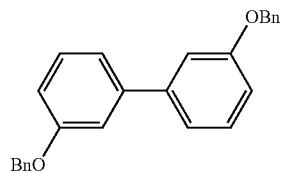

The compound is described in the literature (CAS 26988-39-6) and can be prepared, for example, by Suzuki coupling of the commercially available compounds m-benzyloxybromobenzene (CAS 53087-13-1) and m-benzyloxybenzeneboronic acid (CAS 156682-54-1).

1.2. Biphenyl-3,3'-diol

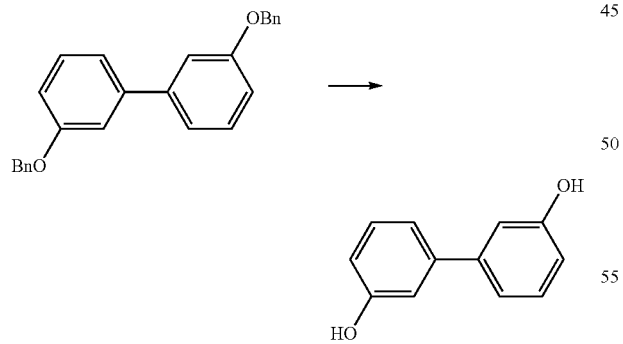

146 g (0.392 mol) of 3,3'-dibenzyloxybiphenyl are dissolved in 1.5 l of THF and hydrogenated to completion on a Pd/C catalyst. The catalyst is filtered off, the filtrate is evaporated, and the residue is filtered through silica gel with toluene/ethyl acetate, giving biphenyl-3,3'-diol as a colourless solid.

$^1$H-NMR (DMSO-$d_6$, 400 MHz): δ=6.76 ppm (ddd, J=0.9 Hz, J=2.4 Hz, J=8.1 Hz, 2H, Ar—H), 6.97 (t, J=2.0 Hz, 2H, Ar—H), 7.00 (ddd, J=1.0 Hz, J=1.6 Hz, J=7.7 Hz, 2H, Ar—H), 7.23 (t, J=7.9 Hz, 2H, Ar—H), 9.47 (s, br., 2H, OH).

1.3. 3'-(2-Methylacryloyloxy)biphenyl-3-yl 2-methylacrylate

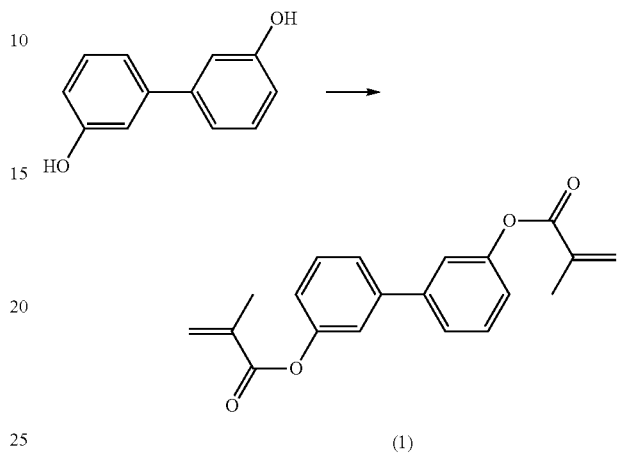

5.00 g (26.9 mmol) of biphenyl-3,3'-diol, 9.5 ml (0.112 mol) of methacrylic acid and 0.7 g of N,N-dimethylaminopyridine (DMAP) are initially introduced in 200 ml of toluene, a solution of 23.5 g (0.114 mol) of N,N'-dicyclohexylcarbodiimide is added with ice-cooling, and the mixture is stirred overnight at room temp. After addition of 4.4 g of oxalic acid dihydrate, the batch is stirred for 1 h and filtered, and the filtrate is evaporated. The residue is chromatographed on silica gel with heptane/ethyl acetate (2:1), giving 3'-(2-methylacryloyloxy)biphenyl-3-yl 2-methylacrylate as colourless crystals of m.p. 70° C.

EXAMPLE 2

3'-Acryloyloxybiphenyl-3-yl acrylate (2) is prepared as follows:

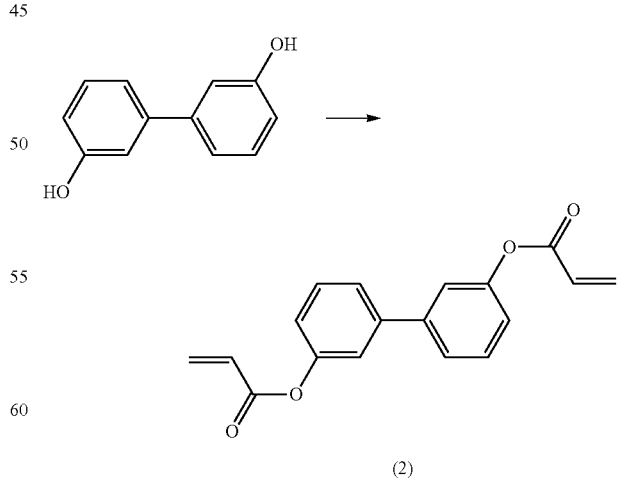

Analogously to Example 1, biphenyl-3,3'-diol and methacrylic acid give 3'-acryloyloxybiphenyl-3-yl acrylate as a colourless solid of m.p. 48° C.

EXAMPLE 3

3'-[3-(2-Methylacryloyloxy)propoxy]biphenyl-3-yl 2-methylacrylate (3) is prepared as follows:

3.1. 3'-(3-Hydroxypropoxy)biphenyl-3-ol

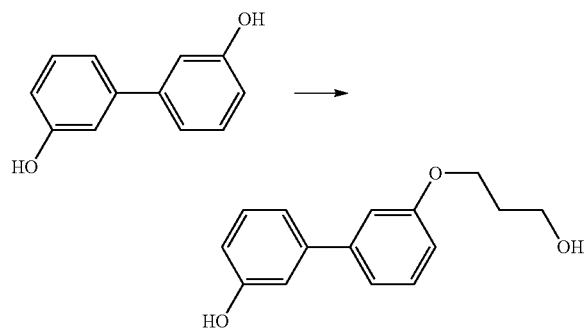

26.0 g (0.140 mol) of biphenyl-3,3'-diol and 10.0 g of 3-bromo-1-propanol are dissolved in 300 ml of acetone, and, after addition of 19.3 g (0.140 mol) of potassium carbonate, the mixture is heated under reflux overnight. The batch is subsequently filtered and evaporated, and the residue is chromatographed on silica gel with toluene/ethyl acetate (1:1), giving 3'-(3-hydroxypropoxy)biphenyl-3-ol as colourless crystals.

3.2. 3'-[3-(2-Methylacryloyloxy)propoxy]biphenyl-3-yl 2-methylacrylate

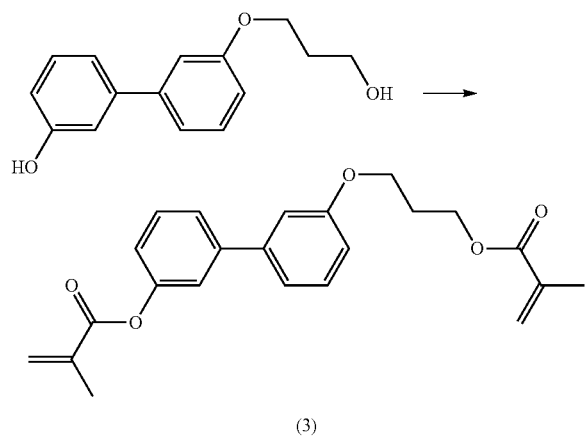

(3)

Analogously to the reaction described under 1.3., 3'-(3-hydroxypropoxy)-biphenyl-3-ol gives 3'-[3-(2-methylacryloyloxy)propoxy]biphenyl-3-yl 2-methylacrylate as a colourless solid of m.p. 49° C.

EXAMPLE 4

3'-[3-(2-Methylacryloyloxy)propyl]biphenyl-3-yl 2-methylacrylate (4) is prepared as follows:

4.1. 3-(3'-Benzyloxybiphenyl-3-yl)propionic acid

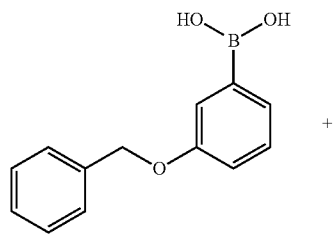

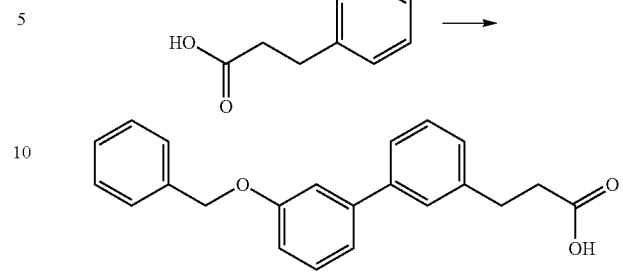

21.5 g (77.2 mmol) of sodium metaborate octahydrate, 0.700 g (977 mmol) of bis(triphenylphosphine)palladium(II) chloride, 0.1 ml (2 mmol) of hydrazine hydrate and 10.0 g (42.3 mmol) of 3-(3-bromophenyl)propionic acid are initially introduced in 10 ml of tetrahydrofuran and 30 ml of water, and a solution of 10.0 g (43.9 mmol) of 3-benzyloxy-benzeneboronic acid in 30 ml of THF is added. The batch is subsequently heated under reflux overnight, added to water and extracted three times with MTB ether. The combined org. phases are filtered through silica gel with heptane/ethyl acetate (1:1), and the crude product is recrystallised from toluene, giving 3-(3'-benzyloxybiphenyl-3-yl)propionic acid as a colourless solid.

4.2. 3-(3'-Benzyloxybiphenyl-3-yl)propanol

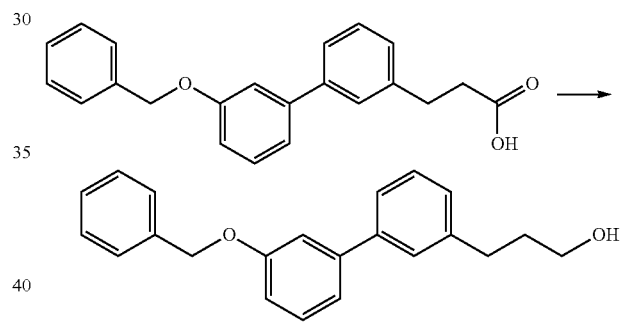

1.1 g (29 mmol) of lithium aluminium hydride are initially introduced in 50 ml of THF, and a solution of 8.0 g (24.1 mmol) of 3-(3'-benzyloxy-biphenyl-3-yl)propionic acid in 50 ml of THF is added. The batch is stirred at room temp. for 1 h, heated under reflux for 1 h, added to water and acidified using dil. sulfuric acid. The aqueous phase is separated off and extracted with MTB ether. The combined org. phases are washed with water and sat. sodium chloride soln. and dried over sodium sulfate. The solvent is removed in vacuo, and the residue is employed in the next step without further purification.

4.3. 3'-(3-Hydroxypropyl)biphenyl-3-ol

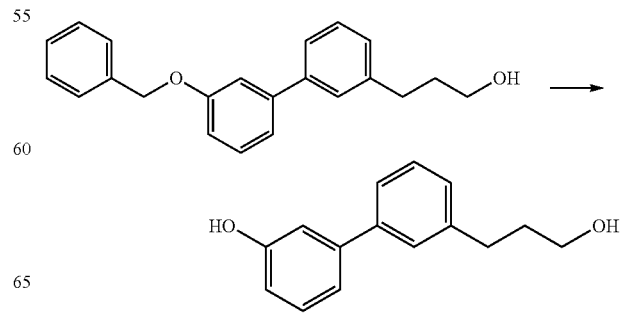

7.8 g (23.7 mmol) of 3-(3'-benzyloxybiphenyl-3-yl)propanol are hydrogenated to completion in THF on a palladium/activated carbon catalyst. The catalyst is filtered off, the filtrate is evaporated, and the residue is chromatographed on silica gel with toluene/ethyl acetate (2:1), giving 3'-(3-hydroxypropyl)biphenyl-3-ol as a colourless oil.

$^1$H-NMR (CDCl$_3$, 300 MHz): δ=1.95 ppm (m$_c$, 2 H, —CH$_2$CH$_2$CH$_2$OH), 2.35 (s, 1H, OH), 2.78 (m$_c$, 2 H, CH$_2$CH$_2$CH$_2$OH), 3.71 (m$_c$, 2 H, —CH$_2$CH$_2$CH$_2$OH), 4.95 (s, 1H, OH), 6.81 (ddd, 1H, J=1.0 Hz, J=2.6 Hz, J=8.0 Hz, 1H, Ar—H), 7.05 (dd, J=1.9 Hz, J=2.4 Hz, 1H, Ar—H), 7.12-7.44 (m, 6H, Ar—H).

4.4. 3'-[3-(2-Methylacryloyloxy)propyl]biphenyl-3-yl 2-methylacrylate

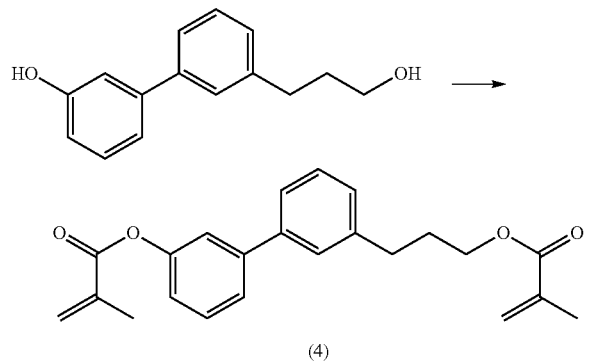

(4)

Analogously to Example 1, 3'-(3-hydroxypropyl)biphenyl-3-ol and methacrylic acid give 3'-[3-(2-methylacryloyloxy)propyl]biphenyl-3-yl 2-methylacrylate as a colourless oil.

EXAMPLE 5

3',5'-Bis(2-methylacryloyloxy)biphenyl-4-yl 2-methylacrylate (5)

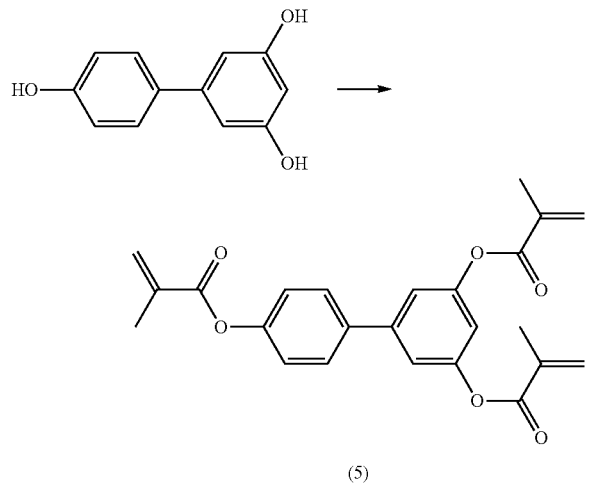

(5)

Analogously to the synthesis described under 1.3., biphenyl-3,5,4'-triol (prepared by the method of A. N. Cammidge et al., Tetrahedron Lett. 2006, 47, 5569-5572) and methacryloyl chloride give 3',5'-bis(2-methylacryloyloxy)biphenyl-4-yl 2-methylacrylate as a colourless oil. Phase behaviour Tg −35 I.

EXAMPLE 6

3',5'-Bis(acryloyloxy)biphenyl-4-yl acrylate (6)

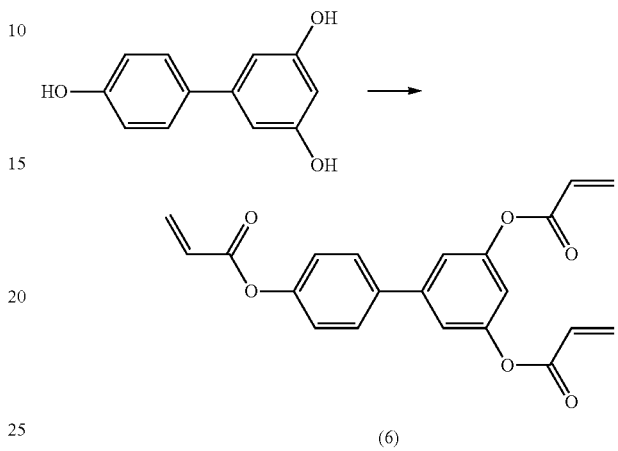

(6)

Analogously to the synthesis described under 1.3., biphenyl-3,5,4'-triol and acryloyl chloride give 3',5'-bis(acryloyloxy)biphenyl-4-yl acrylate as a colourless oil. Phase behaviour Tg −28 I.

EXAMPLE 7

5-(2-Methylacryloyloxy)-4'-[2-(2-methylacryloyloxy)ethyl]biphenyl-3-yl 2-methylacrylate (7) is prepared as follows:

7.1. 2-(3',5'-Dimethoxybiphenyl-4-yl)ethanol

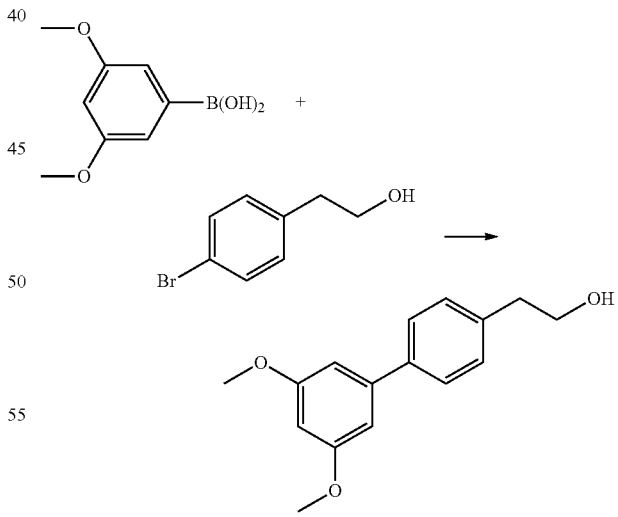

20 g (99 mmol) of 2-(4-bromophenyl)ethanol, 20 g (72 mmol) of sodium metaborate octahydrate and 2.0 g (2.8 mmol) of bis(triphenylphosphine)palladium(II) chloride are initially introduced in 30 ml of THF and 120 ml of water, and, after addition of 0.03 ml of hydrazine hydrate, a solution of 15.5 g (85 mmol) of 3,5-dimethoxybenzeneboronic acid in 60 ml of THF is added dropwise. The batch is heated under reflux overnight and subsequently extracted four times with dichloromethane. The combined org. phases are washed with water and dried over sodium sulfate. The solvent is removed in vacuo, and the crude product is chromatographed on silica gel with heptane/ethyl acetate (2:1), giving 2-(3',5'-dimethoxybiphenyl-4-yl)ethanol as a colourless solid.

$^1$H-NMR (CDCl$_3$, 400 MHz)

δ=3.83 (s, 6H, OCH$_3$), 6.45 (t, J=2.3 Hz, 1H, Ar—H), 6.71 (d, J=2.3 Hz, 2 H, Ar—H), 7.28 (AB-d, J=8.1 Hz, 2H, Ar—H), 7.52 (AB-d, J=8.1 Hz, 2H, Ar—H).

7.2. 4'-(2-Hydroxyethyl)biphenyl-3,5-diol

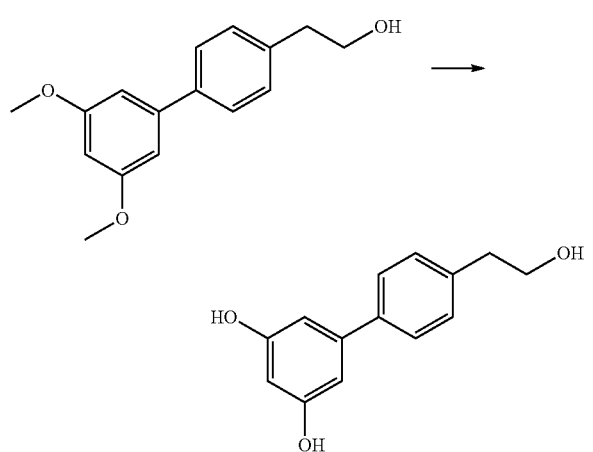

17.0 g (65.2 mmol) of 2-(3',5'-dimethoxybiphenyl-4-yl) ethanol are dissolved in 1 l of xylene, and, after addition of 110 ml (330 mmol) of a 3 M solution of methylmagnesium iodide in diethyl ether, the mixture is heated under reflux for 3 d. The batch is subsequently carefully hydrolysed by addition of water and acidified using dil. hydrochloric acid. The org. phase is separated off, washed with water and dried over sodium sulfate. The solvent is removed in vacuo, and the crude product is recrystallised from toluene, giving 4'-(2-hydroxyethyl)biphenyl-3,5-diol as a colourless solid.

7.3. 5-(2-Methylacryloyloxy)-4'-[2-(2-methylacryloyloxy)ethyl]biphenyl-3-yl 2-methylacrylate

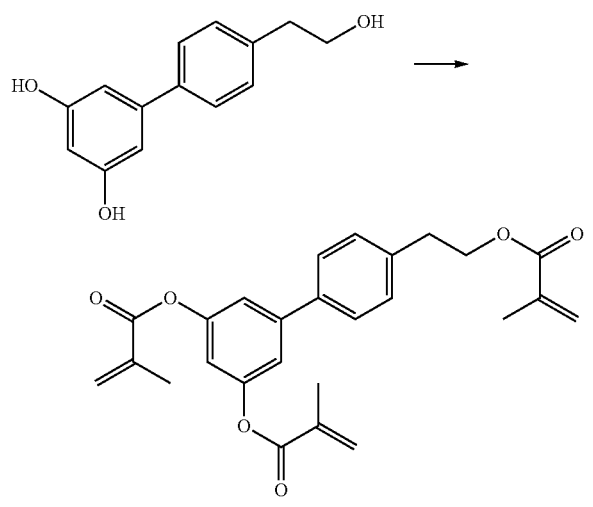

Analogously to the synthesis described under 1.3., 4'-(2-hydroxyethyl)-biphenyl-3,5-diol and acryloyl chloride give 5-(2-methylacryloyloxy)-4'-[2-(2-methylacryloyloxy)ethyl] biphenyl-3-yl 2-methylacrylate.

Phase behaviour Tg –38 I.

EXAMPLE 8

3'-(2-Methylacryloyloxy)-3-[4-(2-methylacryloyloxy)butyl]biphenyl-4-yl 2-methylacrylate (8) is prepared as follows:

8.1. 2-(4-Benzyloxybut-1-enyl)-4-bromophenol

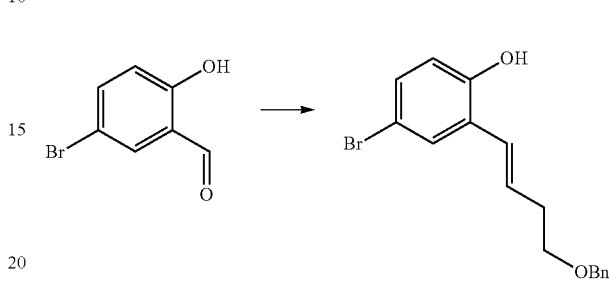

60.0 g (122 mmol) of (3-benzyloxypropyl)triphenylphosphonium bromide are initially introduced in 400 ml of THF, and a solution of 25.0 g (223 mmol) of potassium tert-butoxide in 100 ml of THF is added dropwise at –10° C. A solution of 20.0 g (99.5 mmol) of 5-bromo-2-hydroxybenzaldehyde in 200 ml of THF is subsequently added dropwise at 0° C., and the batch is stirred overnight at room temp. The reaction mixture is subsequently hydrolysed using water and extracted three times with MTB ether. The combined org. phases are washed with water and sat. sodium chloride soln. and dried over sodium sulfate. The solvent is removed in vacuo, and the residue is filtered through silica gel with heptane/ethyl acetate (4:1), giving a mixture of cis- and trans-2-(4-benzyloxybut-1-enyl)-4-bromophenol as a colourless oil, which is reacted without further purification.

8.2. 3'-Benzyloxy-3-(4-benzyloxybut-1-enyl)biphenyl-4-ol

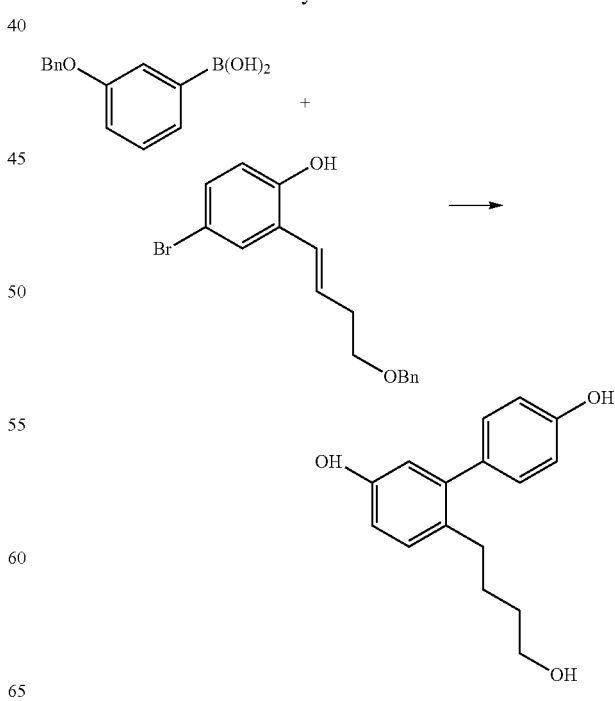

10.3 g (31 mmol) of 2-(4-benzyloxybut-1-enyl)-4-bromophenol, 5.5 g (20 mmol) of sodium metaborate octahydrate and 0.6 g (0.84 mmol) of bis(triphenylphosphine)palladium(II) chloride are initially introduced in 20 ml of THF and 60 ml of water, and, after addition of 0.03 ml of hydrazine hydrate, a solution of 6.0 g (26 mmol) of 3-benzyloxybenzeneboronic acid in 40 ml of THF is added dropwise. The batch is heated under reflux overnight and subsequently extracted four times with dichloromethane. The combined org. phases are washed with water and dried over sodium sulfate. The solvent is removed in vacuo, and the crude product is recrystallised once each from toluene and ethanol, giving 3'-benzyloxy-3-(4-benzyloxybut-1-enyl)biphenyl-4-ol as a colourless solid.

8.3. 3'-(4-Hydroxybutyl)biphenyl-3,4'-diol

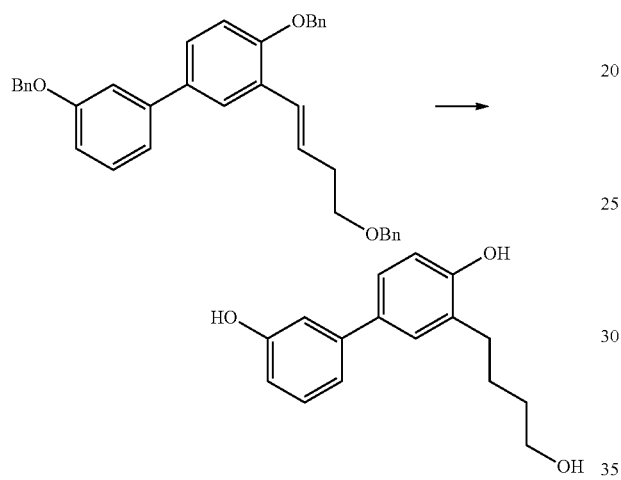

3'-Benzyloxy-3-(4-benzyloxybut-1-enyl)biphenyl-4-ol is dissolved in THF and hydrogenated to completion on a palladium/activated carbon catalyst.

The catalyst is filtered off, and the filtrate is concentrated in vacuo and filtered through silica gel with heptane/ethyl acetate (1:1), giving 3'-(4-hydroxybutyl)biphenyl-3,4'-diol as a colourless solid.

$^1$H-NMR (400 MHz, CDCl$_3$)

δ=1.66 ppm (quint., J=6.6 Hz, 2H, CH$_2$CH$_2$(CH$_2$)$_2$OH), 1.79 (quint., J=7.7 Hz, 2H, (CH$_2$)$_2$CH$_2$CH$_2$OH), 2.75 (t, J=7.5 Hz, 2H, CH$_2$(CH$_2$)$_3$OH), 3.79 (t, br., J=5.9 Hz, 2H, (CH$_2$)$_3$CH$_2$OH), 4.90 (s, 1H, OH), 5.78 (s, 1H, OH), 6.77 (dd, J=2.5 Hz, 8.0 Hz, 1H, Ar—H), 6.85 (d, J=8.2 Hz, 1H, Ar—H), 7.02 (m$_c$, 1H, Ar—H), 7.12 (d, J=7.9 Hz, 1H, Ar—H), 7.25-7.35 (m, 3H, Ar—H).

8.4. 3'-(2-Methylacryloyloxy)-3-[4-(2-methylacryloyloxy)butyl]biphenyl-4-yl 2-methylacrylate

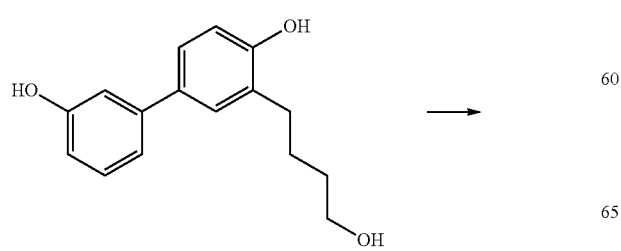

(8)

Analogously to the synthesis described under 1.3., 3'-(4-hydroxybutyl)-biphenyl-3,4'-diol and methacryloyl chloride give 3'-(2-methylacryloyloxy)-3-[4-(2-methylacryloyloxy)butyl]biphenyl-4-yl 2-methylacrylate as a colourless oil.

EXAMPLE 9

4'-(2-Methylacryloyloxy)-3-[4-(2-methylacryloyloxy)butyl]biphenyl-4-yl 2-methylacrylate (9)

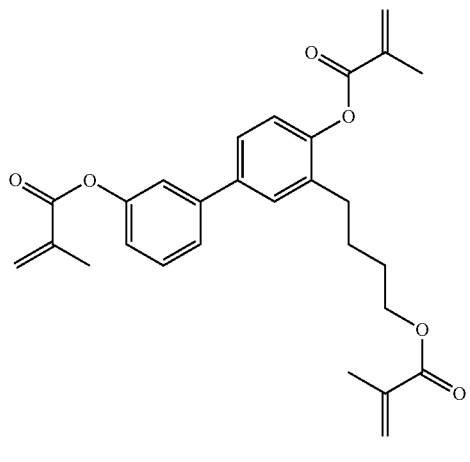

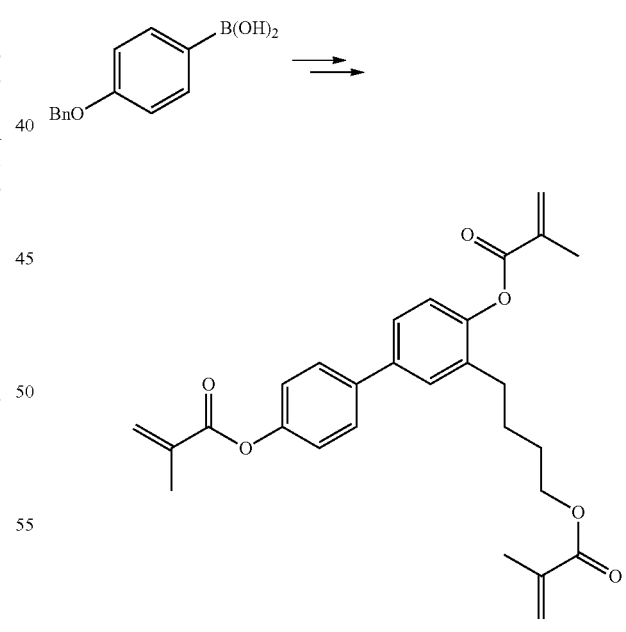

(9)

4'-(2-Methylacryloyloxy)-3-[4-(2-methylacryloyloxy)butyl]biphenyl-4-yl 2-methylacrylate, which is isomeric to Example 8, is obtained as a colourless solid of m.p. 76° C. analogously to the synthesis described above starting from 4-benzyloxybenzeneboronic acid.

EXAMPLE 10

4-{4'-Acryloyloxy-5-[4-(2-methylacryloyloxy)butyl]biphenyl-3-yl}butyl 2-methylacrylate (10) is prepared as follows:

10.1. 4'-Benzyloxy-3,5-dibromobiphenyl

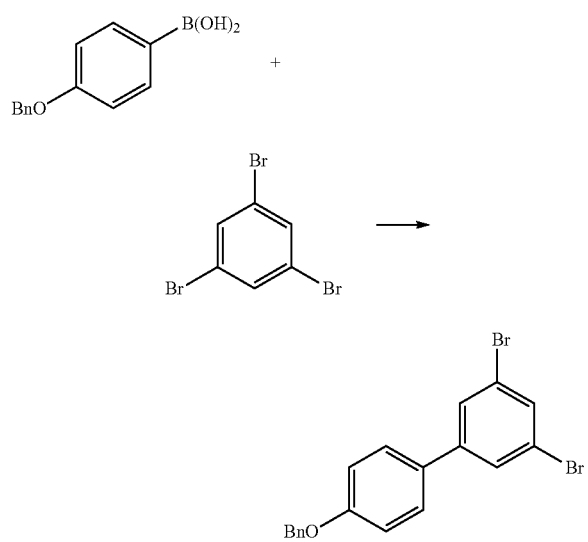

9.0 g (32 mmol) of sodium metaborate octahydrate and 1.3 g (1.82 mmol) of bis(triphenylphosphine)palladium(II) chloride are initially introduced in 200 ml of water and 40 ml of THF, a solution of 55 g (171 mmol) of 1,3,5-tribromobenzene in 80 ml of THF is added, and a solution of 10 g (45.5 mmol) of 4-benzyloxybenzeneboronic acid is added dropwise under reflux. The batch is heated under reflux for 16 h, added to water and extracted three times with MTB ether. The combined org. phases are washed with sat. sodium chloride soln. and dried over sodium sulfate. The solvent is removed in vacuo, and the residue is chromatographed on silica gel with heptane/ethyl acetate (19:1) and recrystallised from ethanol, giving 4'-benzyloxy-3,5-dibromobiphenyl as colourless crystals.

10.2. 4-[4'-Benzyloxy-5-(4-hydroxybut-1-ynyl)biphenyl-3-yl]but-3-yn-1-ol

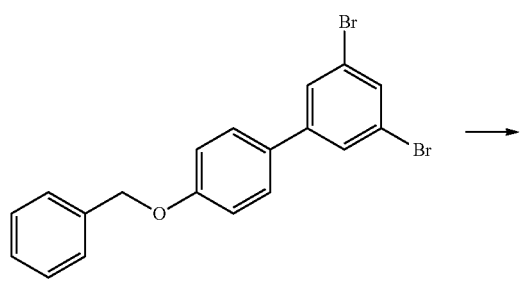

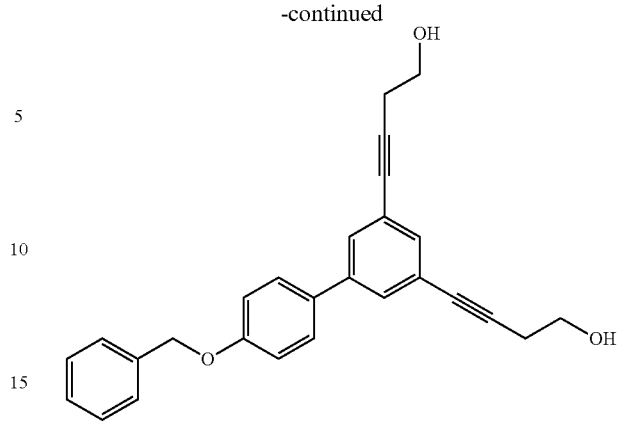

10.0 g (23.8 mmol) of 4'-benzyloxy-3,5-dibromobiphenyl are dissolved in 80 ml of DMF, 11.5 ml of triethylamine, 1.4 g (2.0 mmol) of bis(triphenylphosphine)palladium(II) chloride and 0.4 g (2.1 mmol) of copper iodide are added, and a solution of 5.5 ml (71.3 mmol) of 3-butyn-1-ol in 20 ml of DMF is subsequently added dropwise. The batch is left to stir overnight at 80° C., added to water, acidified using dil. hydrochloric acid and extracted three times with ethyl acetate. The combined org. phases are washed with sat. sodium chloride soln. and dried over sodium sulfate. The solvent is removed in vacuo, and the residue is filtered through silica gel with toluene/ethyl acetate (1:1), giving 4-[4'-benzyloxy-5-(4-hydroxybut-1-ynyl)biphenyl-3-yl]but-3-yn-1-ol as a colourless oil.

10.3. 3',5'-Bis(4-hydroxybutyl)biphenyl-4-ol

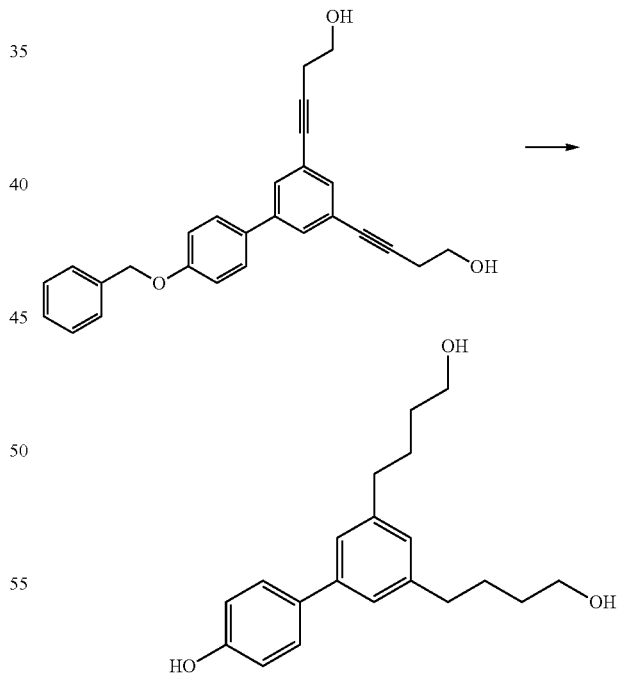

4-[4'-Benzyloxy-5-(4-hydroxybut-1-ynyl)biphenyl-3-yl]but-3-yn-1-ol is dissolved in THF and hydrogenated to completion on a palladium/activated carbon catalyst. The catalyst is filtered off, the filtrate is evaporated in vacuo, and the residue is filtered through silica gel with toluene/ethyl acetate (1:1).

$^1$H-NMR (400 MHz, DMSO-$d_6$)

δ=1.46 (m$_c$, 4 H, CH$_2$), 1.63 (m$_c$, 4 H, CH$_2$), 2.59 (t, J=7.6 Hz, 4H, Ar—CH$_2$—(CH$_2$)$_3$OH), 3.42 (q, J=6.2 Hz, 4H,

—CH$_2$OH), 4.38 (t, J=5.2 Hz, 2 H, OH), 6.83 (m$_c$, 2 H, Ar—H), 6.93 (s, br. 1H, Ar—H), 7.18 (m$_c$, 2 H, Ar—H), 7.46 (m$_c$, 2 H, Ar—H), 9.49 (s, 1H, Ar—OH).

10.4. 4-{4'-Acryloyloxy-5-[4-(2-methylacryloyloxy) butyl]biphenyl-3-yl}-butyl 2-methylacrylate

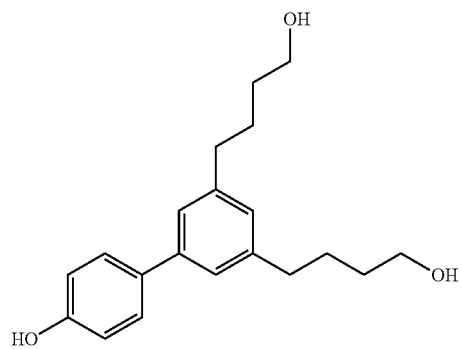

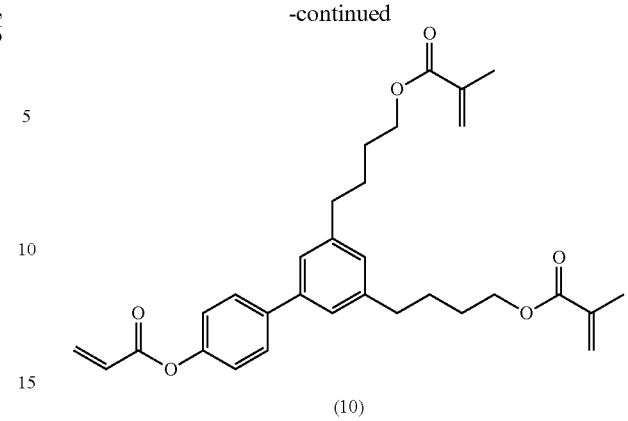

(10)

Analogously to the synthesis described under 1.3., 3',5'-bis-(4-hydroxybutyl)biphenyl-4-ol and methacryloyl chloride give 4-{4'-acryloyloxy-5-[4-(2-methylacryloyloxy)butyl]biphenyl-3-yl}butyl 2-methylacrylate as a colourless oil. The following compounds are prepared analogously:

| No. | P$^1$ | Sp$^1$ | X$^1$ | A$^1$ | B | A$^2$ | X$^2$ | Sp$^2$ | P$^2$ |
|---|---|---|---|---|---|---|---|---|---|
| 11 | Acr | — | — | (1,3-phenylene) | — | (1,3-phenylene) | O | —(CH$_2$)$_2$— | Acr |
| 12 | Acr | — | — | (1,3-phenylene) | — | (1,3-phenylene) | O | —(CH$_2$)$_4$— | Acr |
| 13 | Acr | — | — | (1,3-phenylene) | — | (1,3-phenylene) | — | —CH$_2$— | Acr |
| 14 | Acr | — | — | (1,3-phenylene) | — | (1,3-phenylene) | — | —(CH$_2$)$_3$— | Acr |
| 15 | Acr | —(CH$_2$)$_4$— | O | (1,3-phenylene) | — | (1,3-phenylene) | O | —(CH$_2$)$_2$— | Acr |
| 16 | Acr | —(CH$_2$)$_2$— | O | (1,3-phenylene) | — | (1,3-phenylene) | O | —(CH$_2$)$_4$— | Acr |
| 17 | Acr | —(CH$_2$)$_3$— | — | (1,3-phenylene) | — | (1,3-phenylene) | — | —CH$_2$— | Acr |

| No. | P¹ | Sp¹ | X¹ | A¹ | B | A² | X² | Sp² | P² |
|---|---|---|---|---|---|---|---|---|---|
| 18 | Acr | —CH₂— | — | 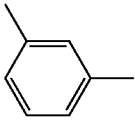 | — | 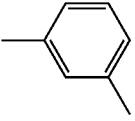 | — | —(CH₂)₃— | Acr |
| 19 | Acr | — | — | 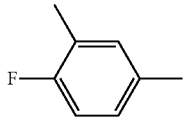 | — | 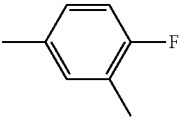 | O | —(CH₂)₂— | Acr |
| 20 | Acr | — | — | 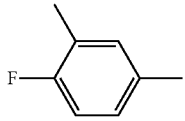 | — | 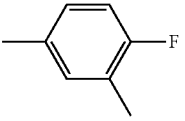 | O | —(CH₂)₄— | Acr |
| 21 | Acr | — | — | 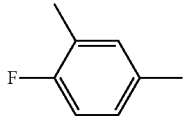 | — | 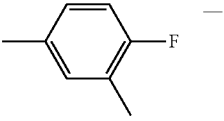 | — | —CH₂— | Acr |
| 22 | Acr | — | — | 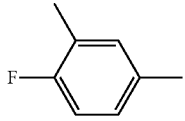 | — | 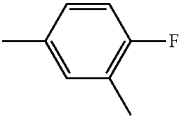 | — | —(CH₂)₃— | Acr |
| 23 | Acr | —(CH₂)₄— | O | 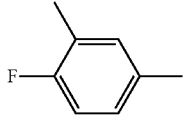 | — | 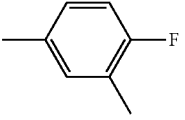 | O | —(CH₂)₂— | Acr |
| 24 | Acr | —(CH₂)₂— | O | 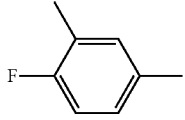 | — | 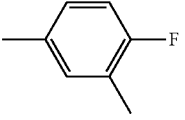 | O | —(CH₂)₄— | Acr |
| 25 | Acr | —(CH₂)₃— | — | 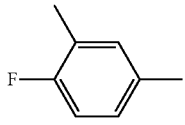 | — | 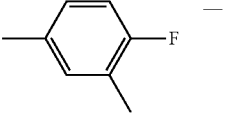 | — | —CH₂— | Acr |
| 26 | Acr | —CH₂— | — | 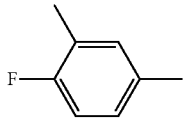 | — | 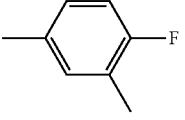 | — | —(CH₂)₃— | Acr |
| 27 | MAcr | — | — | 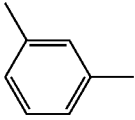 | — | 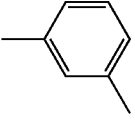 | O | —(CH₂)₂— | MAcr |
| 28 | MAcr | — | — | 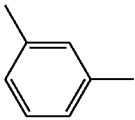 | — | 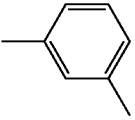 | O | —(CH₂)₄— | MAcr |

-continued

| No. | P¹ | Sp¹ | X¹ | A¹ | B | A² | X² | Sp² | P² |
|---|---|---|---|---|---|---|---|---|---|
| 29 | MAcr | — | — | 1,3-phenylene | — | 1,3-phenylene | — | —CH₂— | MAcr |
| 30 | MAcr | — | — | 1,3-phenylene | — | 1,3-phenylene | — | —(CH₂)₃— | MAcr |
| 31 | MAcr | —(CH₂)₄— | O | 1,3-phenylene | — | 1,3-phenylene | O | —(CH₂)₂— | MAcr |
| 32 | MAcr | —(CH₂)₂— | O | 1,3-phenylene | — | 1,3-phenylene | O | —(CH₂)₄— | MAcr |
| 33 | MAcr | —(CH₂)₃— | — | 1,3-phenylene | — | 1,3-phenylene | — | —CH₂— | MAcr |
| 34 | MAcr | —CH₂— | — | 1,3-phenylene | — | 1,3-phenylene | — | —(CH₂)₃— | MAcr |
| 35 | MAcr | — | — | 4-F-1,3-phenylene | — | 4-F-1,3-phenylene | O | —(CH₂)₂— | MAcr |
| 36 | MAcr | — | — | 4-F-1,3-phenylene | — | 4-F-1,3-phenylene | O | —(CH₂)₄— | MAcr |
| 37 | MAcr | — | — | 4-F-1,3-phenylene | — | 4-F-1,3-phenylene | — | —CH₂— | MAcr |
| 38 | MAcr | — | — | 4-F-1,3-phenylene | — | 4-F-1,3-phenylene | — | —(CH₂)₃— | MAcr |
| 39 | MAcr | —(CH₂)₄— | O | 4-F-1,3-phenylene | — | 4-F-1,3-phenylene | O | —(CH₂)₂— | MAcr |

-continued
| No. | P¹ | Sp¹ | X¹ | A¹ | B | A² | X² | Sp² | P² |
|---|---|---|---|---|---|---|---|---|---|
| 40 | MAcr | —(CH₂)₂— | O | 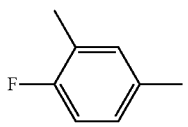 | — | 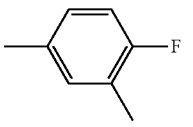 | O | —(CH₂)₄— | MAcr |
| 41 | MAcr | —(CH₂)₃— | — | 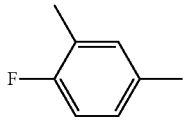 | — | 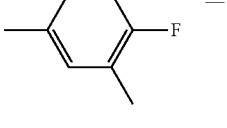 | — | —CH₂— | MAcr |
| 42 | MAcr | —CH₂— | — | 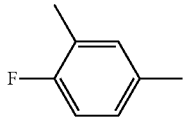 | — | 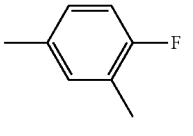 | — | —(CH₂)₃— | MAcr |
| 43 | MAcr | — | — | 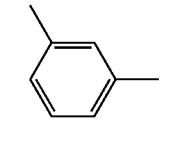 | 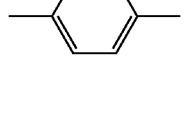 | 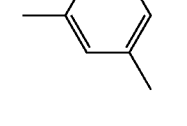 | O | —(CH₂)₂— | MAcr |
| 44 | MAcr | — | — | 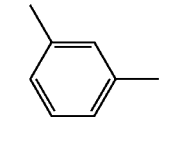 | 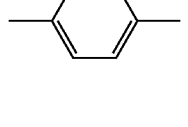 | 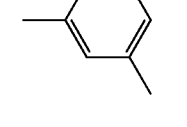 | O | —(CH₂)₄— | MAcr |
| 45 | MAcr | — | — | 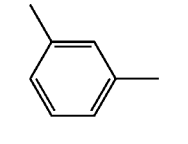 | 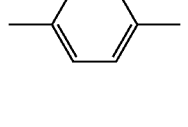 | 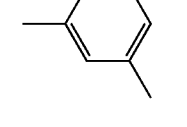 | — | —CH₂— | MAcr |
| 46 | MAcr | — | — | 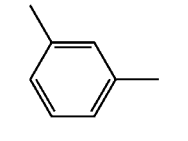 | 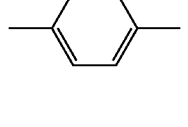 | 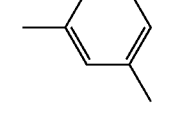 | — | —(CH₂)₃— | MAcr |
| 47 | MAcr | —(CH₂)₄— | O | 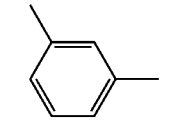 | 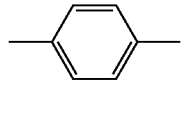 | 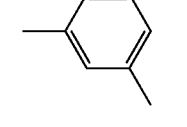 | O | —(CH₂)₂— | MAcr |
| 48 | MAcr | —(CH₂)₂— | O | 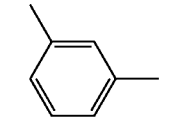 | 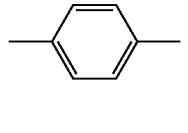 | 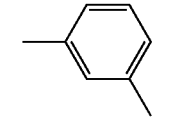 | O | —(CH₂)₄— | MAcr |
| 49 | MAcr | —(CH₂)₃— | — | 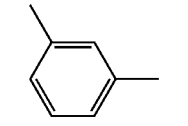 | 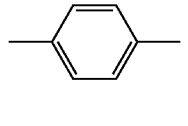 | 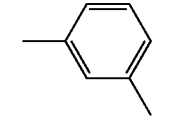 | — | —CH₂— | MAcr |
| 50 | MAcr | —CH₂— | — | 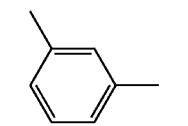 | 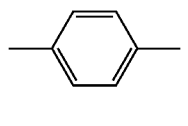 | 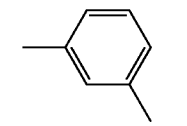 | — | —(CH₂)₃— | MAcr |

-continued
| No. | P¹ | Sp¹ | X¹ | A¹ | B | A² | X² | Sp² | P² |
|---|---|---|---|---|---|---|---|---|---|
| 51 | MAcr | — | — | 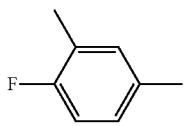 | 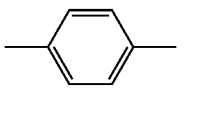 | 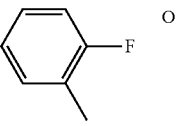 | O | —(CH$_2$)$_2$— | MAcr |
| 52 | MAcr | — | — | 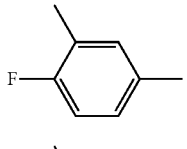 | 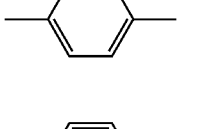 | 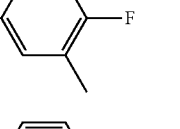 | O | —(CH$_2$)$_4$— | MAcr |
| 53 | MAcr | — | — | 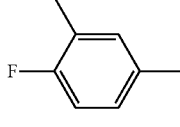 | 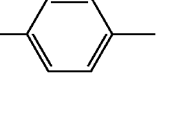 | 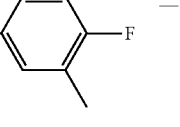 | — | —CH$_2$— | MAcr |
| 54 | MAcr | — | — | 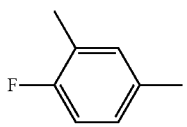 | 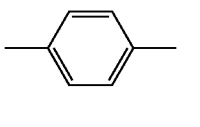 | 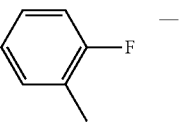 | — | —(CH$_2$)$_3$— | MAcr |
| 55 | MAcr | —(CH$_2$)$_4$— | O | 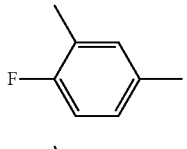 | 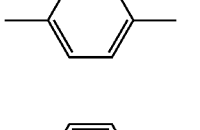 | 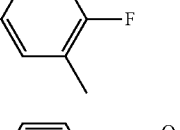 | O | —(CH$_2$)$_2$— | MAcr |
| 56 | MAcr | —(CH$_2$)$_2$— | O | 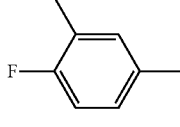 | 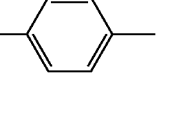 | 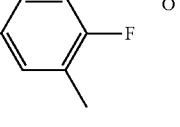 | O | —(CH$_2$)$_4$— | MAcr |
| 57 | MAcr | —(CH$_2$)$_3$— | — | 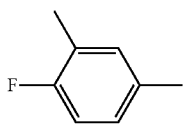 | 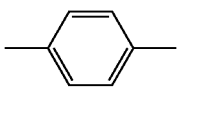 | 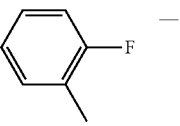 | — | —CH$_2$— | MAcr |
| 58 | MAcr | —CH$_2$— | — | 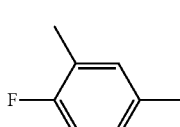 | 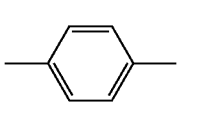 | 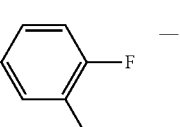 | — | —(CH$_2$)$_3$— | MAcr |
| 59 | MAcr | — | — | 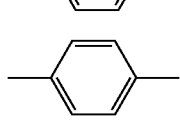 | — | 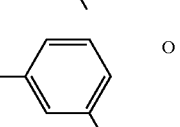 | O | —(CH$_2$)$_2$— | MAcr |
| 60 | MAcr | — | — | 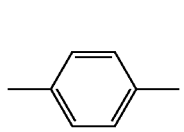 | — | 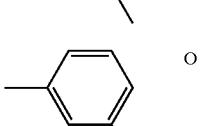 | O | —(CH$_2$)$_4$— | MAcr |
| 61 | MAcr | — | — | 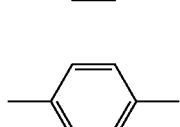 | — | 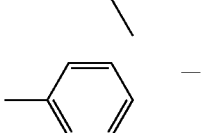 | — | —CH$_2$— | MAcr |
| 62 | MAcr | — | — | 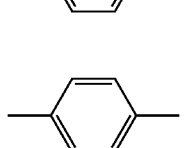 | — | 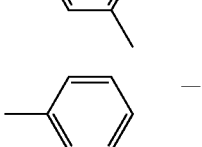 | — | —(CH$_2$)$_3$— | MAcr |

-continued
| No. | P¹ | Sp¹ | X¹ | A¹ | B | A² | X² | Sp² | P² |
|---|---|---|---|---|---|---|---|---|---|
| 63 | MAcr | —(CH$_2$)$_4$— | O | 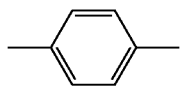 | — | 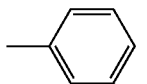 | O | —(CH$_2$)$_2$— | MAcr |
| 64 | MAcr | —(CH$_2$)$_2$— | O |  | — | 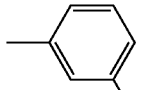 | O | —(CH$_2$)$_4$— | MAcr |
| 65 | MAcr | —(CH$_2$)$_3$— | — | 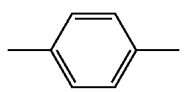 | — | 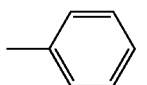 | — | —CH$_2$— | MAcr |
| 66 | MAcr | —CH$_2$— | — | 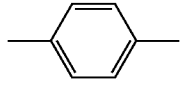 | — | 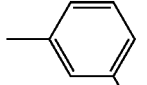 | — | —(CH$_2$)$_3$— | MAcr |
| 67 | MAcr | — | — | 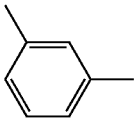 | — | 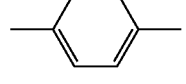 | O | —(CH$_2$)$_2$— | MAcr |
| 68 | MAcr | — | — | 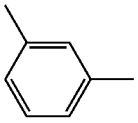 | — | 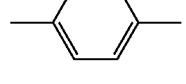 | O | —(CH$_2$)$_4$— | MAcr |
| 69 | MAcr | — | — | 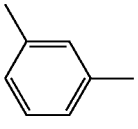 | — | 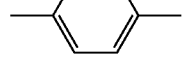 | — | —CH$_2$— | MAcr |
| 70 | MAcr | — | — | 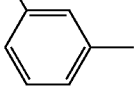 | — | 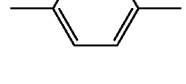 | — | —(CH$_2$)$_3$— | MAcr |
| 71 | MAcr | —(CH$_2$)$_4$— | O | 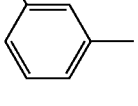 | — | 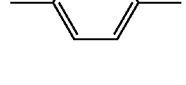 | O | —(CH$_2$)$_2$— | MAcr |
| 72 | MAcr | —(CH$_2$)$_2$— | O | 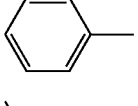 | — | 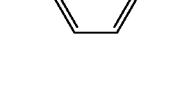 | O | —(CH$_2$)$_4$— | MAcr |
| 73 | MAcr | —(CH$_2$)$_3$— | — | 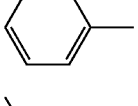 | — | 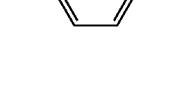 | — | —CH$_2$— | MAcr |
| 74 | MAcr | —CH$_2$— | — | 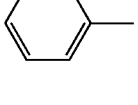 | — | 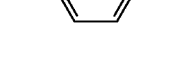 | — | —(CH$_2$)$_3$— | MAcr |

-continued

| No. | P¹ | Sp¹ | X¹ | A¹ | B | A² | X² | Sp² | P² |
|---|---|---|---|---|---|---|---|---|---|
| 75 | MAcr | — | — | 1,4-phenylene | 1,4-phenylene | 1,3-phenylene | O | —(CH₂)₂— | MAcr |
| 76 | MAcr | — | — | 1,4-phenylene | 1,4-phenylene | 1,3-phenylene | O | —(CH₂)₄— | MAcr |
| 77 | MAcr | — | — | 1,4-phenylene | 1,4-phenylene | 1,3-phenylene | — | —CH₂— | MAcr |
| 78 | MAcr | — | — | 1,4-phenylene | 1,4-phenylene | 1,3-phenylene | — | —(CH₂)₃— | MAcr |
| 79 | MAcr | —(CH₂)₄— | O | 1,4-phenylene | 1,4-phenylene | 1,3-phenylene | O | —(CH₂)₂— | MAcr |
| 80 | MAcr | —(CH₂)₂— | O | 1,4-phenylene | 1,4-phenylene | 1,3-phenylene | O | —(CH₂)₄— | MAcr |
| 81 | MAcr | —(CH₂)₃— | — | 1,4-phenylene | 1,4-phenylene | 1,3-phenylene | — | —CH₂— | MAcr |
| 82 | MAcr | —CH₂— | — | 1,4-phenylene | 1,4-phenylene | 1,3-phenylene | — | —(CH₂)₃— | MAcr |
| 83 | MAcr | — | — | 1,3-phenylene | 1,4-phenylene | 1,4-phenylene | O | —(CH₂)₂— | MAcr |
| 84 | MAcr | — | — | 1,3-phenylene | 1,4-phenylene | 1,4-phenylene | O | —(CH₂)₄— | MAcr |
| 85 | MAcr | — | — | 1,3-phenylene | 1,4-phenylene | 1,4-phenylene | — | —CH₂— | MAcr |
| 86 | MAcr | — | — | 1,3-phenylene | 1,4-phenylene | 1,4-phenylene | — | —(CH₂)₃— | MAcr |

-continued

| No. | P¹ | Sp¹ | X¹ | A¹ | B | A² | X² | Sp² | P² |
|---|---|---|---|---|---|---|---|---|---|
| 87 | MAcr | —(CH₂)₄— | O | 1,3-phenylene | 1,4-phenylene | 1,4-phenylene | O | —(CH₂)₂— | MAcr |
| 88 | MAcr | —(CH₂)₂— | O | 1,3-phenylene | 1,4-phenylene | 1,4-phenylene | O | —(CH₂)₄— | MAcr |
| 89 | MAcr | —(CH₂)₃— | — | 1,3-phenylene | 1,4-phenylene | 1,4-phenylene | — | —CH₂— | MAcr |
| 90 | MAcr | —CH₂— | — | 1,3-phenylene | 1,4-phenylene | 1,4-phenylene | — | —(CH₂)₃— | MAcr |
| 91 | MAcr | — | — | 2-fluoro-1,4-phenylene | — | 1,3-phenylene | O | —(CH₂)₂— | MAcr |
| 92 | MAcr | — | — | 2-fluoro-1,4-phenylene | — | 1,3-phenylene | O | —(CH₂)₄— | MAcr |
| 93 | MAcr | — | — | 2-fluoro-1,4-phenylene | — | 1,3-phenylene | — | —CH₂— | MAcr |
| 94 | MAcr | — | — | 2-fluoro-1,4-phenylene | — | 1,3-phenylene | — | —(CH₂)₃— | MAcr |
| 95 | MAcr | —(CH₂)₄— | O | 2-fluoro-1,4-phenylene | — | 1,3-phenylene | O | —(CH₂)₂— | MAcr |
| 96 | MAcr | —(CH₂)₂— | O | 2-fluoro-1,4-phenylene | — | 1,3-phenylene | O | —(CH₂)₄— | MAcr |
| 97 | MAcr | —(CH₂)₃— | — | 2-fluoro-1,4-phenylene | — | 1,3-phenylene | — | —CH₂— | MAcr |

-continued
| No. | P¹ | Sp¹ | X¹ | A¹ | B | A² | X² | Sp² | P² |
|---|---|---|---|---|---|---|---|---|---|
| 98 | MAcr | —CH₂— | — | 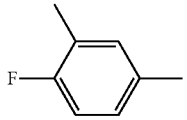 | — | 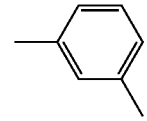 | — | —(CH₂)₃— | MAcr |
| 99 | MAcr | — | — | 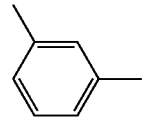 | — | 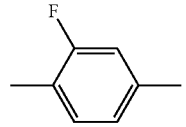 | O | —(CH₂)₂— | MAcr |
| 100 | MAcr | — | — | 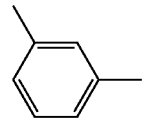 | — | 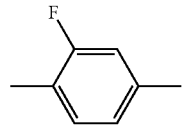 | O | —(CH₂)₄— | MAcr |
| 101 | MAcr | — | — | 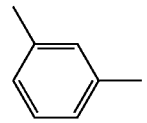 | — | 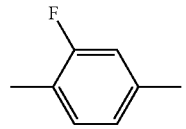 | — | —CH₂— | MAcr |
| 102 | MAcr | — | — | 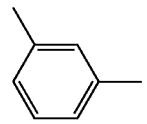 | — | 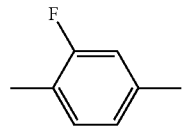 | — | —(CH₂)₃— | MAcr |
| 103 | MAcr | —(CH₂)₄— | O | 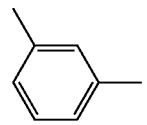 | — | 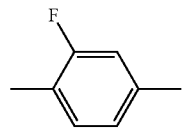 | O | —(CH₂)₂— | MAcr |
| 104 | MAcr | —(CH₂)₂— | O | 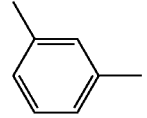 | — | 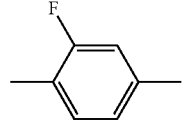 | O | —(CH₂)₄— | MAcr |
| 105 | MAcr | —(CH₂)₃— | — | 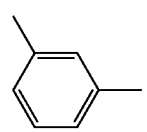 | — | 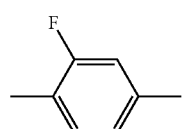 | — | —CH₂— | MAcr |
| 106 | MAcr | —CH₂— | — | 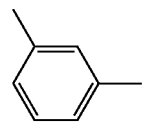 | — | 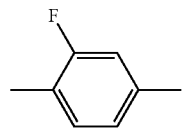 | — | —(CH₂)₃— | MAcr |
(Acr = acrylate, MAcr = methacrylate)

USE EXAMPLE 1

The solubility of compound (1) is compared with the solubility of the structurally analogous compound (A) known from the prior art (for example EP 1 498 468 A1), in which the polymerisable groups are linked in the para-position to the mesogenic group:

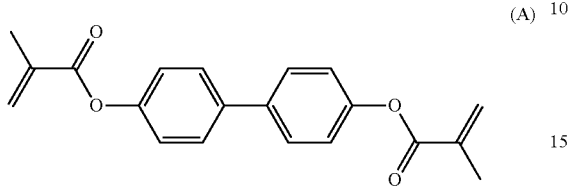

(A)

melting point: 147° C.

To this end, each compound is dissolved in the commercially available nematic LC mixture LCT-06-441 (Merck KGaA, Darmstadt) in a concentration of 5% by weight with stirring at 50° C. (½ hour) and then cooled to room temperature without stirring. Result:

(1): Crystallises out overnight at RT (A): Immediately crystallises out on cooling to RT The compound according to the invention exhibits significantly better solubility than the compound from the prior art.

USE EXAMPLE 2

Mixture Example

The nematic LC host mixture N1 is formulated as follows:

| | | | |
|---|---|---|---|
| CCH-501 | 9.00% | Cl.p. | +70.0 |
| CCH-35 | 14.00% | Δn | 0.0825 |
| PCH-53 | 8.00% | Δε | −3.5 |
| CY-3-O4 | 14.00% | $\epsilon_\parallel$ | 3.5 |
| CY-5-O4 | 13.00% | $K_3/K_1$ | 1.00 |
| CCY-3-O2 | 8.00% | $\gamma_1$ | 141 |
| CCY-5-O2 | 8.00% | $V_0$ | 2.06 |
| CCY-2-1 | 9.00% | | |
| CCY-3-1 | 9.00% | | |
| CPY-2-O2 | 8.00% | | |

0.3% of a polymerisable monomeric compound from Examples 1 to 10 is added to LC mixture N1, and the resultant mixtures are introduced into VA-e/o test cells (rubbed at 90°, alignment layer VA-polyimide, layer thickness d≈4 μm). Each cell is irradiated for 20 minutes with UV light having an intensity of 28 mW/cm² with application of a voltage of 10 V (alternating current), causing polymerisation of the monomeric compound. In a second series of experiments, 0.006% of the photoinitiator Irgacure 651 is additionally added to the LC/monomer mixture, and the exposure time is shortened to 2 minutes. Before and after the UV irradiation, the tilt angle is determined by a rotational crystal experiment (Autronic-Melchers TBA-105).

For comparative purposes, the experiments described above are carried out with the structurally analogous polymerisable compounds (A) and (B) known from the prior art (for example EP 1 498 468 A1), in which the polymerisable groups are linked in the para-position to the mesogenic group.

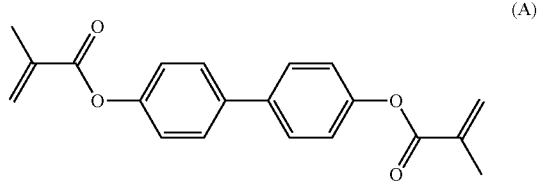

(A)

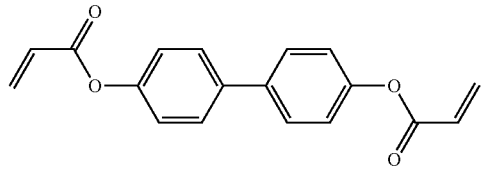

(B)

The results are shown in Table 1.

TABLE 1

| Monomer | Initiator | Tilt before UV | Tilt after UV |
|---|---|---|---|
| (1) | no | 89.9° | 87.9° |
| (1) | yes | 89.9° | 87.4° |
| (2) | no | 89.9° | 87.2° |
| (2) | yes | 89.9° | 87.0° |
| (3) | no | 89.8° | 87.4° |
| (3) | yes | 89.9° | 87.5° |
| (4) | no | 89.8° | 83.5° |
| (4) | yes | 89.7° | 84.7° |
| (5) | no | 89.9° | 86.3° |
| (5) | yes | 89.9° | 84.2° |
| (6) | no | 89.9° | 85.2° |
| (6) | yes | 89.9° | 80.0° |
| (7) | no | 89.9° | 86.8° |
| (7) | yes | 89.8° | 86.8° |
| (8) | no | 89.9° | 83.4° |
| (8) | yes | 89.7° | 86.8° |
| (9) | no | 89.9° | 84.5° |
| (9) | yes | 89.8° | 86.1° |
| (10) | no | 89.9° | 83.7° |
| (10) | yes | 89.8° | 86.0° |
| (A) | no | 89.7° | 81.8° |
| (A) | yes | 89.8° | 84.8° |
| (B) | no | 89.6° | 86.2° |
| (B) | yes | 89.7° | 87.0° |

As can be seen from Table 1, a sufficiently large tilt (i.e. small tilt angle) can also be achieved after polymerisation with the monomers according to the invention (1-10), in particular without using a photoinitiator.

Owing to their better solubility (see Example 5), the compounds (1)-(10) according to the invention are thus particularly suitable for use in PS(A) displays.

The invention claimed is:

1. A LC medium comprising
   a polymerisable component A) comprising one or more polymerisable compounds, and
   a liquid-crystalline component B) comprising one or more low-molecular-weight compounds,
   wherein component A) comprises one or more polymerisable compounds of formula I $$R^a\text{-}(A^1\text{-}Z^1)_{m1}\text{-}(A^2\text{-}Z^2)_{m2}\text{-}(A^3)_{m3}\text{-}R^b \qquad I$$

in which the individual radicals have the following meanings:

$R^a$ and $R^b$ each, independently of one another, denote P-Sp-, H, halogen, $SF_5$, $NO_2$, a carbon group or hydrocarbon group, where at least one of the radicals $R^a$ and $R^b$ denotes P-Sp-, P on each occurrence, identically or differently, denotes a polymerisable group, Sp on each occurrence, identically or differently, denotes a spacer group or a single bond, $A^1$ and $A^3$ each, independently of one another, denote 1,3-phenylene, naphthalene-1,3-diyl, naphthalene-1,6-diyl, naphthalene-2,5-diyl or naphthalene-2,7-diyl, where, in addition, one or more CH groups in these radicals may be replaced by N, cyclohexane-1,3-diyl, in which, in addition, one or more non-adjacent $CH_2$ groups may be replaced by O and/or S, 1,3-cyclohexenylene, piperidine-2,4-diyl, piperidine-2,6-diyl, decahydronaphthalene-2,7-diyl, 1,2,3,4-tetrahydronaphthalene-2,7-diyl or indane-2,4-diyl, where all these radicals may be unsubstituted or mono- or polysubstituted by L, and where, in the case where m1=m3=1, one of the radicals $A^1$ and $A^3$ may also have one of the meanings indicated for $A^2$, $A^2$ on each occurrence, identically or differently, denotes 1,4-phenylene, naphthalene-1,4-diyl or naphthalene-2,6-diyl, where, in addition, one or more CH groups in these radicals may be replaced by N, cyclohexane-1,4-diyl, in which, in addition, one or more non-adjacent $CH_2$ groups may be replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-2,5-diyl, decahydronaphthalene-2,6-diyl, 1,2,3,4-tetra-hydronaphthalene-2,6-diyl, indane-2,5-diyl, thiophene-2,5-diyl, fluorene-2,7-diyl or octahydro-4,7-methanoindane-2,5-diyl, where all these radicals may be unsubstituted or mono- or polysubstituted by L, or can have one of the meanings indicated for $A^1$, L denotes P-Sp-, H, OH, halogen, $SF_5$, $NO_2$, a carbon group or hydrocarbon group, $Z^{1,2}$ each, independently of one another and on each occurrence identically or differently, denote —O—, —S—, —CO—, —CO—O—, —OCO—, —O—CO—O—, —OCH_2—, —CH_2O—, —SCH_2—, —CH_2S—, —CF_2O—, —OCF_2—, —CF_2S—, —SCF_2—, —(CH_2)_{n1}—, —CF_2CH_2—, —CH_2CF_2—, —(CF_2)_{n1}—, —CH=CH—, —CF=CF—, —C≡C—, —CH=CH—COO—, —OCO—CH=CH—, $CR^0R^{00}$ or a single bond, $R^0$ and $R^{00}$ each, independently of one another, denote H or alkyl having 1 to 12 C atoms, m1 and m3 each, independently of one another, denote 0 or 1, where m1+m3>0, m2 denotes 0, 1, 2 or 3, n1 denotes 1, 2, 3 or 4.

2. A LC medium according to claim 1, wherein $A^{1-3}$, $Z^{1-2}$, P, Sp, m1, m2, m3 and n1 have the meanings indicated in claim 1, and L denotes P-Sp-, OH, $CH_2OH$, F, Cl, Br, I, —CN, —$NO_2$, —NCO, —NCS, —OCN, —SCN, —C(=O)N($R^x$)_2, —C(=O)$Y^1$, —C(=O)$R^x$, —N($R^x$)_2, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl or P-Sp-, $Y^1$ denotes halogen, $R^x$ denotes P-Sp-, H, halogen, straight-chain, branched or cyclic alkyl having 1 to 25 C atoms, in which, in addition, one or more non-adjacent $CH_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl or P-Sp-, an optionally substituted aryl or aryloxy group having 6 to 40 C atoms or an optionally substituted heteroaryl or heteroaryloxy group having 2 to 40 C atoms, R denotes P-Sp-, H, L as defined above, or straight-chain or branched alkyl having 1 to 25 C atoms, in which, in addition, one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN or P-Sp-, where at least one of the radicals $R^a$ and $R^b$ is P-Sp-.

3. A LC medium according to claim 1, wherein the polymerisable compounds are selected from the following sub-formulae:

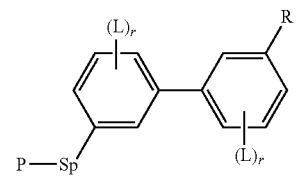

I1

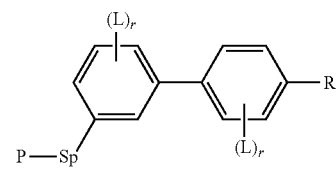

I2

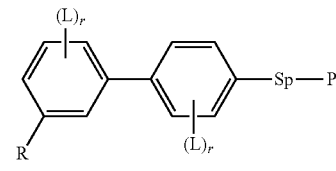

I3

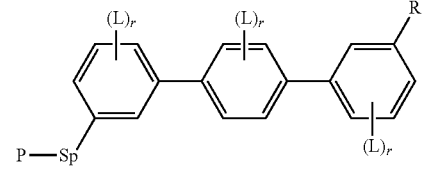

I4

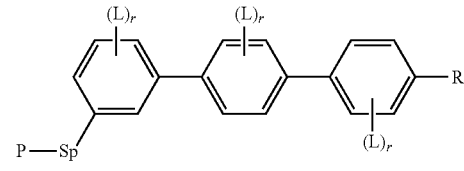

I5

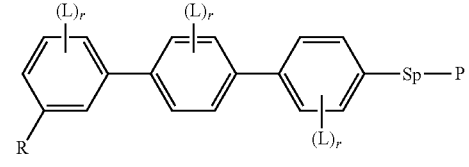

I6

I7 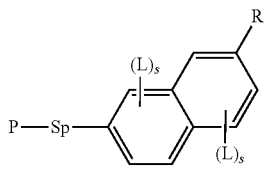
I8 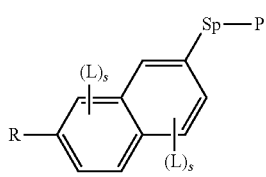
I9 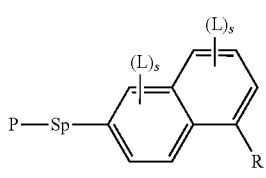
I10 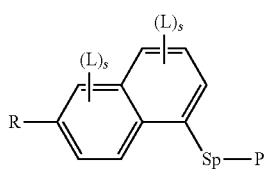
I11 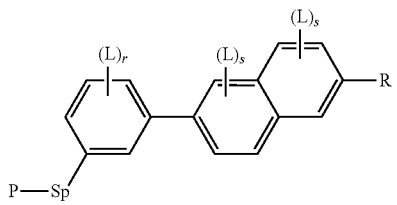
I12 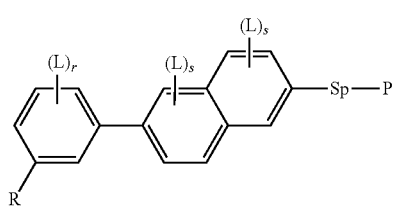
I13 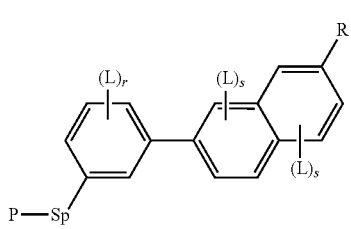
I14 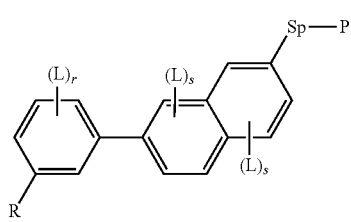
I15 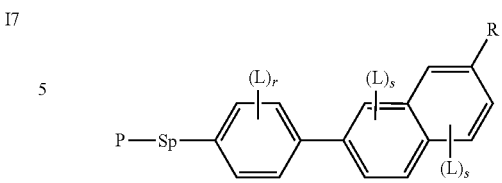
I16 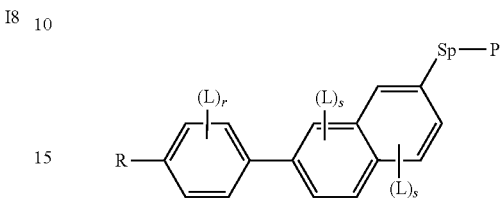
I17 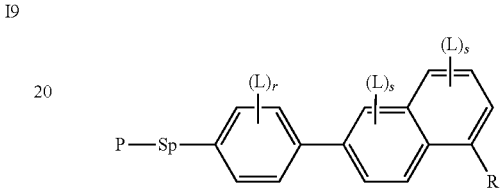
I18 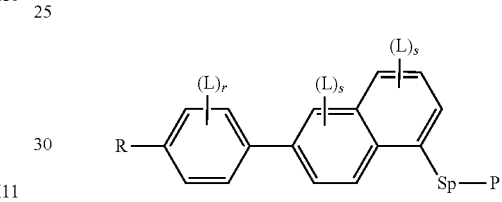
I19 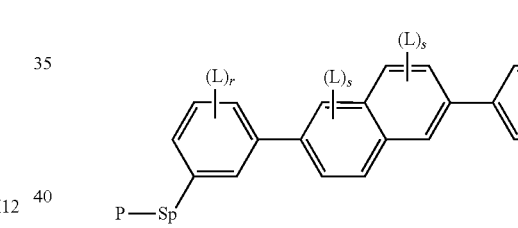
I20 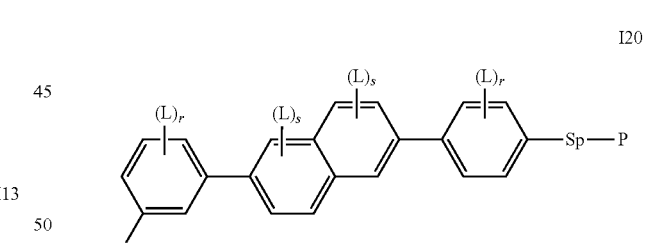
I21 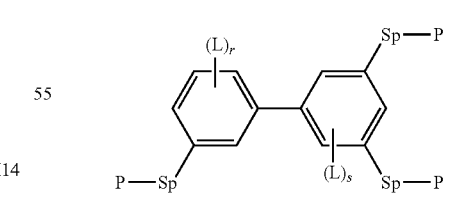
I22 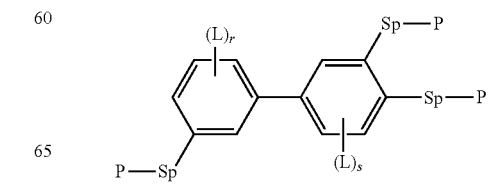

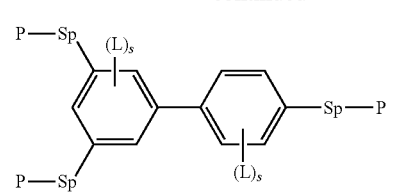 I23
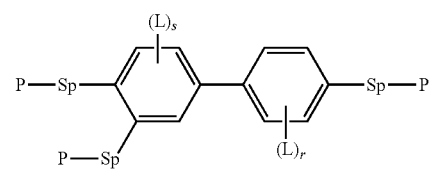 I24
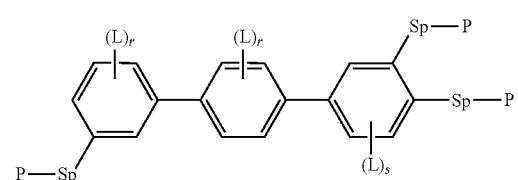 I25
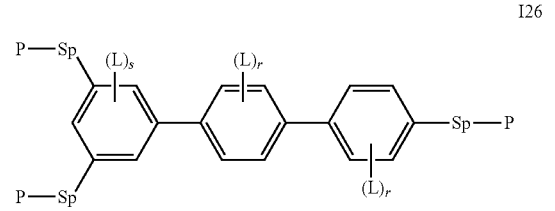 I26
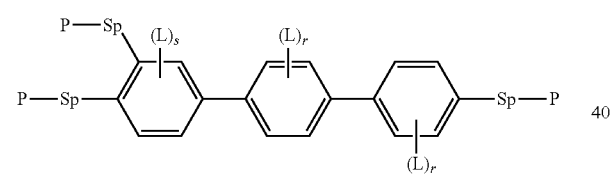 I27
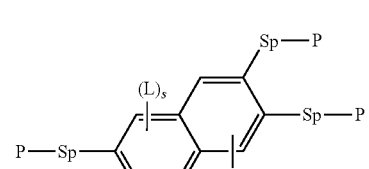 I28
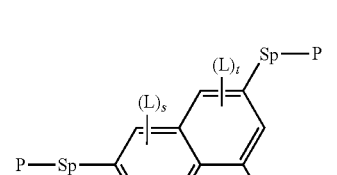 I29
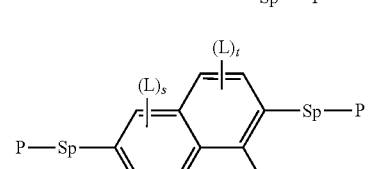 I30
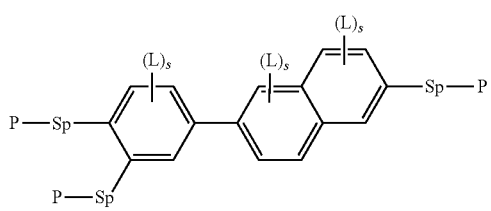 I31
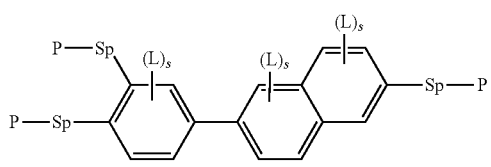 I32
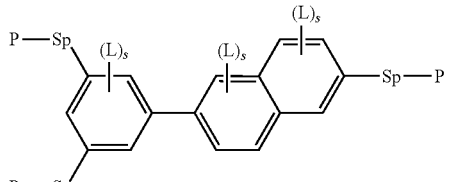 I33
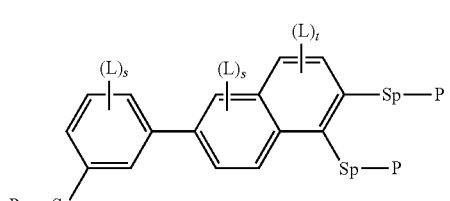 I34
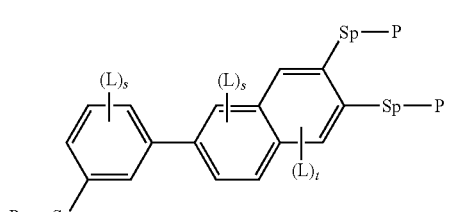 I35
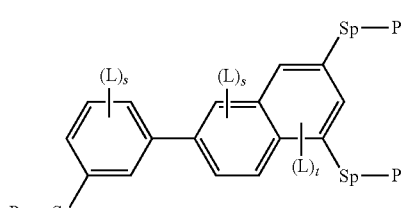 I36
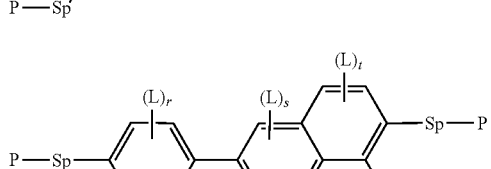 I37
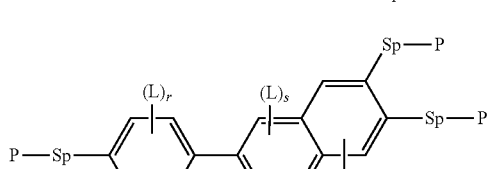 I38

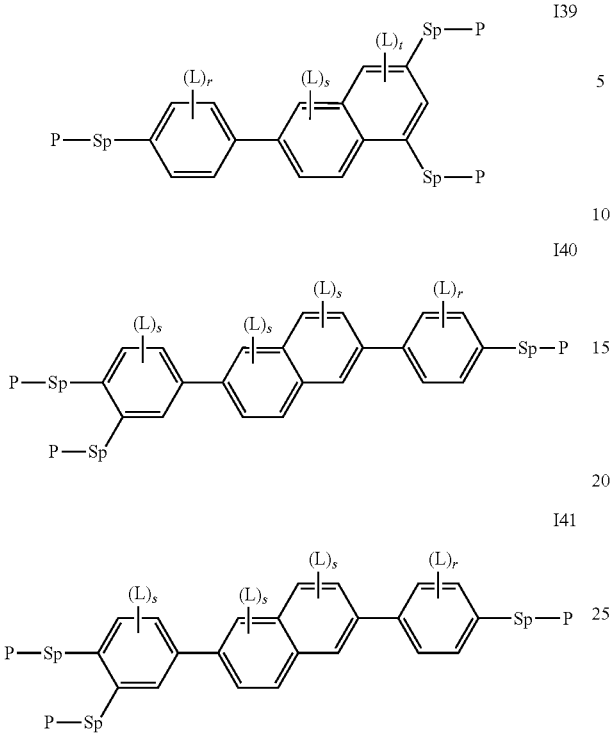

I39

I40

I41 in which R, P, Sp and L have the meanings indicated in claim 1, r is 0, 1, 2, 3 or 4, s is 0, 1, 2 or 3, and t is 0, 1 or 2.

4. A LC medium according to claim 1, wherein the LC medium comprises one or more compounds of the following formulae:

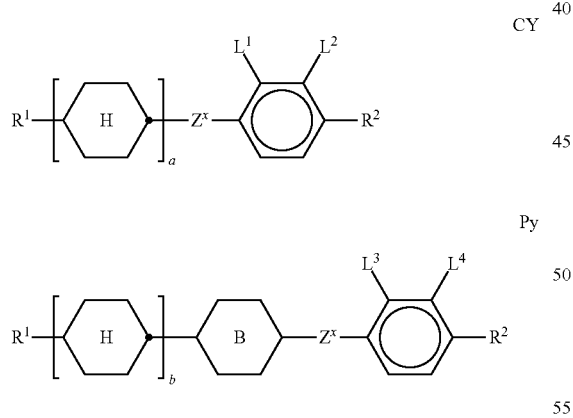

CY

Py in which the individual radicals have the following meanings:

a denotes 1 or 2, b denotes 0 or 1,

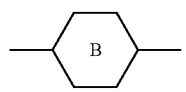

denotes

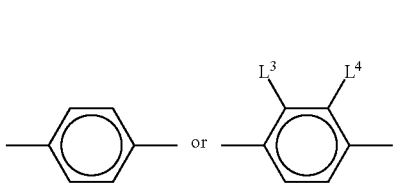

$R^1$ and $R^2$ each, independently of one another, denote alkyl having 1 to 12 C atoms, in which, in addition, one or two non-adjacent $CH_2$ groups may be replaced by —O—, —CH=CH—, —CO—, —OCO— or —COO— in such a way that O atoms are not linked directly to one another, $Z^x$ denotes —CH=CH—, —$CH_2$O—, —O$CH_2$—, —$CF_2$O—, —O$CF_2$—, —O—, —$CH_2$—, —$CH_2CH_2$— or a single bond, $L^{1-4}$ each, independently of one another, denote F, Cl, $OCF_3$, $CF_3$, $CH_3$, $CH_2F$, $CHF_2$.

5. A LC medium according to claim 1, wherein the LC medium comprises one or more compounds of the following formula:

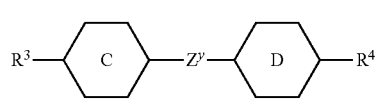

ZK in which the individual radicals have the following meanings:

denotes

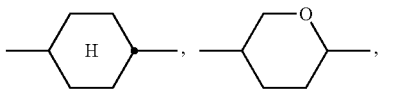

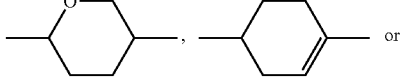

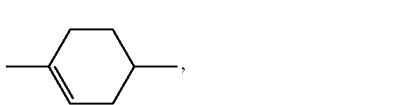

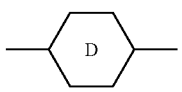

denotes

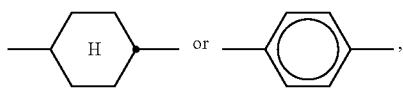

R³ and R⁴ each, independently of one another, denote alkyl having 1 to 12 C atoms, in which, in addition, one or two non-adjacent CH₂ groups may be replaced by —O—, —CH=CH—, —CO—, —OCO— or —COO— in such a way that O atoms are not linked directly to one another, $Z^y$ denotes —CH₂CH₂—, —CH=CH—, —CF₂O—, —OCF₂—, —CH₂O—, —OCH₂—, —COO—, —OCO—, —C₂F₄—, —CF=CF— or a single bond.

6. A LC medium according to claim 1, in which component B) comprises one or more compounds selected from formulae CY, PY and ZK

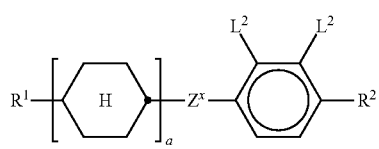 CY

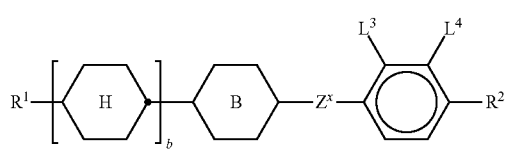 PY in which the individual radicals have the following meanings:
a denotes 1 or 2,
b denotes 0 or 1,

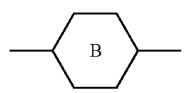

denotes

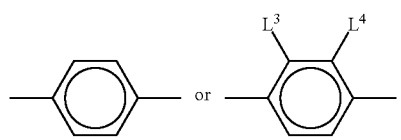

R¹ and R² each, independently of one another, denote alkyl having 1 to 12 C atoms, in which, in addition, one or two non-adjacent CH₂ groups may be replaced by —O—, —CH=CH—, —CO—, —OCO— or —COO— in such a way that O atoms are not linked directly to one another, $Z^x$ denotes —CH=CH—, —CH₂O—, —OCH₂—, —CF₂O—, —OCF₂—, —O—, —CH₂—, —CH₂CH₂— or a single bond, L¹⁻⁴ each, independently of one another, denote F, Cl, OCF₃, CF₃, CH₃, CH₂F, CHF₂,

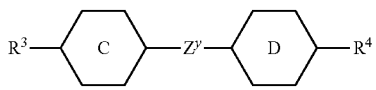 ZK in which the individual radicals have the following meanings:

denotes

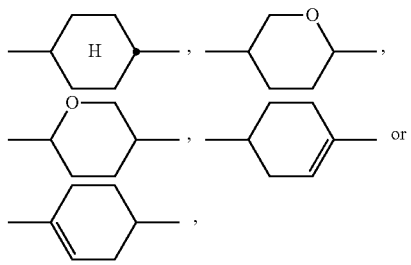

denotes

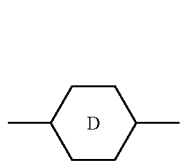

denotes

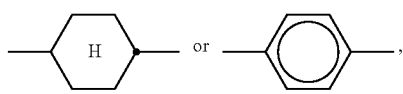

R³ and R⁴ each, independently of one another, denote alkyl having 1 to 12 C atoms, in which, in addition, one or two non-adjacent CH₂ groups may be replaced by —O—, —CH=CH—, —CO—, —OCO— or —COO— in such a way that O atoms are not linked directly to one another, $Z^y$ denotes —CH₂CH₂—, —CH=CH—, —CF₂O—, —OCF₂—, —CH₂O—, —OCH₂—, —COO—, —OCO—, —C₂F₄—, —CF=CF— or a single bond.

7. A LC medium according to claim 1, wherein:
the group P is selected from CH₂=CW¹—COO—, CH₂=CW¹—CO—,

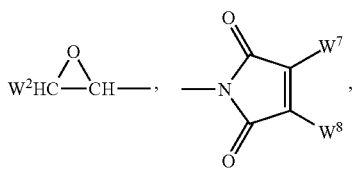

-continued

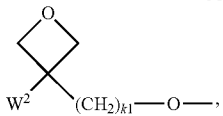

$CH_2=CW^2-(O)_{k3}-$, $CW^1=CH-CO-(O)_{k3}-$, $CW^1=CH-CO-NH-$, $CH_2=CW^1-CO-NH-$, $CH_3-CH=CH-O-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $HO-CW^2W^3-$, $HS-CW^2W^3-$, $HW^2N-$, $HO-CW^2W^3-NH-$, $CH_2=CW^1-CO-NH-$, $CH_2=CH-(COO)_{k1}\text{-Phe-}(O)_{k2}-$, $CH_2=CH-(CO)_{k1}\text{-Phe-}(O)_{k2}-$, $\text{Phe-}CH=CH-$, $HOOC-$, $OCN-$ or $W^4W^5W^6Si-$, in which:

$W^1$ denotes H, F, Cl, CN, $CF_3$, phenyl or alkyl having 1 to 5 C atoms, $W^2$ and $W^3$ each, independently of one another, denote H or alkyl having 1 to 5 C atoms, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above, and $k_1$, $k_2$ and $k_3$ each, independently of one another, denote 0 or 1; and the Sp group is a group Sp'-X', where:

Sp' denotes alkylene having 1 to 20, which is optionally mono- or polysubstituted by F, Cl, Br, I or CN and in which, in addition, one or more non-adjacent $CH_2$ groups may each be replaced, independently of one another, by $-O-$, $-S-$, $-NH-$, $-NR^0-$, $-SiR^0R^{00}-$, $-CO-$, $-COO-$, $-OCO-$, $-OCO-O-$, $-S-CO-$, $-CO-S-$, $-NR^0-CO-O-$, $-O-CO-NR^0-$, $-NR^0-CO-NR^0-$, $-CH=CH-$ or $-C\equiv C-$ in such a way that O and/or S atoms are not linked directly to one another, and X' denotes $-O-$, $-S-$, $-CO-$, $-COO-$, $-OCO-$, $-O-OCO-$, $-CO-NR^0-$, $-NR^0-CO-$, $-NR^0-CO-NR^0-$, $-OCH_2-$, $-CH_2O-$, $-SCH_2-$, $-CH_2S-$, $-CF_2O-$, $-OCF_2-$, $-CF_2S-$, $-SCF_2-$, $-CF_2CH_2-$, $-CH_2CF_2-$, $-CF_2CF_2-$, $-CH=N-$, $-N=CH-$, $-N=N-$, $-CH=CR^0-$, $-CY^2=CY^3-$, $-C\equiv C-$, $-CH=CH-COO-$, $-OCO-CH=CH-$ or a single bond.

8. A LC medium according to claim 1, wherein:

the group P is selected from $CH_2=CH-COO-$, $CH_2=C(CH_3)-COO-$, $CH_2=CH-$, $CH_2=CH-O-$, $(CH_2=CH)_2CH-OCO-$, $(CH_2=CH)_2CH-O-$,

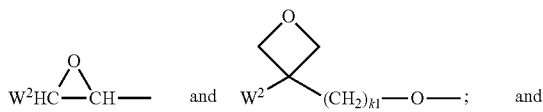

and the Sp group is selected from $-(CH_2)_{p1}-$, $-O-(CH_2)_{p1}-$, $-OCO-(CH_2)_{p1}-$, $-OCOO-(CH_2)_{p1}-$ where p1 is an integer from 1 to 12.

9. A LC medium according to claim 4, wherein $Z^x$ denotes a single bond.

10. Process for the preparation of an LC medium according to claim 6 by mixing one or more component B) low-molecular-weight liquid-crystalline compounds with one or more component A) polymerisable compounds, and optionally with further liquid-crystalline compounds and/or additives.

11. A LC display, which is a PS (polymer stabilised) or PSA (polymer sustained alignment) display, which comprises an LC medium as defined in claim 1.

12. A LC display according to claim 11, which is a PSA-VA, PSA-OCB, PS-IPS, PS-FFS or PS-TN display.

13. A LC display according to claim 11, wherein the PS or PSA LC display contains:

an LC cell consisting of two substrates, where at least one substrate is transparent to light and at least one substrate has an electrode layer; and a layer of an LC medium comprising a polymerised component and a low-molecular-weight component located between the substrates, where the polymerised component is obtainable by polymerisation of one or more polymerisable compounds between the substrates of the LC cell in the LC medium with application of an electrical voltage.

14. A compound of the formula I $$R^a\text{-}(A^1\text{-}Z^1)_{m1}\text{-}(A^2\text{-}Z^2)_{m2}\text{-}(A^3)_{m3}\text{-}R^b \qquad \text{I}$$

in which $R^a$ and $R^b$ each, independently of one another, denote P-Sp-, H, halogen, $SF_5$, $NO_2$, a carbon group or hydrocarbon group, where at least one of the radicals $R^a$ and $R^b$ denotes P-Sp-, P on each occurrence, identically or differently, denotes a polymerisable group, Sp on each occurrence, identically or differently, denotes a spacer group or a single bond, $A^1$ and $A^3$ each, independently of one another, denote 1,3-phenylene, naphthalene-1,3-diyl, naphthalene-1,6-diyl, naphthalene-2,5-diyl or naphthalene-2,7-diyl, where, in addition, one or more CH groups in these radicals may be replaced by N, cyclohexane-1,3-diyl, in which, in addition, one or more non-adjacent $CH_2$ groups may be replaced by O and/or S, 1,3-cyclohexenylene, piperidine-2,4-diyl, piperidine-2,6-diyl, decahydronaphthalene-2,7-diyl, 1,2,3,4-tetrahydronaphthalene-2,7-diyl or indane-2,4-diyl, where all these radicals may be unsubstituted or mono- or polysubstituted by L, and where, in the case where m1=m3=1, one of the radicals $A^1$ and $A^3$ may also have one of the meanings indicated for $A^2$, $A^2$ on each occurrence, identically or differently, denotes 1,4-phenylene, naphthalene-1,4-diyl or naphthalene-2,6-diyl, where, in addition, one or more CH groups in these radicals may be replaced by N, cyclohexane-1,4-diyl, in which, in addition, one or more non-adjacent $CH_2$ groups may be replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-2,5-diyl, decahydronaphthalene-2,6-diyl, 1,2,3,4-tetra-hydronaphthalene-2,6-diyl, indane-2,5-diyl, thiophene-2,5-diyl, fluorene-2,7-diyl or octahydro-4,7-methanoindane-2,5-diyl, where all these radicals may be unsubstituted or mono- or polysubstituted by L, or can have one of the meanings indicated for $A^1$, L denotes P-Sp-, H, OH, halogen, $SF_5$, $NO_2$, a carbon group or hydrocarbon group, $Z^{1,2}$ each, independently of one another and on each occurrence identically or differently, denote —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR$^0$R$^{00}$ or a single bond, R$^0$ and R$^{00}$ each, independently of one another, denote H or alkyl having 1 to 12 C atoms, m1 and m3 each, independently of one another, denote 0 or 1, where m1+m3>0 m2 denotes 0, 1, 2 or 3, n1 denotes 1, 2, 3 or 4.

* * * * *